(12) United States Patent
Kashiwagi et al.

(10) Patent No.: US 7,499,475 B2
(45) Date of Patent: Mar. 3, 2009

(54) BROADCAST STATION, BASE STATION CONTROL DEVICE, RECEIVER, CONTROL METHOD, RECEIVING METHOD, BROADCAST SYSTEM, RECEPTION PROGRAM, TRANSMISSION PROGRAM, DISTRIBUTION PROGRAM, AND STORAGE MEDIUM

(75) Inventors: Hiroki Kashiwagi, Chiba (JP); Go Matsubara, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 380 days.

(21) Appl. No.: 11/231,869

(22) Filed: Sep. 22, 2005

(65) Prior Publication Data

US 2007/0053332 A1  Mar. 8, 2007

Related U.S. Application Data

(60) Provisional application No. 60/714,951, filed on Sep. 8, 2005.

(51) Int. Cl.
H04Q 7/00 (2006.01)

(52) U.S. Cl. ........................ 370/538; 370/390; 370/328; 370/331; 370/340

(58) Field of Classification Search ................. 370/538, 370/390, 328, 331, 340
See application file for complete search history.

(56) References Cited

U.S. PATENT DOCUMENTS

| | | | |
|---|---|---|---|
| 6,567,660 B1 * | 5/2003 | Wegener ...................... | 455/418 |
| 2001/0049291 A1 | 12/2001 | Sato et al. | |
| 2002/0191562 A1 * | 12/2002 | Kumaki et al. .............. | 370/331 |
| 2003/0005382 A1 | 1/2003 | Chen et al. | |
| 2003/0093476 A1 * | 5/2003 | Syed .......................... | 709/204 |
| 2003/0134655 A1 * | 7/2003 | Chen et al. .................. | 455/522 |
| 2003/0186704 A1 * | 10/2003 | Tamura et al. .............. | 455/450 |
| 2004/0117498 A1 | 6/2004 | Hashimoto et al. | |
| 2004/0132456 A1 | 7/2004 | Takeda et al. | |
| 2004/0184471 A1 | 9/2004 | Chuah et al. | |

(Continued)

FOREIGN PATENT DOCUMENTS

JP  11-234154 A  8/1999

(Continued)

Primary Examiner—Duc Nguyen
Assistant Examiner—Julio R Perez
(74) Attorney, Agent, or Firm—Birch, Stewart, Kolasch & Birch, LLP

(57) ABSTRACT

A portable terminal includes: a radio frequency receiving section for receiving main broadcast data and sub broadcast data; an electric field strength measuring section for measuring an electric field strength corresponding to a receiving condition of the radio frequency receiving section; a reception quality determining section for determining reception quality based on a comparison between the electric field strength measured by the electric field strength measuring section and a predetermined threshold of required quality; a decoder, a display section, and a speaker for reproducing the main broadcast data or sub broadcast data; and a switching section for reproducing main broadcast data corresponding to a designated channel acquired by a designated channel acquiring section, when the reception quality determining section determines the reception quality to be good, and sub broadcast data corresponding to a designated channel acquired by the designated channel acquiring section, when the reception quality determining section determines the reception quality to be no good. With this arrangement, an operation of transmitting or receiving a retransmission request will not be required, and the communication channels can be used efficiently. As a result, customer satisfaction is improved.

43 Claims, 23 Drawing Sheets

U.S. PATENT DOCUMENTS

| | | | |
|---|---|---|---|
| 2005/0094618 A1* | 5/2005 | Colban et al. | 370/350 |
| 2005/0208959 A1* | 9/2005 | Chen et al. | 455/515 |
| 2006/0045015 A1* | 3/2006 | Nix et al. | 370/235 |
| 2006/0271780 A1* | 11/2006 | Oswal et al. | 713/163 |

FOREIGN PATENT DOCUMENTS

| | | |
|---|---|---|
| JP | 2001-103557 | 4/2001 |
| JP | 2001-298407 | 10/2001 |
| JP | 2001-308784 | 11/2001 |
| JP | 2001-333424 A | 11/2001 |
| JP | 2002-010157 | 1/2002 |
| JP | 2003-023428 | 1/2003 |
| JP | 2004-128563 | 4/2004 |
| JP | 2004-186892 | 7/2004 |
| JP | 2004-289830 | 10/2004 |
| JP | 2004-320394 A | 11/2004 |
| JP | 2004-535124 | 11/2004 |
| JP | 2004-356873 A | 12/2004 |
| JP | 2004-357124 A | 12/2004 |
| JP | 2005-223548 A | 8/2005 |

* cited by examiner

BROADCAST STATION, BASE STATION CONTROL DEVICE, RECEIVER, CONTROL METHOD, RECEIVING METHOD, BROADCAST SYSTEM, RECEPTION PROGRAM, TRANSMISSION PROGRAM, DISTRIBUTION PROGRAM, AND STORAGE MEDIUM

This nonprovisional application claims the benefit of U.S. provisional patent application filed on Sep. 8, 2005 with 60/714951, the entire contents of all of which are hereby incorporated by reference.

FIELD OF THE INVENTION

The present invention relates to a broadcast station for transmitting contents data, a base station control device for distributing contents data, and a receiver for receiving contents data.

BACKGROUND OF THE INVENTION

Conventionally, terrestrial digital television broadcasting and satellite broadcasting have been implemented using dedicated forward link channels. In a recently developed service, television programs or other contents are distributed to multiple terminals using multicast communications.

Meanwhile, mobile terminals such as portable phones have been used as the receiving terminals of such broadcasts or distributions. A problem associated with such mobile terminals is that reception quality of the broadcast or distributed data varies from one place to another, resulting in poor picture quality.

In view of such a drawback, Japanese Laid-Open Patent Publication No. 2004-186892 (published on Jul. 2, 2004), and No. 2004-289830 (published on Oct. 14, 2004) disclose techniques in which a transmitting station transmits a packet more than one time. This is intended to improve the probability of packets being properly received by the receiving terminals and thereby improve reception quality.

Japanese Laid-Open Patent Publication No. 2001-308784 (published on Nov. 2, 2001) discloses the following technique. As disclosed in this publication, a transmitting station or a receiving terminal determines the reception quality. If there is deterioration in the quality of the radio frequency communications, the receiving terminal is disconnected from the multicast group and the communication between the receiving terminal and the transmitting station is switched to point-to-point communications which involve retransmission. If the quality of the radio frequency communications improves later on, the receiving terminal is reconnected to the multicast group, and the communication between the receiving terminal and the transmitting station is switched to multicast communications, which are point-to-multipoint communications involving no retransmission. In this way, when the quality of radio frequency communications is poor, the receiving terminal sends a request for retransmission of unreceived data to the transmitting station using point-to-point communications involving retransmission (bidirectional communications). Since the data is retransmitted, the quality of received data improves at the receiving terminal.

Japanese Laid-Open Patent Publication No. 2002-10157 (published on Jan. 11, 2002), and No. 2004-128563 (published on Apr. 22, 2004) disclose a receiver which sends a request for retransmission of a broadcast signal to the transmitting station using a bidirectional channel when the quality of the broadcast signal transmitted on a dedicated forward link channel is poor, so as to receive retransmitted packets.

However, a problem of transmitting the same packets multiple times is that it does not allow for efficient use of the communication channels. That is, it involves a large amount of unnecessary communications.

Further, in response to the request for retransmission using a bidirectional channel, the transmitting station needs to process the request for each receiving terminal, with the result that a large burden is put on the transmitting station. Further, due to the time lag associated with the requesting and processing of the retransmission, the receiving terminal receives the retransmitted packet with a delay, as compared with the case where the packet is properly received without the request for retransmission. This may cause interruption or disturbance of video data when the data contains a real time video image that is reproduced as it is received. Another problem is that it may congest the bidirectional channel, with the result that the communication speed of the retransmitted data may be decreased, or interference may be caused in sending and receiving other data.

Further, since the receiving terminals need to send a retransmission request individually, the burden on the receiving terminals is increased.

SUMMARY OF THE INVENTION

An object of the present invention is to provide a receiver, a broadcast station, a base station control device, a broadcast system, a reception program, a transmission program, a distribution program, and a storage medium, which can eliminate or ease the process of transmitting or receiving a request for retransmission, allow for efficient use of communication channels, and improve viewer satisfaction.

In order to achieve the foregoing object, the present invention provides a broadcast station for broadcasting a plurality of first contents data using a dedicated forward link channel, the broadcast station including: a selecting section for selecting some of the first contents data; a second contents data acquiring/generating section for acquiring or generating second contents data having contents of each of the first contents data selected by the selecting section; and a transmission control section for broadcasting the second contents data acquired or generated by the second contents data acquiring/generating section, the second contents data being transmitted in a more error robust transmission mode than the first contents data and by sharing a predetermined specific band in the dedicated forward link channel.

The error tolerance of the transmission mode is determined by the modulation rate and the coding rate. For example, given the same coding rate, the error tolerance increases by reducing the modulation rate. On the other hand, given the same modulation rate, the error tolerance increases by reducing the coding rate. An even stronger error tolerance can be obtained by reducing both the modulation rate and the coding rate. Even with a high coding rate, the error tolerance can be increased by reducing the modulation rate so as to compensate for the high coding rate. Likewise, even when the modulation rate is high, the error tolerance can be increased by reducing the coding rate so as to compensate for the high modulation rate. With the modulation rate and coding rate controlled in this manner, a transmission mode with strong error tolerance can be obtained. Note that, as used herein, the "transmission mode with strong error tolerance" refers to the transmission mode in which a required level of reception quality is low.

The first contents data have a weaker error tolerance but a higher transmission rate than the second contents data. Thus, under good reception conditions, the first contents data can provide videos and audios of better quality than the second contents data. However, due to the weak error tolerance, the videos and audios of the first contents data deteriorate abruptly when the characteristic value, indicative of the receiving condition, falls below the threshold.

The second contents data have a stronger error tolerance but a weaker transmission rate than the first contents data, and therefore can be modulated reasonably well, though the picture quality is not as good as the first contents data, even when the characteristic value indicative of the reception quality is below the threshold.

According to the foregoing arrangement, the receiver can receive the plurality of first contents data parallel to second contents data corresponding to some of the first contents data. Thus, for some of the contents, the receiver can reproduce either the first contents data or second contents data depending on the receiving condition. More specifically, when the first contents data cannot be modulated properly and the quality of videos or audios is disturbed, the receiver can reproduce the second contents data with the more error robust transmission mode. This reduces the risk of causing troubles in viewing. Further, the receiver will not be overloaded with the process of individually sending a retransmission request as in conventional receivers, and therefore allows for efficient use of the bidirectional channels.

According to the present invention, there is provided a base station control device for distributing data to a receiver which receives, via a dedicated forward link channel, a plurality of first contents data broadcast from a broadcast station, the base station control device including: a selecting section for selecting part of the first contents data; a second contents data acquiring/generating section for acquiring or generating second contents data having contents of each of the first contents data selected by the selecting section; and a distributing section for multicasting, to the receiver, the second contents data acquired or generated by the second contents data acquiring/generating section, the second contents data being multicast using a channel different from the dedicated forward link channel.

According to this arrangement, the receiver can receive the first contents data on the dedicated forward link channel, and the second contents data on a channel different from the dedicated forward link channel. In this way, by the diversity effect, the probability of both the first contents data and the second contents data not being reproduced properly is significantly reduced.

According to the present invention, there is provided a receiver including: a receiving section for receiving first contents data and second contents data using a dedicated forward link channel, the second contents data having contents of the first data and transmitted in a more error robust transmission mode than the first contents data; a reception quality measuring section for measuring a characteristic value corresponding to a receiving condition of the receiving section; a reception quality determining section for determining reception quality based on a comparison between the characteristic value measured by the reception quality measuring section and a predetermined threshold; a reproducing section for reproducing the first contents data or the second contents data; and a reproduced contents switching section for causing the reproducing section to reproduce the first contents data if the reception quality determining section determines the reception quality to be good, and the second contents data if the reception quality determining section determines the reception quality to be no good.

According to this arrangement, the receiver receives the first contents data and the second contents data in parallel. The reception quality determining section determines reception quality based on a comparison between the characteristic value measured by the reception quality measuring section and the threshold. The reproduced contents switching section causes the reproducing section to reproduce the first contents data if the reception quality is determined to be good, and the second contents data if the reception quality is determined to be no good.

Thus, when the first contents data cannot be modulated properly and the quality of videos or audios is disturbed abruptly, the receiver can reproduce the second contents data and therefore avoid troubles in viewing. Further, the receiver will not be required to individually send a retransmission request as in conventional receivers, and therefore allows for efficient use of the bidirectional channels.

According to the present invention, there is provided a receiver including: a receiving section for receiving a plurality of first contents data, and second contents data, using a dedicated forward link channel, the second contents data having contents of part of the first contents data and transmitted in a more error robust transmission mode than the first contents data; a contents designating section for designating one of the plurality of first contents data; a reception quality determining section for measuring a characteristic value corresponding to a receiving condition of the receiving section; a reception quality determining section for determining reception quality based on a comparison between the characteristic value measured by the reception quality measuring section and a predetermined threshold; a reproducing section for reproducing the plurality of first contents data or the second contents data; and a reproduced contents switching section for causing the reproducing section to reproduce (i) the first contents data designated by the contents designating section, if the reception quality determining section determines the reception quality to be good, (ii) the first contents data designated by the contents designating section, if the reception quality determining section determines the reception quality to be no good and if the receiving section has not received second contents data corresponding to the first contents data designated by the contents designating section, and (iii) second contents data corresponding to the first contents data designated by the contents designating section, if the reception quality determining section determines the reception quality to be no good and if the receiving section has received the second contents data designated by the contents designating section.

According to this arrangement, the receiver receives the plurality of first contents data parallel to second contents data corresponding to some of the first contents data.

The reception quality determining section determines reception quality based on a comparison between the characteristic value measured by the reception quality measuring section and the threshold. If the reception quality is determined to be good, the reproduced contents reproducing section causes the reproducing section to reproduce the first contents data. If the reception quality is determined to be no good and if there is second contents data corresponding to the first contents data designated by the contents designating section, the reproduced contents reproducing section causes the reproducing section to reproduce the second contents data.

Thus, when the first contents data cannot be modulated properly and the quality of videos or audios is disturbed, the receiver can reproduce the second contents data if it is available. This reduces the risk of causing troubles in viewing. Further, the receiver will not be required to frequently and individually send a retransmission request as in conventional receivers, and therefore allows for efficient use of the bidirectional channels.

According to the present invention, there is provided a receiver including: a first receiving section for receiving first contents data using a dedicated forward link channel; a second receiving section for receiving multicast second contents data having contents of the first contents data, using a channel different from the dedicated forward link channel; a reception quality measuring section for measuring a characteristic value corresponding to a receiving condition of the first receiving section; a reception quality determining section for determining reception quality based on a comparison between the characteristic value measured by the reception quality measuring section and a predetermined threshold; a reproducing section for reproducing the first contents data or the second contents data; and a reproduced contents switching section for causing the reproducing section to reproduce the first contents data if the reception quality determining section determines the reception quality to be good, and the second contents data if the reception quality determining section determines the reception quality to be no good.

According to the foregoing arrangement, the first receiving section receives the first contents data, and the second receiving section receives the second contents data. Since the first contents data and the second contents data are broadcast (distributed) on different channels, the probability of both the first contents data and the second contents data not being reproduced properly is significantly reduced by the diversity effect.

The reception quality determining section determines reception quality based on a comparison between the characteristic value measured by the reception quality measuring section and the threshold. The reproduced contents switching section causes the reproducing section to reproduce the first contents data if the reception quality is determined to be good, and the second contents data if the reception quality is determined to be not good.

Thus, when the first contents data cannot be modulated properly and the quality of videos or audios is disturbed, the receiver can reproduce the second contents data being multicast on a different channel. By the diversity effect, the risk of causing troubles in viewing is greatly reduced. Further, the receiver will be hardly required to individually send a retransmission request as in conventional receivers, and therefore allows for efficient use of the bidirectional channels.

According to the present invention, there is provided a receiver including: a first receiving section for receiving a plurality of first contents data using a dedicated forward link channel; a second receiving section for receiving multicast second contents data having contents of some of the first contents data, using a channel different from the dedicated forward link channel; a contents designating section for designating one of the plurality of first contents data; a reception quality measuring section for measuring a characteristic value corresponding to a receiving condition of the first receiving section; a reception quality determining section for determining reception quality based on a comparison between the characteristic value measured by the reception quality measuring section and a predetermined threshold; a reproducing section for reproducing the plurality of first contents data or the second contents data; and a reproduced contents switching section for causing the reproducing section to reproduce (i) the first contents data designated by the contents designating section, if the reception quality determining section determines the reception quality to be good, (ii) the first contents data designated by the contents designating section, if the reception quality determining section determines the reception quality to be no good and if the second receiving section has not received second contents data corresponding to the first contents data designated by the contents designating section, and (iii) second contents data corresponding to the first contents data designated by the contents designating section, if the reception quality determining section determines the reception quality to be no good and if the second receiving section has received the second contents data corresponding to the first contents data designated by the contents designating section.

Thus, when the first contents data cannot be modulated properly and the quality of videos or audios is disturbed abruptly, the receiver can reproduce the second contents data being multicast on a different channel, if it is available. By the diversity effect, the risk of causing troubles in viewing is reduced. Further, the receiver will not be required to frequently and individually send a retransmission request as in conventional receivers. This reduces the burden on the receiver, and allows for efficient use of the bidirectional channels.

Additional objects, features, and strengths of the present invention will be made clear by the description below. Further, the advantages of the present invention will be evident from the following explanation in reference to the drawings.

DESCRIPTION OF THE EMBODIMENTS

First Embodiment

Figure 1:
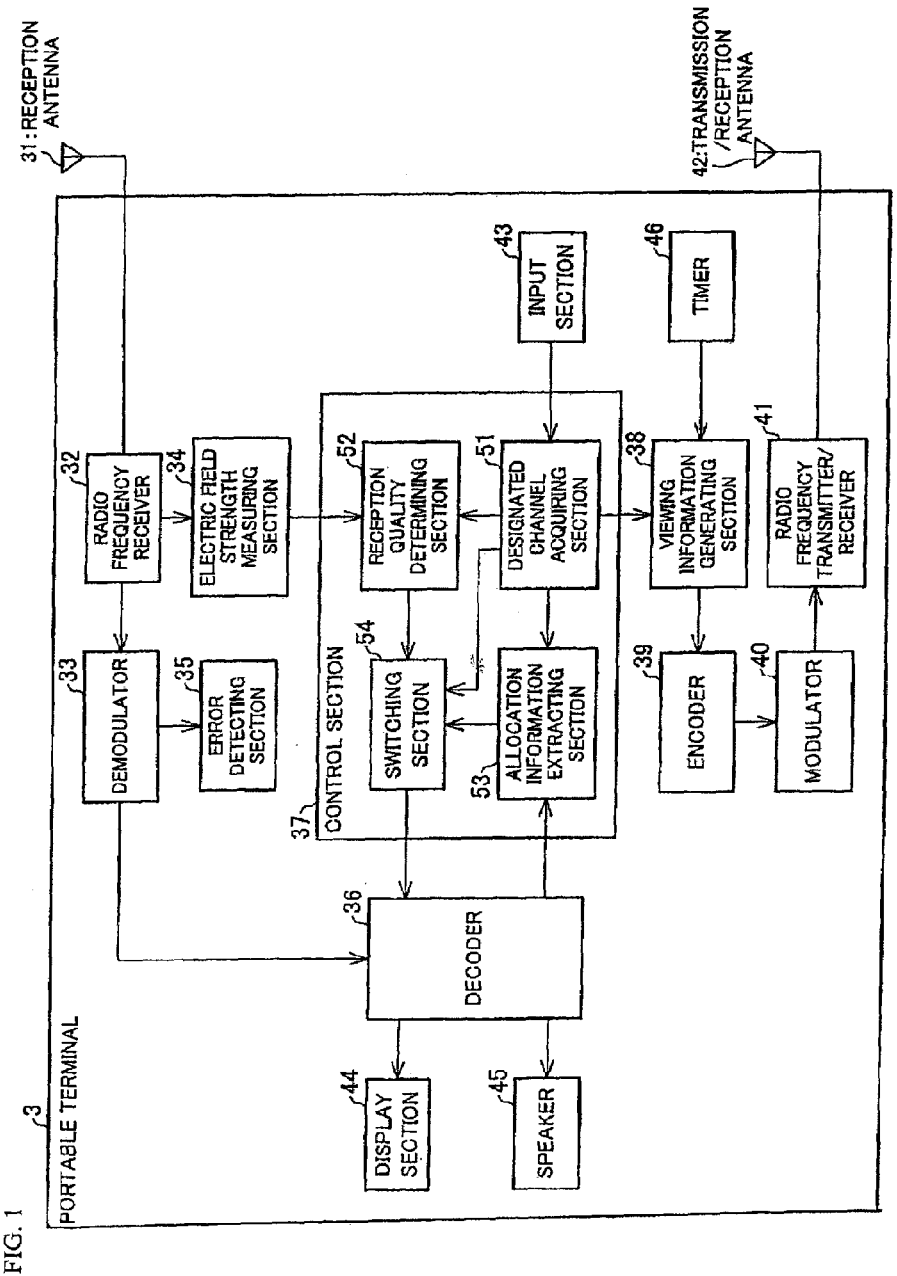
FIG. 1 is a block diagram illustrating a structure of a portable terminal according to a First Embodiment of the present invention.

The following will describe one embodiment of the present invention with reference to FIG. 1 through FIG. 13. FIG. 2 is a block diagram illustrating a structure of a broadcast system according to one embodiment of the present invention. As shown in FIG. 2, the broadcast system includes a broadcast control station (broadcast station, control station) 1, a plurality of broadcasting antennas 2, a plurality of portable terminals (receivers) 3, a plurality of base stations 4, a contents server 5, and a communications network N.

The broadcast control station 1 obtains broadcast data from the contents server 5, and broadcasts a corresponding broadcasting signal of the data from the broadcasting antennas 2 for terrestrial digital TV broadcasting. In the present embodiment, the broadcast control station 1 is described to control broadcasting in each broadcast area, using the plurality of broadcasting antennas 2 installed in each broadcast area. However, the present invention is not limited to such an implementation. For example, the broadcast control station 1 may be installed in each broadcast area, and control broadcasting in its broadcast area using a single broadcasting antenna 2. A structure of the broadcast control station 1 will be described later in more detail.

Figure 4:
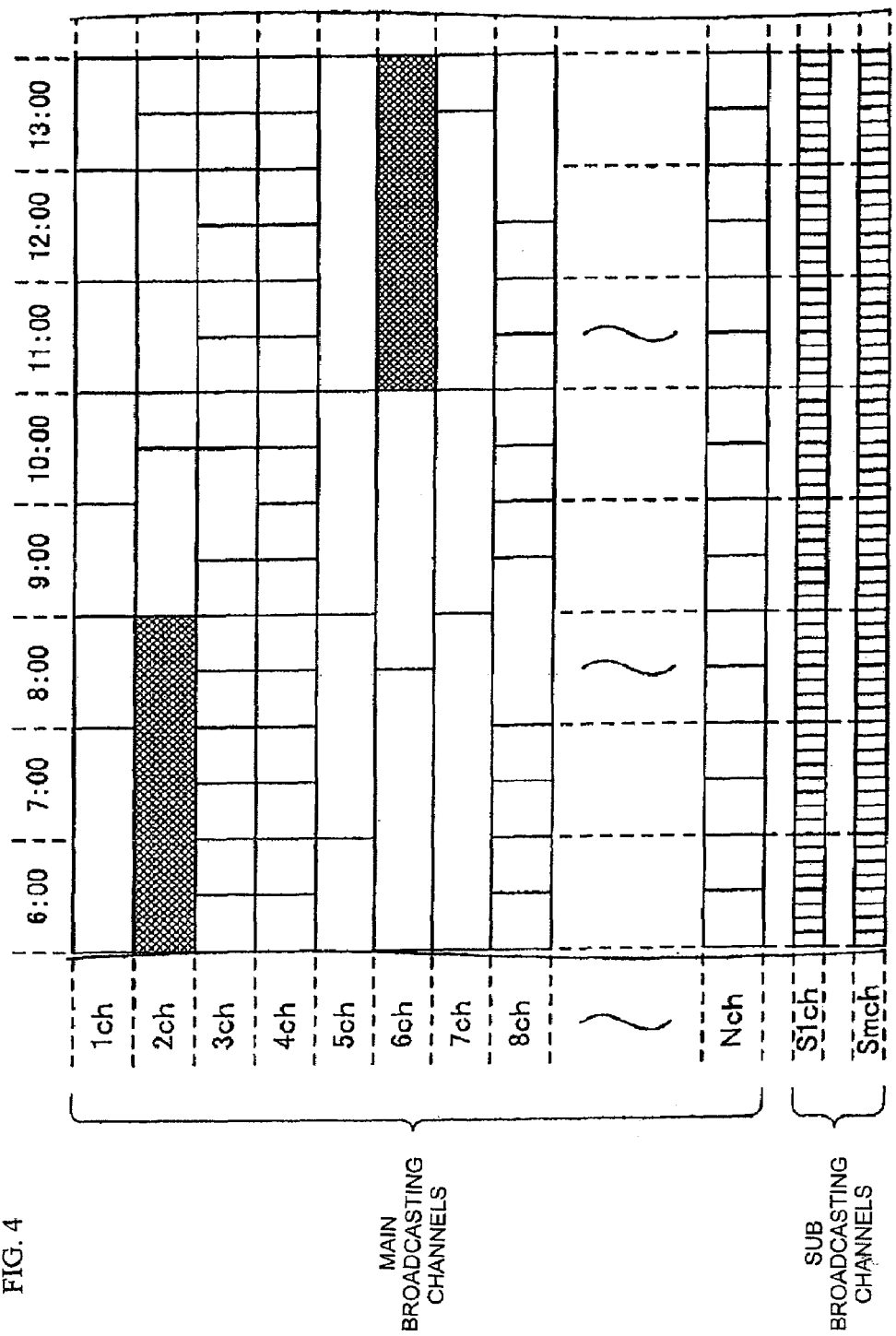
FIG. 4 is a view illustrating main broadcasting channels and sub broadcasting channels.

In the present embodiment, the broadcast control station 1 uses main broadcasting channels 1 ch to Nch, and sub broadcasting channels S1 ch to Smch (m<N in the present embodiment) for broadcasting, as shown in FIG. 4. It should be noted that FIG. 4 represents the channel structure only for illustrative purposes. As such, the channels may be divided based on frequencies or time.

On the main broadcasting channels, main broadcast data stored in the contents server 5 are broadcast in a transmission mode with a high transmission rate (weak error tolerance). The sub broadcasting channels are used to broadcast sub broadcast data, containing the same contents as the main broadcast data, in a transmission mode with a stronger error tolerance than the main broadcasting channels.

The transmission mode is specified by the modulation rate such as BPSK, QPSK, and 16QAM, and the error correction coding rate (simply "coding rate" hereinafter). The coding rate is generally represented by fractions such as ½, ⅓, ⅔, and so on, and the error tolerance increases with a decrease in the coding rate. That is, the coding rate is directly proportional to the transmission rate.

As used herein, the "transmission mode with a strong error tolerance" refers to the transmission mode in which the level of required reception quality is low. The error tolerance of the transmission mode can be controlled by the modulation rate and the coding rate. For example, given the same coding rate, the error tolerance can be increased by decreasing the modulation rate. On the other hand, given the same modulation rate, the error tolerance can be increased by decreasing the coding rate. Further, an even stronger error tolerance can be obtained by decreasing both the modulation rate and the coding rate. Even with a high coding rate, the error tolerance can be increased by decreasing the modulation rate so as to compensate for the high coding rate. Likewise, even when the modulation rate is high, the error tolerance can be increased by decreasing the coding rate so as to compensate for the high modulation rate.

In the following, the sub broadcast data will be described as having a lower modulation rate than (but the same coding rate as) the main broadcast data. However, the sub broadcast data may have a lower coding rate than the main broadcast data, or lower modulation rate and coding rate than the main broadcast data.

In this way, the sub broadcast data broadcast on the sub broadcasting channels can be demodulated more properly than main broadcast data by the portable terminals 3.

It should be noted that, in the present embodiment, the sub broadcast data have a lower resolution and a lower frame rate than the main broadcast data, in order to provide a smaller band for the sub broadcasting channels than for the main broadcasting channels.

The broadcasting antennas 2 are provided for each broadcast area. The broadcasting antennas 2 are not particularly limited as long as they can output broadcast waves over 360° angle. Further, the broadcasting antennas 2 may be adapted to output broadcast waves only in certain directions. In this case, the broadcast antennas 2 may be installed at the same location or different locations.

The portable terminals 3 receive broadcast signals transmitted from the broadcasting antennas 2, and reproduce the received broadcast signals. The portable terminals 3 are portable phones, PDA, or portable televisions, for example. Depending on the strength of the electric field of the received signals, the portable terminals 3 select either the main broadcast data broadcast on the main broadcasting channels, or sub broadcast data broadcast on the sub broadcasting channels, so as to reproduce the received data. Further, the portable terminals 3 transmit viewing information to the broadcast control station 1, the viewing information being indicative of a main broadcasting channel designated by a user (designated channel). A structure of the portable terminals 3 will be described later in more detail.

By using bidirectional channels, the base stations 4 communicate with the portable terminals 3 residing in the areas of the base stations 4. The base stations 4 relay the data exchanged between the portable terminals 3 and the broadcast control station 1.

The contents server 5 stores, on a channel basis, main broadcast data of programs to be broadcast on the main broadcasting channels.

Figure 3:
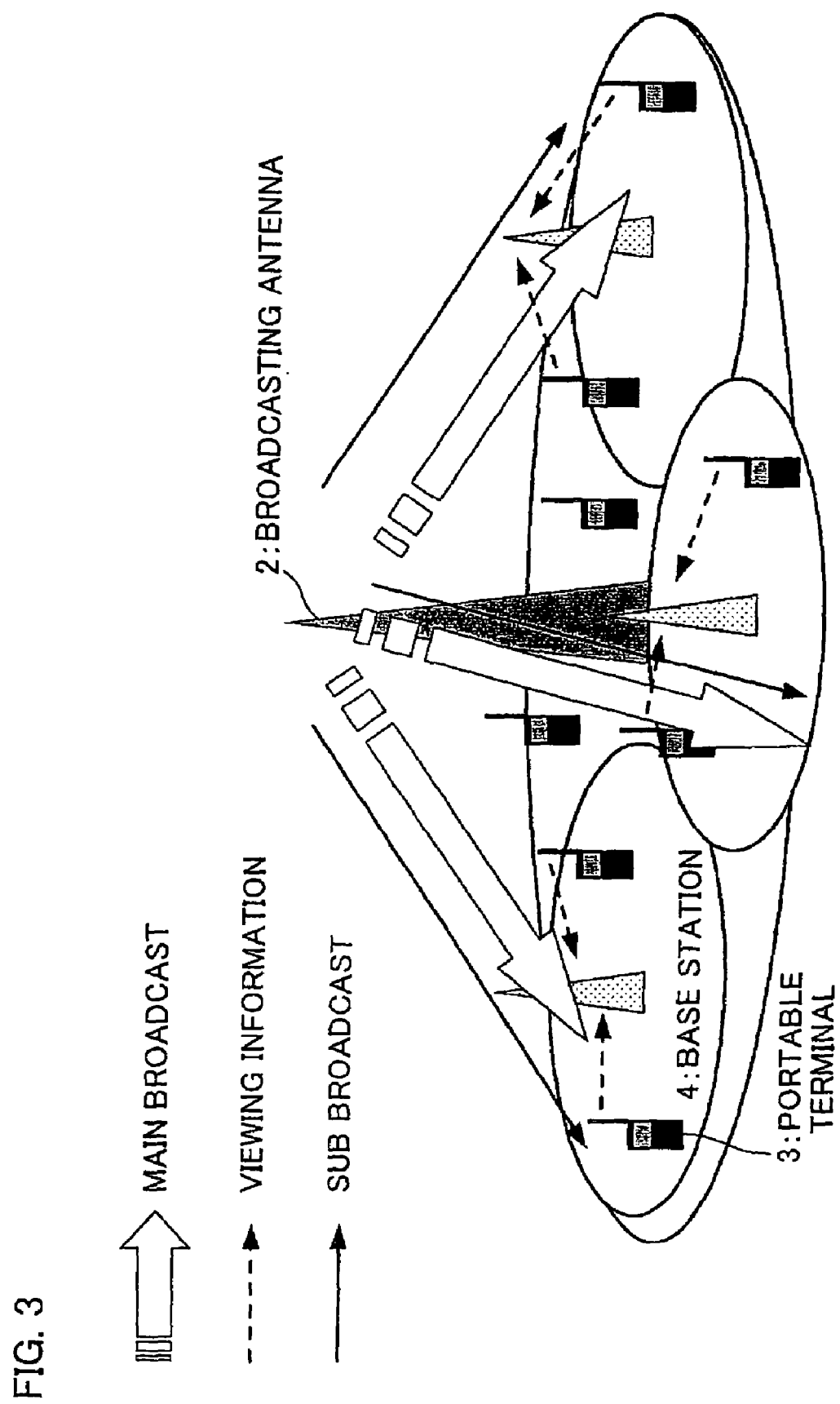
FIG. 3 is a view showing flows of a broadcast signal and viewing information in the broadcast system.

FIG. 3 shows a flow of broadcast signals and viewing information in the broadcast system of the present embodiment. As shown in FIG. 3, the main broadcast data and sub broadcast data are broadcast via the broadcasting antennas 2. Each portable terminal 3 sends viewing information to the broadcast control station 1 via the base station 4 installed in the area where the portable terminal 3 belongs.

(Structure of the Broadcast Control Station)

Figure 5:
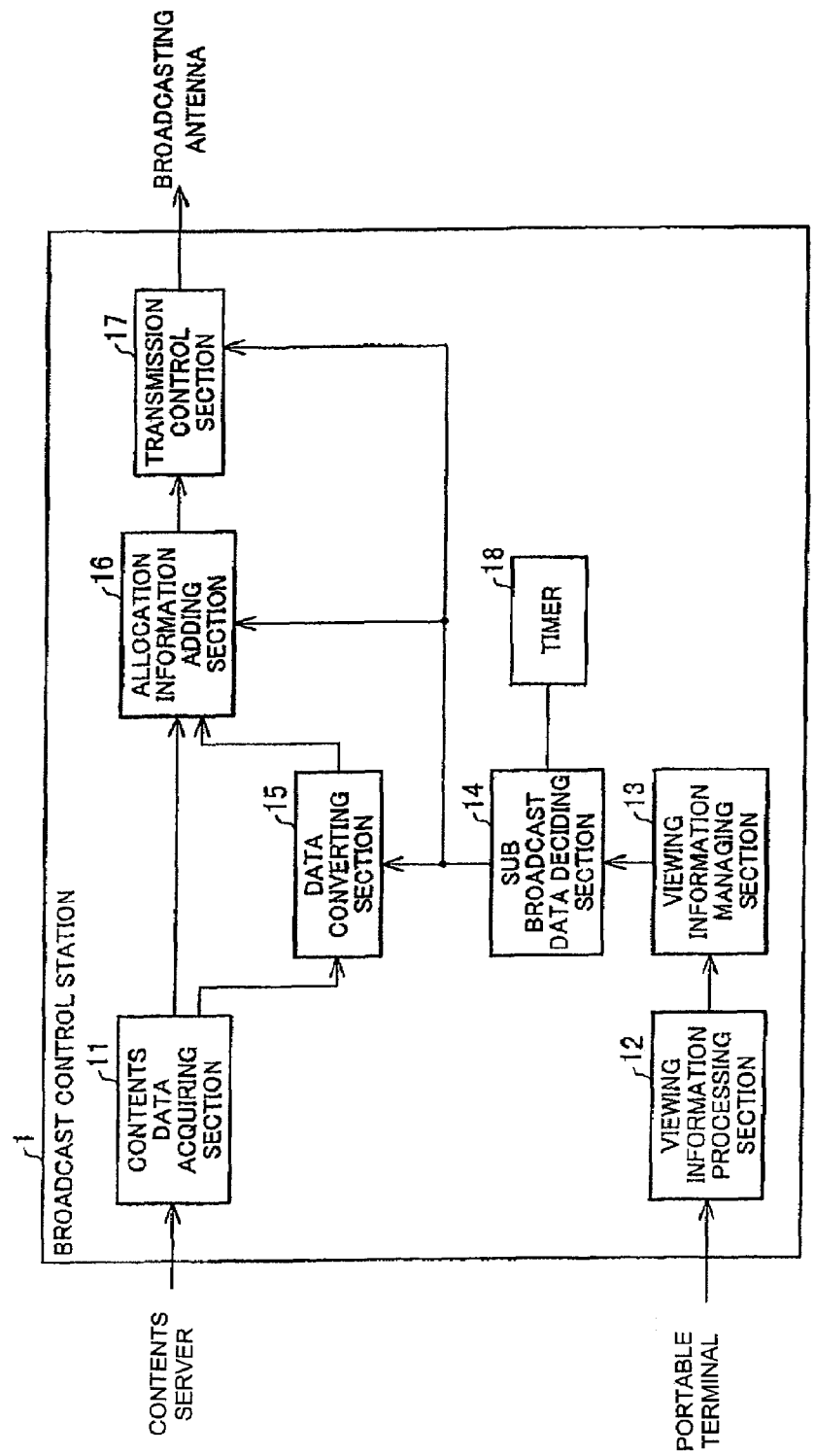
FIG. 5 is a block diagram illustrating a structure of a broadcast control station according to the First Embodiment of the present invention.

The following will describe an internal structure of the broadcast control station 1. FIG. 5 is a block diagram illustrating a structure of the broadcast control station 1. As shown in FIG. 5, the broadcast control station 1 includes a contents data acquiring section 11, a viewing information processing section (designated contents information acquiring means) 12, a viewing information managing section 13, a sub broadcast data deciding section (selecting means) 14, a data converting section (second contents data acquiring/generating means) 15, an allocation information adding section 16, a transmission control section (transmission control means) 17, and a timer 18.

The contents data acquiring section 11 acquires main broadcast data of programs to be broadcast on each main broadcasting channel. The data are acquired from the contents server 5 via the communications network N. The contents data acquiring section 11 outputs the acquired main broadcast data to the data converting section 15 and the allocation information adding section 16.

The viewing information processing section 12 acquires viewing information from each portable terminal 3 via the communications network N, and performs a predetermined process based on the acquired viewing information. As used herein, the viewing information refers to information indicative of the main broadcasting channel designated (set) by a user (designated channel).

The viewing information processing section 12 stores the acquired viewing information in the viewing information managing section 13 by associating it with the time of acquisition.

The viewing information managing section 13 manages the viewing information in relation to the acquisition time. The viewing information managing section 13 deletes viewing information corresponding to the acquisition time that precedes the current time by a predetermined amount of time. In this way, the viewing information managing section 13 can manage the frequency distribution of main broadcasting channels that were turned in during this predetermined time period.

Based on the viewing information managed by the viewing information managing section 13, the sub broadcast data deciding section 14 determines sub broadcast data to be broadcast on each sub broadcasting channel. The sub broadcast data deciding section 14 performs this process at predetermined time intervals (for example, 5 minute intervals), referring to the timer 18.

More specifically, based on the viewing information managed by the viewing information managing section 13, the number of items of viewing information (corresponding to the number of viewers) representing the main broadcasting channels is counted for each main broadcasting channel by the sub broadcast data deciding section 14. The sub broadcast data deciding section 14 then specifies the number m of main broadcasting channels with the greatest number of viewers. Based on these results, the sub broadcast data deciding section 14 decides that the contents of the main broadcast data being broadcast on these m main broadcasting channels is also to be broadcast as sub broadcast data on the sub broadcast channels at a lower modulation rate. Note that, the sub broadcast data deciding section 14 may decide to broadcast sub broadcast data according to the order of the main broadcast channels with the greatest number of viewers without using the timer 18, whenever there is a change in the order of these main broadcast channels.

The sub broadcasting channels used to broadcast the sub broadcast data are randomly selected by the sub broadcast data deciding section 14. It should be noted however that the sub broadcast data deciding section 14 decides to use the previously used sub broadcasting channels for the broadcasting of sub broadcast data corresponding to the main broadcasting channels that were also used for the previous sub broadcasting.

For each sub broadcast data to be broadcast on the sub broadcasting channels, the sub broadcast data deciding section 14 sends sub broadcast information to the data converting section 15, the allocation information adding section 16, and the transmission control section 17. The sub broadcast information is information in which the main broadcasting channel corresponding to the sub broadcast data is associated with the sub broadcasting channel used to broadcast the sub broadcast data.

The data converting section 15 performs the process of converting main broadcast data into sub broadcast data. Specifically, among the main broadcast data sent from the contents data acquiring section 11, those corresponding to the main broadcasting channels represented by the sub broadcast information sent from the sub broadcast data deciding section 14 are converted into sub broadcast data.

Figure 6:
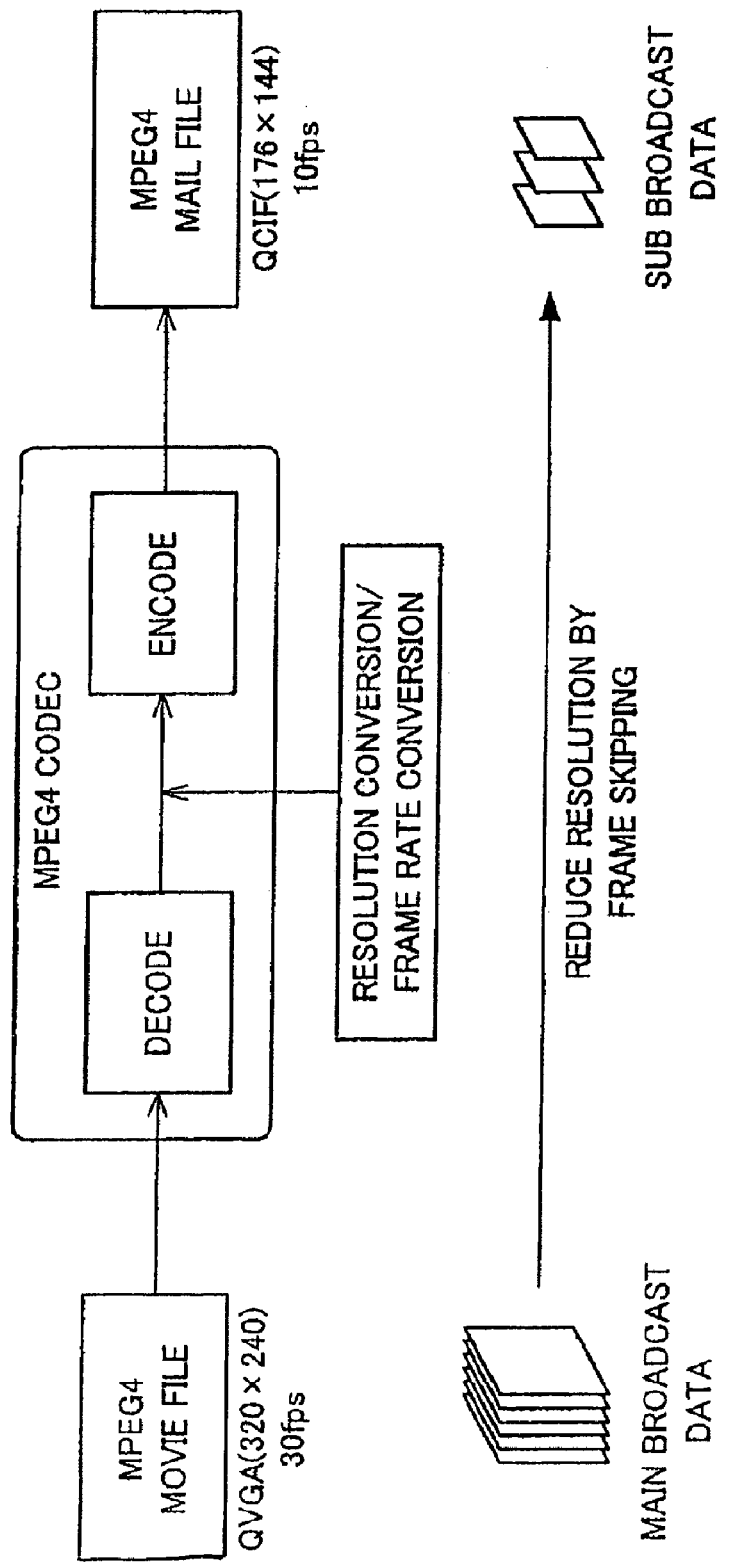
FIG. 6 is a view showing a data conversion process in a data converting section provided in the broadcast control station.

FIG. 6 shows the process of data conversion performed by the data converting section 15. The data converting section 15 performs data conversion according to the transcoding technique. As shown in FIG. 6, the data converting section 15 decodes the main broadcast data in the form of, for example, an MPEG4 movie file. Then, the data converting section 15 converts the decoded main broadcast data to reduce the resolution and frame rate. The resulting data are then encoded by the data converting section 15 to generate sub broadcast data in the form of, for example, an MPEG4 movie file.

The allocation information adding section 16 adds allocation information, indicative of the channel structure, to each broadcast data. Specifically, to each main broadcast data, the allocation information adding section 16 adds allocation information which indicates main broadcasting channels to be broadcast, the presence or absence of sub broadcast data, sub broadcast channels used for sub broadcasting, and modulation rate. To each sub broadcast data generated by the data converting section 15, the allocation information adding section 16 adds allocation information which indicates sub broadcasting channels used for broadcasting, and modulation rate.

Specifically, the allocation information adding section 16 adds sub broadcast presence/absence information, which indicates that there will be sub broadcasting, and sub broadcast channel information, which indicates the sub broadcasting channel represented by the sub broadcast information, to the main broadcast data corresponding to the main broadcasting channel indicated by the sub broadcast information sent from the sub broadcast data deciding section 14.

Further, the allocation information adding section 16 adds sub broadcast presence/absence information, which indicates that there will be no sub broadcasting, and sub broadcast channel information, which indicates the absence of sub broadcasting channels, to the main broadcast data corresponding to the main broadcasting channel other than those indicated by the sub broadcast information sent from the sub broadcast data deciding section 14. The sub broadcast presence/absence information and the sub broadcast channel information are both allocation information.

The sub broadcast presence/absence information indicates "1" if there is sub broadcasting, and "0" if there is no sub broadcasting.

The main broadcast data and sub broadcast data with the allocation information are broadcast on their respective channels by the transmission control section 17. The transmission control section 17 broadcasts the main broadcast data at a relatively high modulation rate (for example, 16QAM or 64QAM). The transmission control section 17 transmits the sub broadcast data at a lower modulation rate QPSK than the main broadcast data.

Figure 7:
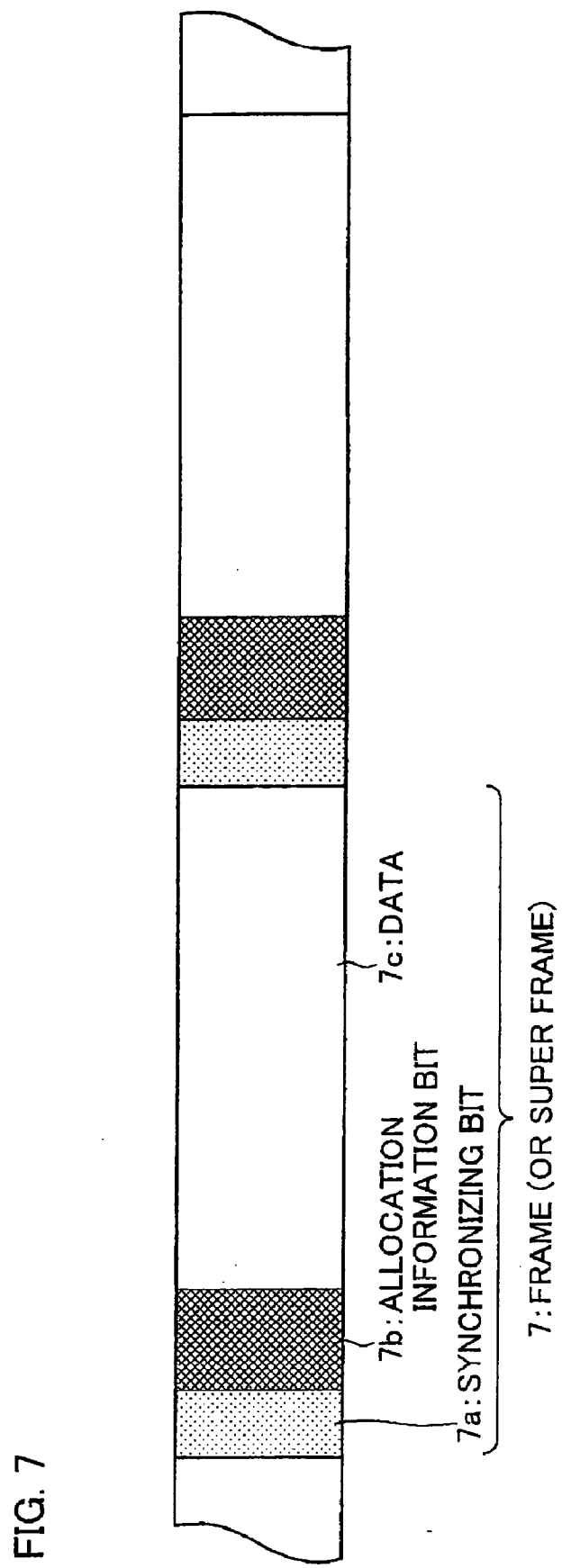
FIG. 7 is a view illustrating a frame structure of main broadcast data according to the First Embodiment of the present invention.

FIG. 7 illustrates a structure of a frame corresponding to the main broadcast data transmitted by the transmission control section 17. As shown in FIG. 7, a frame 7 includes a synchronizing bit 7a, an allocation information bit 7b, and a data part 7c.

The synchronizing bit 7a is a known fixed bit for synchronization. With the synchronizing bit 7a, the receiver can measure signal intensity, reception quality, or other parameters. The allocation information bit 7b is indicative of the allocation information (main broadcasting channels, the presence/absence of a sub broadcast, sub broadcasting channels, and modulation rate) added by the allocation information adding section 16. The data part 7c indicates contents data.

(Structure of the Portable Terminal)

Figure 2:
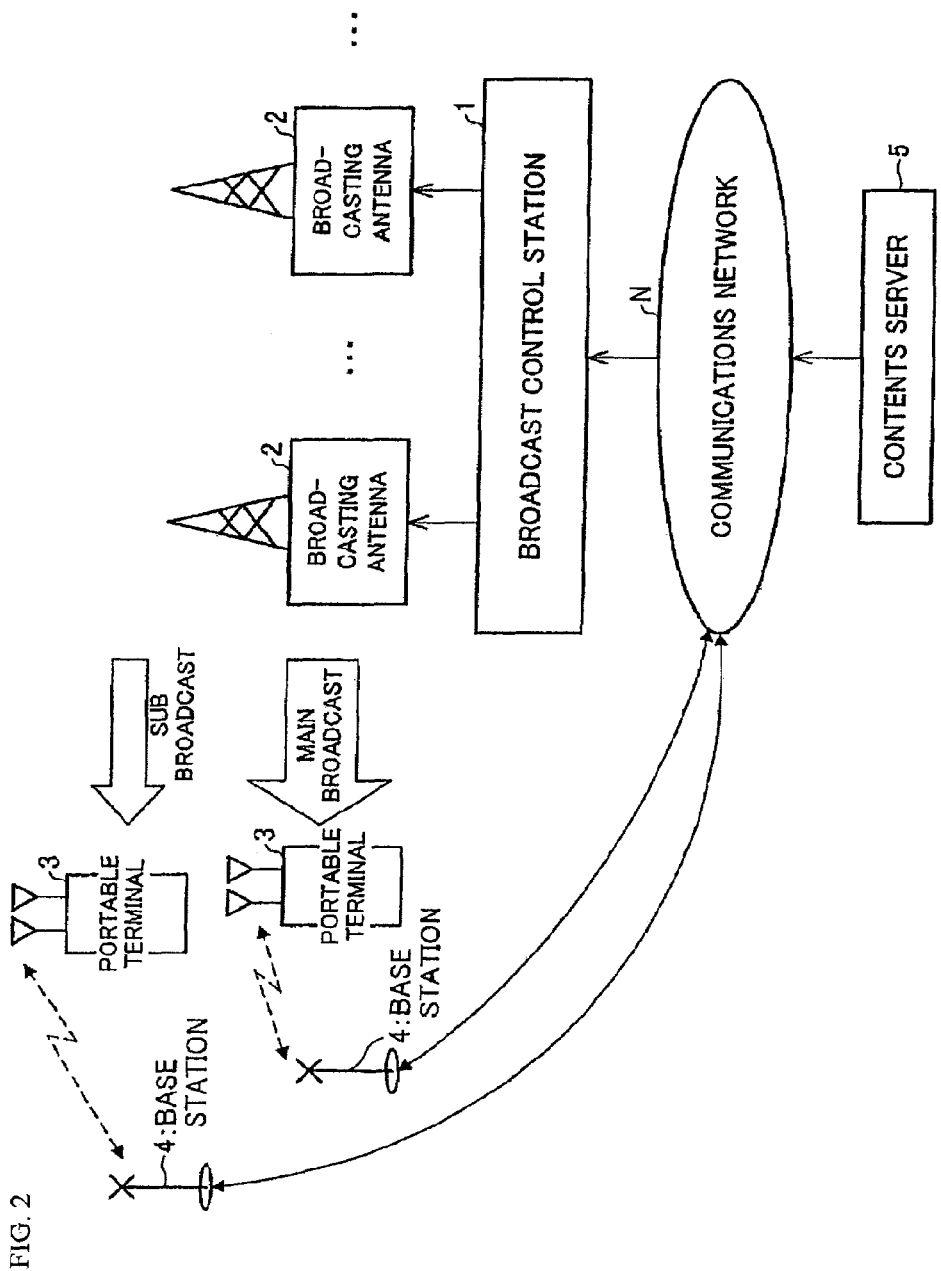
FIG. 2 is a block diagram schematizing a broadcast system according to the First Embodiment of the present invention.

FIG. 1 is a block diagram illustrating a structure of the portable terminal 3. As shown in FIG. 1, the portable terminal 3 includes a reception antenna (receiving means, first receiving means) 31, a radio frequency receiver (receiving means, first receiving means) 32, a demodulator (receiving means, first receiving means) 33, an electric field strength measuring section (reception quality measuring means) 34, an error detecting section (reception quality measuring means) 35, a decoder (reproducing means) 36, a control section 37, a viewing information generating section 38, an encoder 39, a modulator (transmitting means) 40, a radio frequency transmitter/receiver (transmitting means) 41, a transmission/reception antenna (transmitting means) 42, an input section (contents designating means) 43, a display section (reproducing means) 44, and a speaker (reproducing means) 45.

The radio frequency receiver 32 is used to receive, via the reception antenna 31, a broadcast signal (broadcast wave) transmitted from the broadcasting antennas 2.

The demodulator 33 demodulates the signal received by the radio frequency receiver 32.

The electric field strength measuring section 34 measures the electric field strength of the signal received by the radio frequency receiver 32, and outputs the measured electric field strength to the control section 37.

The error detecting section 35 detects an error in the received signal demodulated by the demodulator 33, and measures an S/N ratio of the received signal.

The decoder 36 decodes the demodulated received signal of the demodulator 33 into video data and audio data, and outputs the decoded data to the display section 44 and the speaker 45. It should be noted here that the decoder 36 decodes the received signal corresponding to the channels specified in the control section 37. Further, the decoder 36 extracts allocation information from the received signal, and outputs it to the control section 37.

The control section 37 is used to control the channels of the received signal decoded by the decoder 36. As shown in FIG. 1, the decoder 37 includes a designated channel acquiring section (contents designating means) 51, a reception quality determining section (reception quality determining means) 52, an allocation information extracting section 53, and a switching section (reproduced contents switching means) 54.

The designated channel acquiring section 51 acquires designated channel information from the input section 43. The designated channel information indicates the main broadcasting channel designated by a user ("designated channel" hereinafter). The designated channel acquiring section 51 outputs the acquired designated channel information to the allocation information extracting section 53 and the switching section 54. Further, the designated channel acquiring section 51 transmits the designated channel of the acquired designated channel information to the viewing information generating section 38.

The reception quality determining section 52 determines whether the electric field strength sent from the electric field measuring section 34 is at or above a predetermined threshold of required quality, and outputs the result (result of quality judgment) to the switching section 54. Here, the threshold of required quality is the electric field strength at which image quality deteriorates abruptly according to the cliff effect in digital broadcasting. The result of quality judgment indicates "0" if the electric field strength is at or above the required quality threshold, and "1", if the electric field strength is below the required quality threshold.

From the decoder 36, the allocation information extracting section 53 acquires the allocation information added to the main broadcast data corresponding to the designated channel represented by the designated channel information sent from the designated channel acquiring section 51. The allocation information extracting section 53 then outputs the acquired allocation information to the switching section 54.

The switching section 54 switches channels of the data which the decoder section 36 outputs to the display section 44 and the speaker 45, based on the result of judgment from the reception quality determining section 52, and the allocation information (sub broadcast presence/absence information, sub broadcast channel information) sent from the allocation information extracting section 53. That is, the switching section 54 decides which data (video data or audio data) of which channel is to be output to the display section 44 and the speaker 45.

Specifically, if the result of quality judgment and the sub broadcast presence/absence information are both "1," the decoder 36 is controlled such that the data decoded from the sub broadcast data of the sub broadcasting channels represented by the sub broadcast channel information sent from the allocation information extracting section 53 are outputted to the display section 44 and the speaker 45.

If this condition is not met, the switching section 54 controls the decoder 36 such that the data decoded from the main broadcast data of the main broadcasting channels represented by the designated channel sent from the designated channel acquiring section 51 are outputted to the display section 44 and the speaker 45.

The viewing information generating section 38, referring to the timer 46, generates viewing information indicative of the designated channel transmitted from the designated channel acquiring section 51. This is performed at predetermined time intervals (for example, 500 ms intervals).

The encoder 39 encodes the viewing information generated by the viewing information generating section 39.

The modulator 40 modulates the viewing information sent from the encoder 39, and demodulates the signal received by the radio frequency transmitter/receiver 41.

The viewing information modulated by the modulator 40 is transmitted by the radio frequency transmitter/receiver 41 to the broadcast control section 1 via the transmission/reception antenna 42 and the communications network N. Further, the radio frequency transmitter/receiver 41 receives signals using the broadcast antenna 42.

The input section 43 is a user interface, for example, such as keys and a touch panel. The display section 44 is a liquid crystal display, for example.

(Transmission Process of the Viewing Information)

Figure 8:
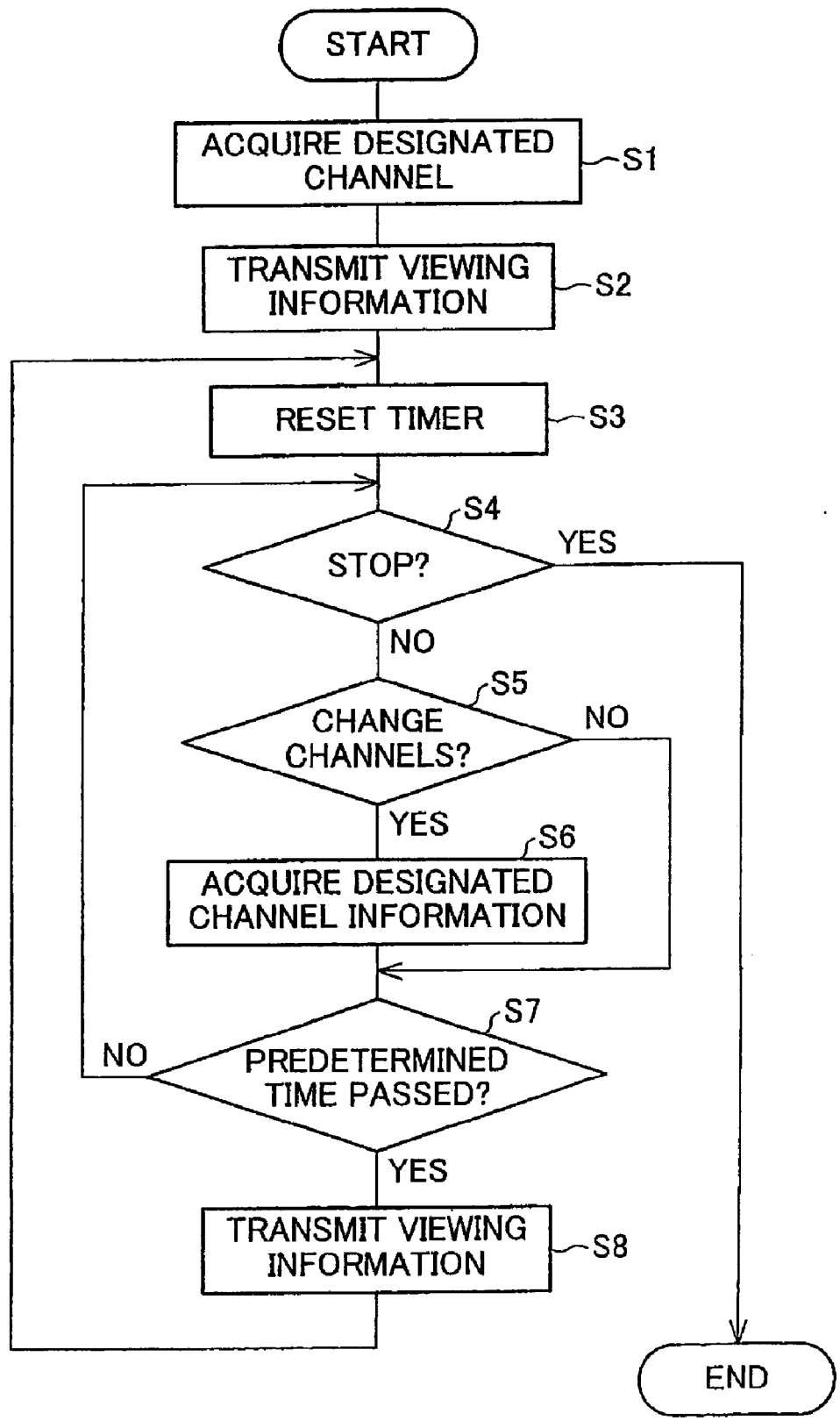
FIG. 8 is a view showing a flow of a transmission process of viewing information in a portable terminal.

Referring to the flowchart of FIG. 8, the following will describe a transmission process of the viewing information in the portable terminal 3.

First, by being instructed to start reception of terrestrial digital TV broadcasts and with the input of a designated channel through the input section 43, the designated channel acquiring section 51 of the portable terminal 3 acquires the designated channel information indicative of the designated channel entered through the input section 43. The designated channel acquiring section 51 then transmits the designated channel indicated by the acquired designated channel information to the viewing information generating section 38 (S1).

The viewing information generating section 38 generates viewing information indicative of the designated channel transmitted from the designated channel acquiring section 51. The encoder 39 encodes the viewing information, and the modulator 40 modulates the encoded viewing information. The radio frequency transmitter/receiver 41 sends the modulated viewing information to the broadcast control station 1 via the transmission/reception antenna 42 and the communications network N (S2).

In S3, the viewing information generating section 38 resets the timer 46. In S4, the control section 37 determines whether the input section 43 has received an instruction for stopping reception of the terrestrial digital TV broadcasts.

If there is an instruction for stopping reception (Yes in S4), the control section 37 ends the process.

Further, if there is no instruction for stopping reception (No in S4), the designated channel acquiring section 51 determines whether the input section 43 has received an instruction for changing the designated channel (S5).

If these is no instruction for changing the designated channel (No in S5), the sequence goes to S7.

On the other hand, if there is an instruction for changing the designated channel (Yes in S5), the designated channel acquiring section 51 acquires, from the input section 43, the designated channel information indicating the new designated channel. The designated channel acquiring section 51 then sends the designated channel indicated by the acquired designated channel information to the viewing information generating section 38 (S6).

In S7, the viewing information generating section 38 determines, referring to the timer 46, whether a predetermined time (for example, 500 ms) has passed.

If a predetermined time has not passed (No in S7), the sequence returns to S4.

On the other hand, if a predetermined time has been passed (Yes in S7), the viewing information generating section 38 generates viewing information indicative of the latest designated channel transmitted from the designated channel acquiring section 51. The encoder 39 encodes the viewing information, and the modulator 40 modulates the encoded viewing information. The modulated viewing information is transmitted by the radio frequency transmitter/receiver 41 to the broadcast control station 1 via the transmission/reception antenna 42 and the communications network N (S8), and the sequence returns to S3.

According to these procedures, the viewing information generating section 38 transmits the viewing information, indicative the main broadcasting channel (designated channel) currently designated by a user, to the broadcast control station 1 at predetermined time intervals.

(A Process of Deciding Sub Broadcast Data)

Figure 9:
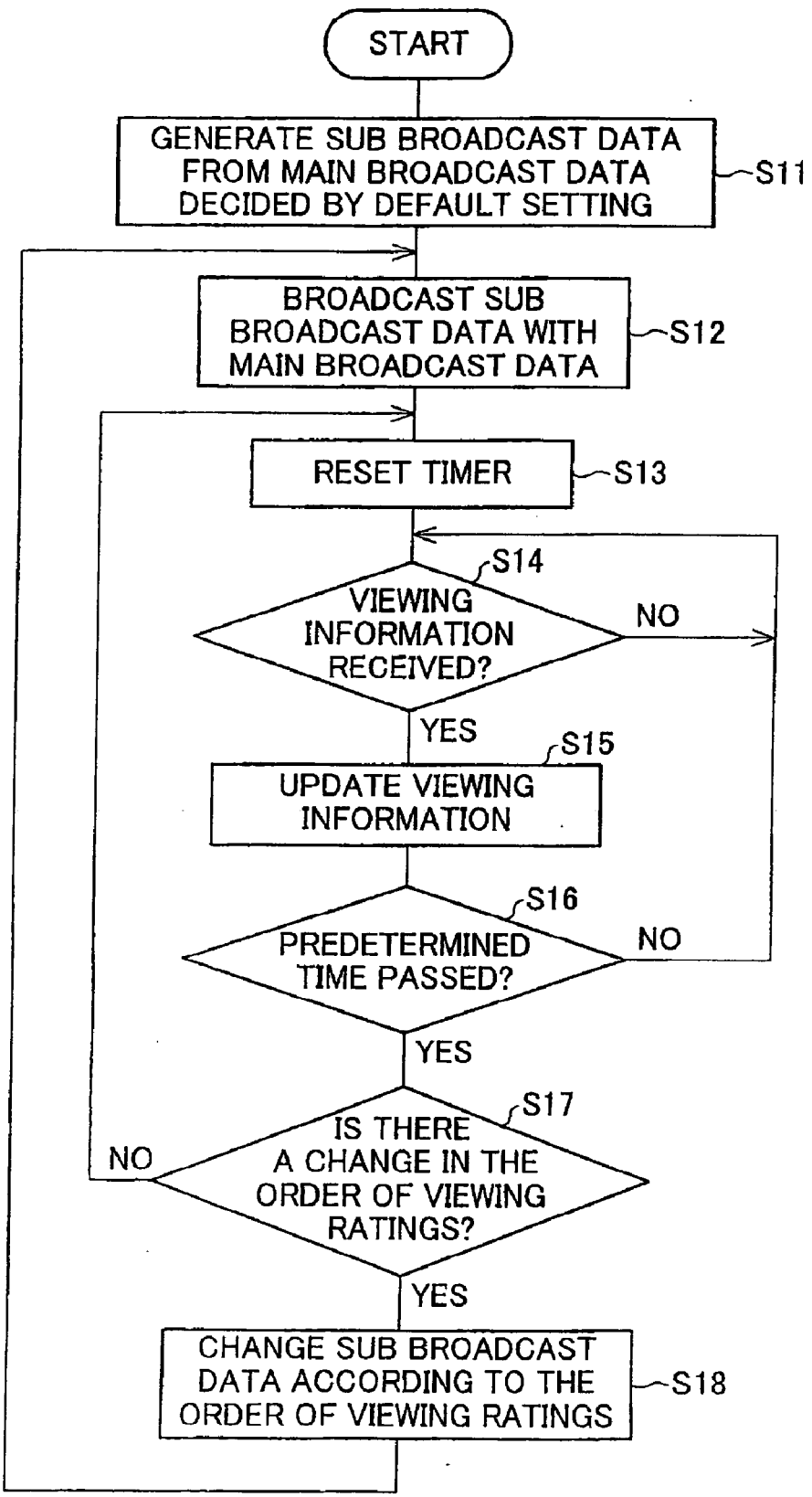
FIG. 9 is a flowchart showing a flow of a process for deciding sub broadcast data in the broadcast control station.

Referring to the flowchart of FIG. 9, the following will describe a process flow of deciding sub broadcast data in the broadcast control station 1.

First, in S11, the sub broadcast data deciding section 14 of the broadcast control station 1 decides to broadcast sub broadcast data on the sub broadcasting channels (S1Ch through SmCh) and with the same contents as the main broadcast data broadcast on the initially set m numbers of main broadcasting channels (for example, 1Ch through mCh). For each sub broadcast data to be broadcast on the sub broadcasting channels, the sub broadcast data deciding section 14 outputs sub broadcast information to the data converting section 15, the allocation information adding section 16, and the transmission control section 17. In the sub broadcast information, the main broadcasting channel corresponding to the sub broadcast data is associated with the sub broadcasting channel to be used to broadcast the sub broadcast data.

From the main broadcast data acquired by the contents data acquiring section 11, the data converting section 15 extracts main broadcast data corresponding to the main broadcasting channels indicated by the sub broadcast information sent from the sub broadcast data deciding section 14. The extracted main broadcast data are converted by the data converting section 15 to sub broadcast data, as shown in FIG. 6.

According to the sub broadcast information sent from the sub broadcast data deciding section 14, the allocation information adding section 16 adds sub broadcast presence/absence information and sub broadcast channel information to each main broadcast data.

The main broadcast data sent from the allocation information adding section 16, and the sub broadcast data sent from the data converting section 15 are broadcast by the transmission control section 17, using the broadcasting antennas 2 (S12).

The transmission control section 17 broadcasts the main broadcast data on predetermined main broadcasting channels. As to the sub broadcast data, the transmission control section 17 broadcasts each sub broadcast data on the sub broadcasting channel decided by the sub broadcast data deciding section 14.

The transmission control section 17 transmits the sub broadcast data in a transmission mode with a stronger error tolerance than the main broadcast data (here, at a lower modulation rate (for example, QPSK)).

In S13, the sub broadcast data deciding section 14 resets the timer 18. In S14, the viewing information processing section 12 decides whether the viewing information has been acquired from the portable terminal 3.

If the viewing information has not been acquired (No in S14), the viewing information processing section 12 repeats the process of S14.

On the other hand, if the viewing information has been acquired (Yes in S14), the viewing information processing section 12 stores the acquired viewing information in the viewing information managing section 13 by associating it with the time of acquisition (S15).

The viewing information managing section 13 deletes viewing information corresponding to an acquisition time that precedes the current time by a predetermined amount of time.

In S16, the sub broadcast data deciding section 14 decides whether a predetermined time (for example, 5 minutes) has been passed, by referring to the timer 18. If a predetermined time has not been passed (No in S16), the sequence returns to S14.

On the other hand, if a predetermined time has been passed (Yes in S16), the sub broadcast data deciding section 14, based on the viewing information managed by the viewing information managing section 13, specifies the first m main broadcasting channels with the greatest number of viewers. The sub broadcast data deciding section 14 then decides whether the combination of main broadcasting channels so specified is different from the combination of main broadcasting channels corresponding to the contents allocated to the previously re-broadcast channels (S17). That is, the sub broadcast data deciding section 14 determines whether there has been any change in the combination of the first m main broadcasting channels that are arranged according to the number of viewers.

If the combination of the first m main broadcasting channels has not been changed (No in S17), the sequence returns to S13.

On the other hand, if the combination of the first m main broadcasting channels has been changed (Yes in S17), the sub broadcast data deciding section 14 decides to broadcast sub broadcast data on the sub broadcasting channels at a lower modulation rate and with the same contents as the main broadcast data broadcast on the newly specified first m main broadcasting channels (S18).

Here, the sub broadcast data deciding section 14 decides to use the previously used sub broadcasting channels for the broadcasting of sub broadcast data corresponding to the main broadcasting channels that were also used for the previous sub broadcasting. As to the sub broadcast data corresponding to the main broadcast channels which were not used in the previous sub broadcasting, the sub broadcast data deciding section 14 randomly selects sub broadcasting channels from the remaining sub broadcasting channels.

For each sub broadcast data to be broadcast on the sub broadcasting channels, the sub broadcast data deciding section 14 outputs sub broadcast information to the data converting section 15, the allocation information adding section 16, and the transmission control section 17. In the sub broadcast information, the main broadcasting channels corresponding to the sub broadcast data are associated with the sub broadcasting channels to be used for the broadcasting of the sub broadcast data.

The main broadcast data corresponding to the main broadcasting channels indicated by the sub broadcast information sent from the sub broadcast data deciding section 14 is converted into sub broadcast data by the data converting section 15, as shown in FIG. 6. According to the sub broadcast information sent from the sub broadcast data deciding section 14, the allocation information adding section 16 adds sub broadcast presence/absence information and sub broadcasting channel information to each main broadcast data.

After these procedures, the sequence returns to S12.

In the manner described above, the sub broadcast data deciding section 14 determines the number of viewers in each main broadcasting channel based on the viewing information sent from the portable terminals 3. By using the sub broadcasting channels S-1Ch to mCh, the sub broadcast data deciding section 14 decides to broadcast sub broadcast data with the same contents as the main broadcast data broadcast on the first m main broadcasting channels with the greatest number of viewers. Note that, the sub broadcast data to be broadcast is decided by the sub broadcast data deciding section 14 at predetermined time intervals (for example, every 5 minutes).

Figure 10:
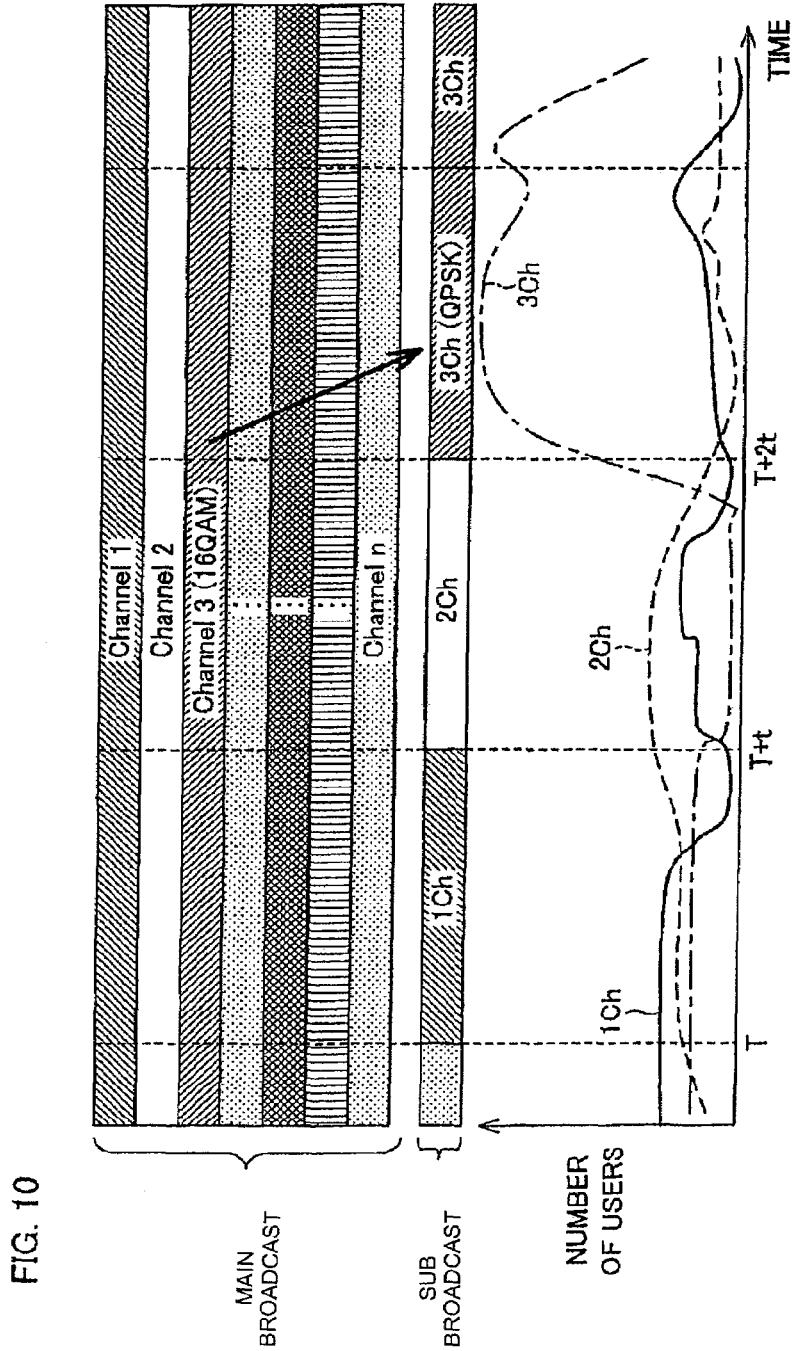
FIG. 10 is a view illustrating an exemplary process of deciding sub broadcast data.

FIG. 10 is a time chart representing the process performed by the sub broadcast data deciding section 14. In FIG. 10, m=1. As shown in FIG. 10, the sub broadcast data deciding section 14, at time T, decides to broadcast sub broadcast data on sub broadcasting channel S1Ch, with the same contents as the main broadcast data being broadcast on main broadcasting channel 1Ch with the greatest number of viewers.

In the same manner, at time T+t after a predetermined time t, the sub broadcast data deciding section 14 decides to broadcast sub broadcast data on sub broadcasting channel S1Ch, with the same contents as the main broadcast data being broadcast on main broadcasting channel 2Ch with the greatest number of viewers. Further, at time T+2t after a predetermined time t, the sub broadcast data deciding section 14 decides to broadcast sub broadcast data on sub broadcasting channel S1Ch, with the same contents as the main broadcast data being broadcast on main broadcasting channel 3Ch with the greatest number of viewers.

(Switching of Main Broadcasts and Sub Broadcasts)

Figure 11:
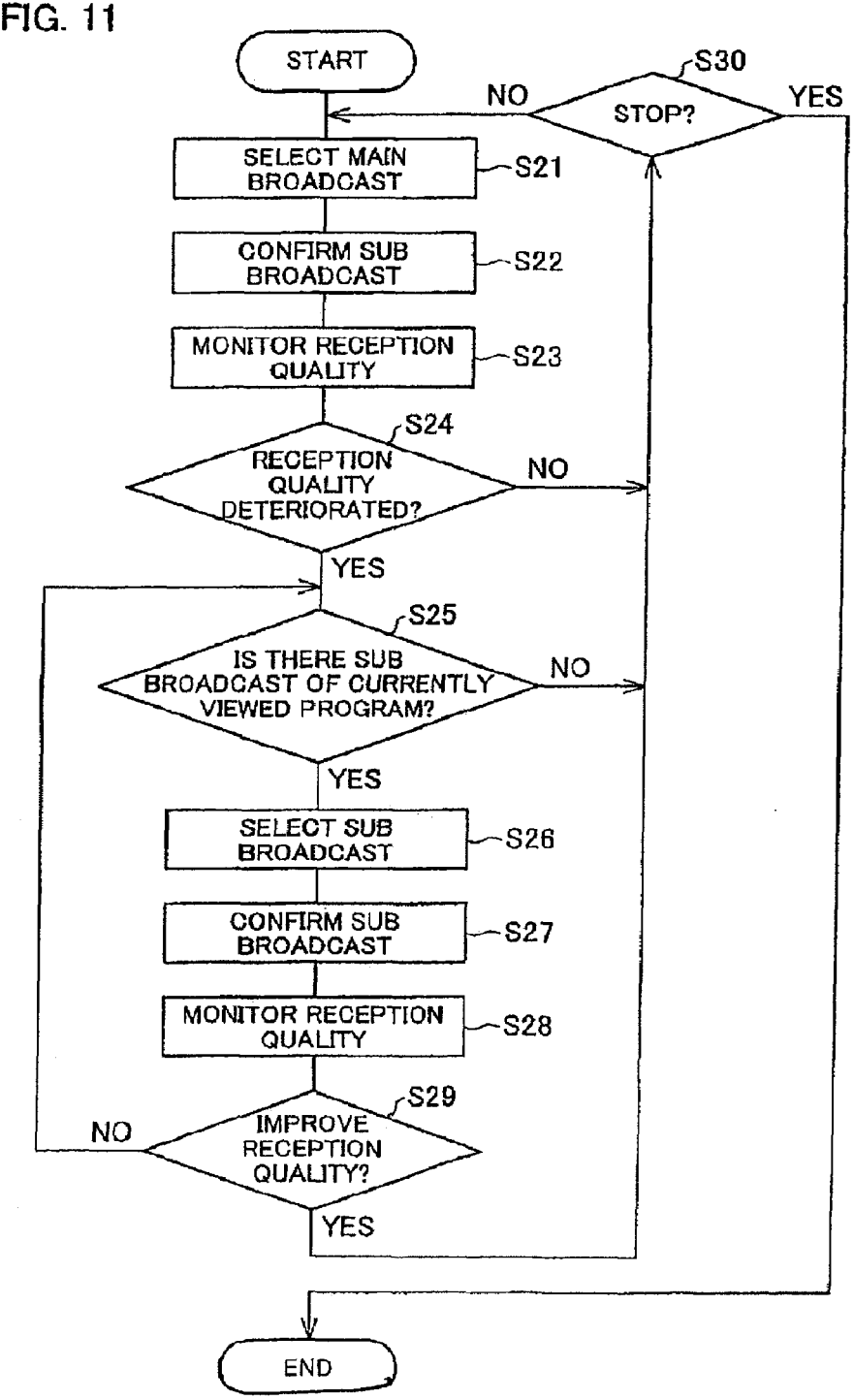
FIG. 11 is a flowchart showing a switching process between main broadcasting channels and sub broadcasting channels in the portable terminal.

Referring to the flowchart of FIG. 11, the following will describe a flow of a switching process between main broadcasting channels and sub broadcasting channels in the portable terminals 3.

At booting, the switching section 54 causes the decoder 36 to decode the received data (main broadcast data) corresponding to the designated channels (main broadcasting channels) indicated by the designated channel information sent from the designated channel acquiring section 51 (S21). From the main broadcast data corresponding to the designated channels, the decoder 36 decodes video data and audio data, and reproduces these data in the display section 44 and the speaker 45.

From the decoder 36, the allocation information extracting section 53 acquires allocation information (sub broadcast presence/absence information, sub broadcast channel information) that has been added to the main broadcast data corresponding to the designated channels indicated by the designated channel information. The allocation information extracting section 53 outputs the allocation information to the switching section 54 (S22).

Then, the reception quality determining section 52 determines whether the electric field strength measured by the electric field strength measuring section 34 is at or above the threshold of required quality, and outputs the result to the switching section 54 (S23).

The switching section 54 determines whether the result from the reception quality determining section 52 indicates "1." As described earlier, the result "1" indicates that the electric field strength is below the threshold, meaning that the reception quality is poor.

If the result is "0" (No in S24), the control section 37 determines whether the input section 43 has received an instruction for stopping reception of the broadcast signal (S30). If the instruction has been received (Yes in S30), the control section 37 ends the process. On the other hand, if the instruction has not been received (No in S30), the sequence returns to S21.

If the result is "1" (Yes in S24), the switching section 54 determines whether the sub broadcast presence/absence information contained in the allocation information sent from the allocation information extracting section 53 indicates "1" (S25). As described earlier, the result "1" indicates that sub broadcast data is being broadcast on the sub broadcasting channels with the same contents as the main broadcast data broadcast on the designated channels.

If the sub broadcast presence/absence information is "0" (No in S25), the sequence goes to S30.

On the other hand, if the sub broadcast presence/absence information is "1" (Yes in S25), the switching section 54 causes the decoder 36 to decode the received data (sub broadcast data) of the sub broadcasting channels indicated by the sub broadcast channel information sent from the allocation information extracting section 53 (S26). From the sub broadcast data corresponding to the sub broadcasting channels indicated by the sub broadcast channel information, the decoder 36 decodes video data and audio data, and reproduces these information in the display section 44 and the speaker 45.

As in S22, the allocation information extracting section 53 then acquires from the decoder 36 allocation information that has been added to the main broadcast data corresponding to the designated channels, and outputs the allocation information to the switching section 54 (S27).

As in S23, the reception quality determining section 52 then determines whether the electric field strength measured by the electric field strength measuring section 34 is at or above the threshold of required quality, and outputs the result to the switching section 54 (S28).

The switching section 54 then determines whether the result from the reception quality determining section 52 is "0", i.e., whether the electric field strength has improved to reach the threshold of required quality (S29).

If the result is "0" (Yes in S29), the sequence goes to S30. In the result is not "0" (No in S29), the sequence returns to S25.

Figure 12:
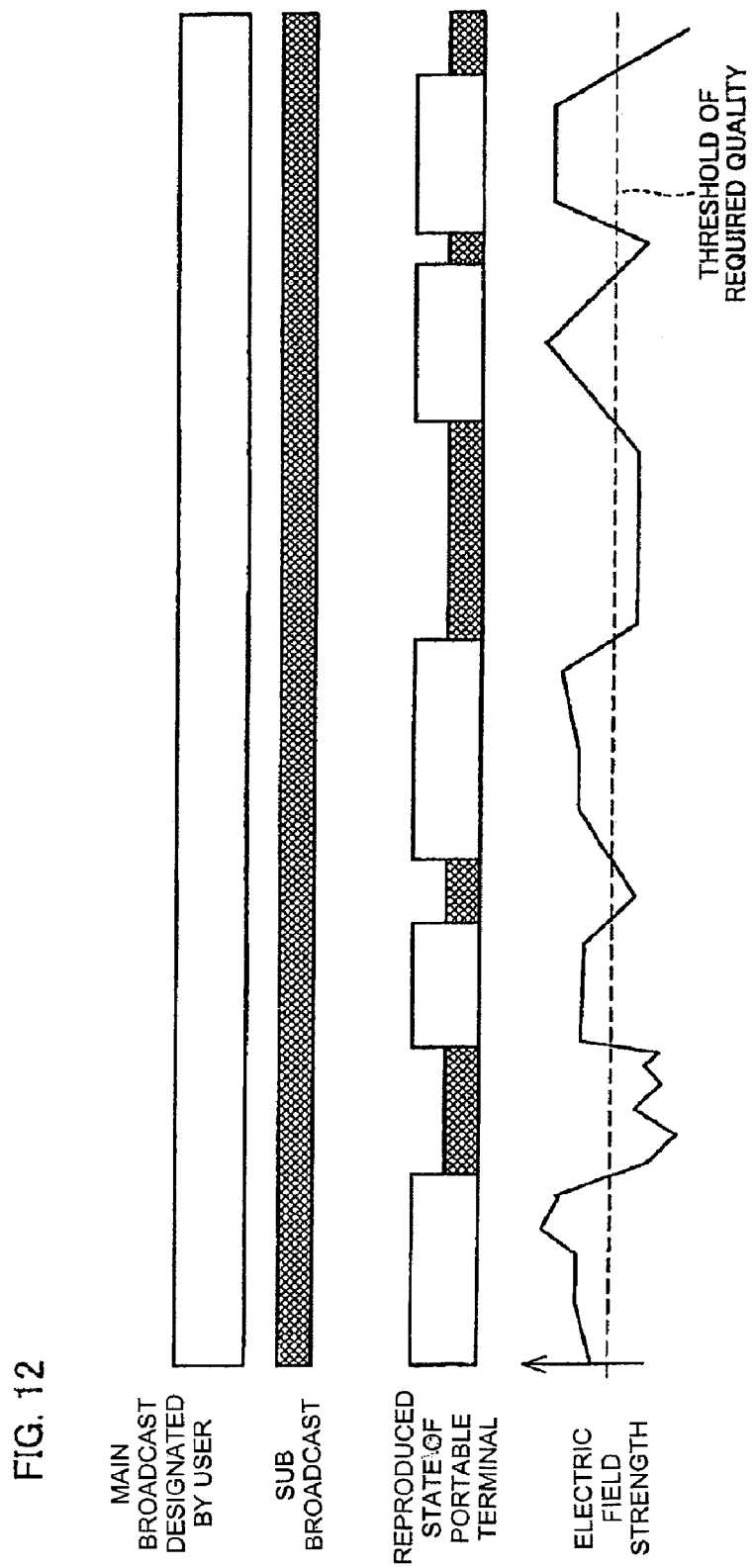
FIG. 12 is a view showing an exemplary switching process in which sub broadcast data corresponding to designated channels are continuously broadcast on sub broadcasting channels.
Figure 13:
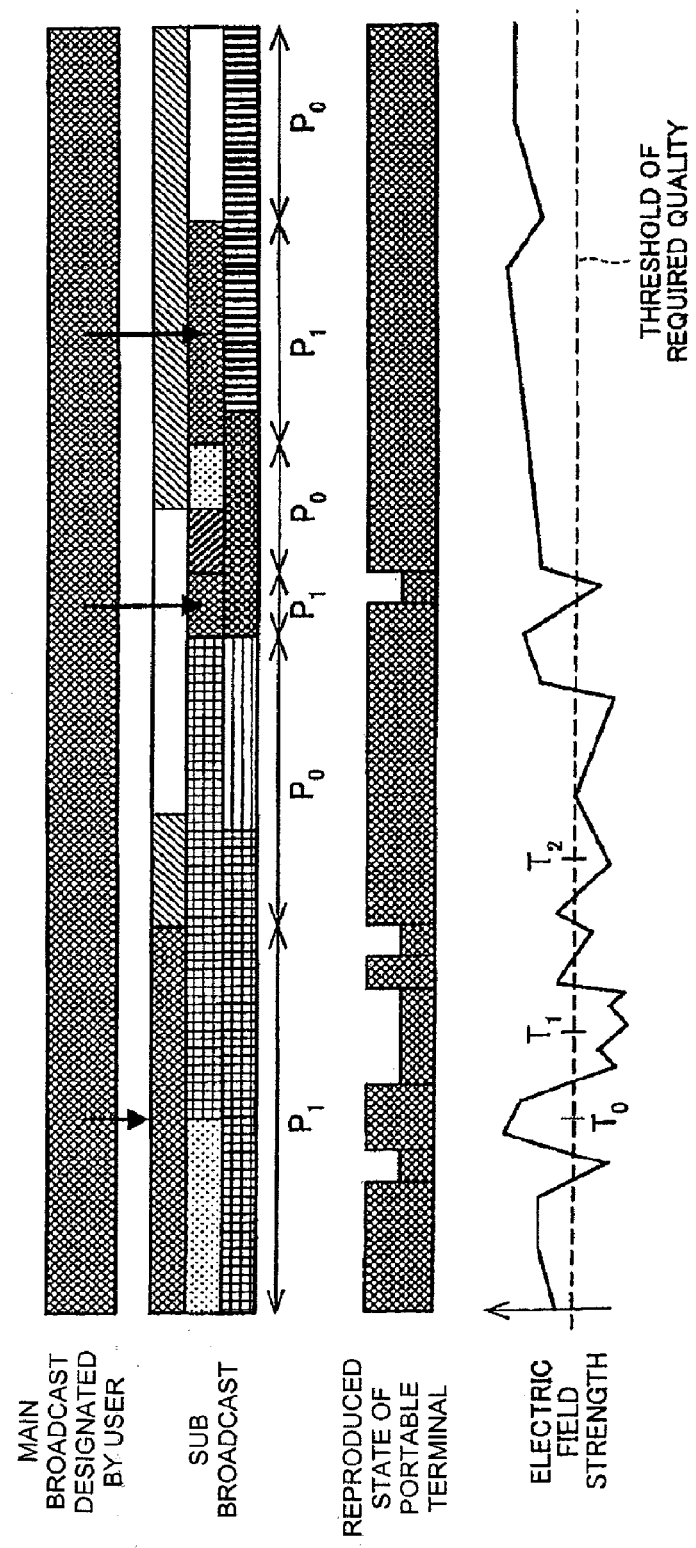
FIG. 13 is a view showing an exemplary switching process in which sub broadcast data corresponding to designated channels are alternately repeated between period P1, in which the sub broadcast data are broadcast, and period P0, in which the sub broadcast data are not broadcast.

FIG. 12 and FIG. 13 illustrate examples of a switching process performed by the switching section 54.

As shown in FIG. 12, if the electric field strength is at or above the threshold of required quality, the reception quality determining section 52 receives the result "0," and the switching section 54 causes the decoder 36 to reproduce the main broadcast data being broadcast on the designated channels.

On the other hand, if the electric field strength is below the threshold of required quality, the reception quality determining section 52 receives the result "1," and the switching section 54 refers to the allocation information to read out sub broadcasting channels corresponding to the designated channels, and causes the decoder 36 to decode the sub broadcast data being broadcast on the sub broadcasting channels so read out. Note that, as described earlier, the sub broadcast data are broadcast in a transmission mode with a stronger error tolerance (transmission mode with a lower modulation rate) than the main broadcast data.

If main broadcast data with an electric field strength below the threshold of required quality is reproduced, the displayed image deteriorates abruptly due to the cliff effect. As such, if the electric field strength is below the threshold of required quality, the switching section 54 causes the decoder 36 to reproduce the sub broadcast data at a lower modulation rate. The demodulator 33 is therefore able to properly demodulate the sub broadcast data, and thereby relieves deterioration of image quality as compared with the case where the main broadcast data with an electric field strength below the threshold of required quality is reproduced.

It should be noted however that since the sub broadcast data are broadcast in a narrower band than the main broadcasting channels, the sub broadcast data have a lower resolution and a lower frame rate than the main broadcast data. Therefore, the video and audio quality of the sub broadcast data cannot match that of the main broadcast data broadcast with an electric field strength at or above the threshold of required quality.

FIG. 13 illustrates an example in which the sub broadcast data corresponding to the designated channels are alternately repeated between period P1, in which the sub broadcast data are broadcast, and period P0, in which the sub broadcast data are not broadcast.

As shown in period P1 of FIG. 13, if the electric field strength is at or above the threshold of required quality (for example, T0), the reception quality determining section 52 receives the result "0," and therefore the switching section 54 causes the decoder 36 to reproduce the main broadcast data being broadcast on the designated channels. On the other hand, if the electric field strength is below the threshold of required quality (for example, T1), the reception quality determining section 52 receives the result "1," and therefore the switching section 54 refers to the allocation information to read out the sub broadcasting channels corresponding to the designated channels, and causes the decoder 36 to reproduce the sub broadcast data being broadcast on the sub broadcasting channels so read out.

In period P0, the switching section 54 causes the decoder 36 to reproduce the main broadcast data being broadcast on the main broadcasting channels, regardless of the result from the reception quality determining section 52, because in this case the sub broadcast data presence/absence information of the allocation information indicates "0." In other words, if the electric field strength is below the threshold of required quality (for example, T2), the switching section 54 causes the decoder 36 to reproduce the main broadcast data being broadcast on the designated channels.

As described above, the broadcast system of the present embodiment includes the broadcast control section 1 for broadcasting a plurality of main broadcast data using a dedicated forward link channel, and the portable terminals 3 for receiving the main broadcast data.

The portable terminals 3 include the designated channel acquiring section (contents designating means) 51 and input section (contents designating means) 43, which designate one of the main broadcast data with a main broadcasting channel (designated channel), and a radio frequency transmitter/receiver (transmitting means) 41 for transmitting viewing information indicative of the designated channel.

The broadcast control section 1 includes: the viewing information processing section (designated contents information acquiring means) 12 for acquiring viewing information from the portable terminal 3; the sub broadcast data deciding section (selecting means) 14 for collecting the viewing information acquired by the viewing information processing section 12, and selecting a predetermined number (m: m<N) of main broadcast data from N main broadcast data based on the result of collection; the data converting section (second contents data acquiring/generating means) 15 for generating sub broadcast data (second contents data) having the same contents as the main broadcast data selected by the sub broadcast data deciding section 14; and the transmission control section (transmission control means) 17 for broadcasting the sub broadcast data generated by the data converting section 15, in a transmission mode with a stronger error tolerance than the main broadcast data and by sharing a predetermined specific band (allocated band for sub broadcasting channels) of the dedicated forward link channel.

In the case where there is more than one sub broadcast data, the transmission control section 17 broadcasts the sub broadcast data using an arbitrarily selected band of the specific band. The specific band is a predetermined band for the entire sub broadcasting channels. That is, the specific band is shared by all sub broadcast data.

The portable terminal 3 includes: the radio frequency receiver (receiving means) 32 and demodulating section (receiving means) 33, which receive the main broadcast data and the sub broadcast data; the electric field strength measuring section (reception quality measuring means) 34 for measuring an electric field strength (characteristic value) corresponding to a receiving condition of the radio frequency receiver 32; the reception quality determining section (reception quality determining means) 52 for determining reception quality based on a result of comparison between the electric field strength measured by the electric field strength measuring section 34 and a predetermined threshold of required quality; the decoder (reproducing means) 36, display section (reproducing means) 44, and speaker (reproducing means) 45, which reproduce the main broadcast data or sub broadcast data; and the switching section 54. The switching section 54 reproduces the main broadcast data corresponding to the designated channel acquired by the designated channel acquiring section 51, if the reception quality determining section 52 determines the reception quality to be good. The switching section 54 reproduces the main broadcast data corresponding to the designated channel acquired by the designated channel acquiring section 51, if the reception quality determining section 52 determines the reception quality to be no good, and if sub broadcast data corresponding to the designated channel acquired by the designated channel acquiring section 51 has not been received. The switching section 54 reproduces the sub broadcast data corresponding to the designated channel acquired by the designated channel acquiring section 51, if the reception quality determining section 52 determines the reception quality to be no good, and if sub broadcast data corresponding to the designated channel acquired by the designated channel acquiring section 51 has been received.

The main broadcast data has a transmission mode with a weaker error tolerance than the sub broadcast data (higher transmission rate), and therefore provides better quality contents data. Thus, under desirable reception conditions, the main broadcast data can provide better video and audio quality than the sub broadcast data. However, a drawback of the main broadcast data is that the video and audio quality deteriorates abruptly due to the cliff effect when the electric field strength falls below the threshold of required quality. The sub broadcast data, on the other hand, has a transmission mode with a stronger error tolerance than the main broadcast data, and therefore can be demodulated reasonably well even when the electric field strength is below the threshold.

Thus, in the event where the main broadcast data cannot be properly demodulated and causes abrupt deterioration of image quality or other disturbances, the portable terminal 3 can reproduce the sub broadcast data to improve viewer satisfaction. That is, unlike conventionally, the portable terminal 3 is not required to individually send a request for retransmission of the data, allowing for efficient use of the bidirectional channel.

Note that, the foregoing described the case where the number of main broadcasting channels (N) is greater than the number of sub broadcasting channels (m). However, the present invention can also be implemented with m=N, as described below.

In this case, the broadcast control section 1 does not require the viewing information processing section 12, the viewing information managing section 13, or the sub broadcast data deciding section 14. Further, the data converting section 15 generates sub broadcast data corresponding to all main broadcast data. The transmission control section 17 broadcasts the generated sub broadcast data on predetermined sub broadcasting channels.

That is, the broadcast control station 1 needs to include: the data converting section (second contents data acquiring/generating section) 15 for generating sub broadcast data (second contents data) having the same contents as the main broadcast data; and the transmission control section (transmission control means) 17 for broadcasting the sub broadcast data generated by the data converting section 15, in a transmission mode with a stronger error tolerance than the main broadcast data and by sharing the specific band of the dedicated forward link channel.

Further, the viewing information generating section 38 can be omitted from the portable terminals 3.

Specifically, the portable terminals 3 need to include: the radio frequency receiver (receiving means) 32 and demodulating section (receiving means) 33, which receive the main broadcast data and the sub broadcast data; the electric field strength measuring section (reception quality measuring means) 34 for measuring an electric field strength (characteristic value) corresponding to a receiving condition of the radio frequency receiver 32; the reception quality determining section (reception quality determining means) 52 for determining reception quality based on a result of comparison between the electric field strength measured by the electric field strength measuring section 34 and a predetermined threshold of required quality; the decoder (reproducing means) 36, display section (reproducing means) 44, and speaker (reproducing means) 45, which reproduce the main broadcast data or sub broadcast data; and the switching section 54. The switching section 54 reproduces the main broadcast data corresponding to the designated channel acquired by the designated channel acquiring section 51, if the reception quality determining section 52 determines the reception quality to be good. The switching section 54 reproduces the sub broadcast data corresponding to the designated channel acquired by the designated channel acquiring section 51, if the reception quality determining section 52 determines the reception quality to be no good.

Second Embodiment

The following will describe another embodiment of the present invention with reference to FIG. 14 through FIG. 17. Note that, for convenience of explanation, constituting elements having the same functions as those described in the foregoing First Embodiment are given the same reference numerals and explanations thereof are omitted.

As described in the First Embodiment, the broadcast control station 1 broadcasts the main broadcast data and sub broadcast data in parallel, using the broadcasting antennas 2. However, the sub broadcast data may be distributed by multicast broadcasting using other channels.

Figure 14:
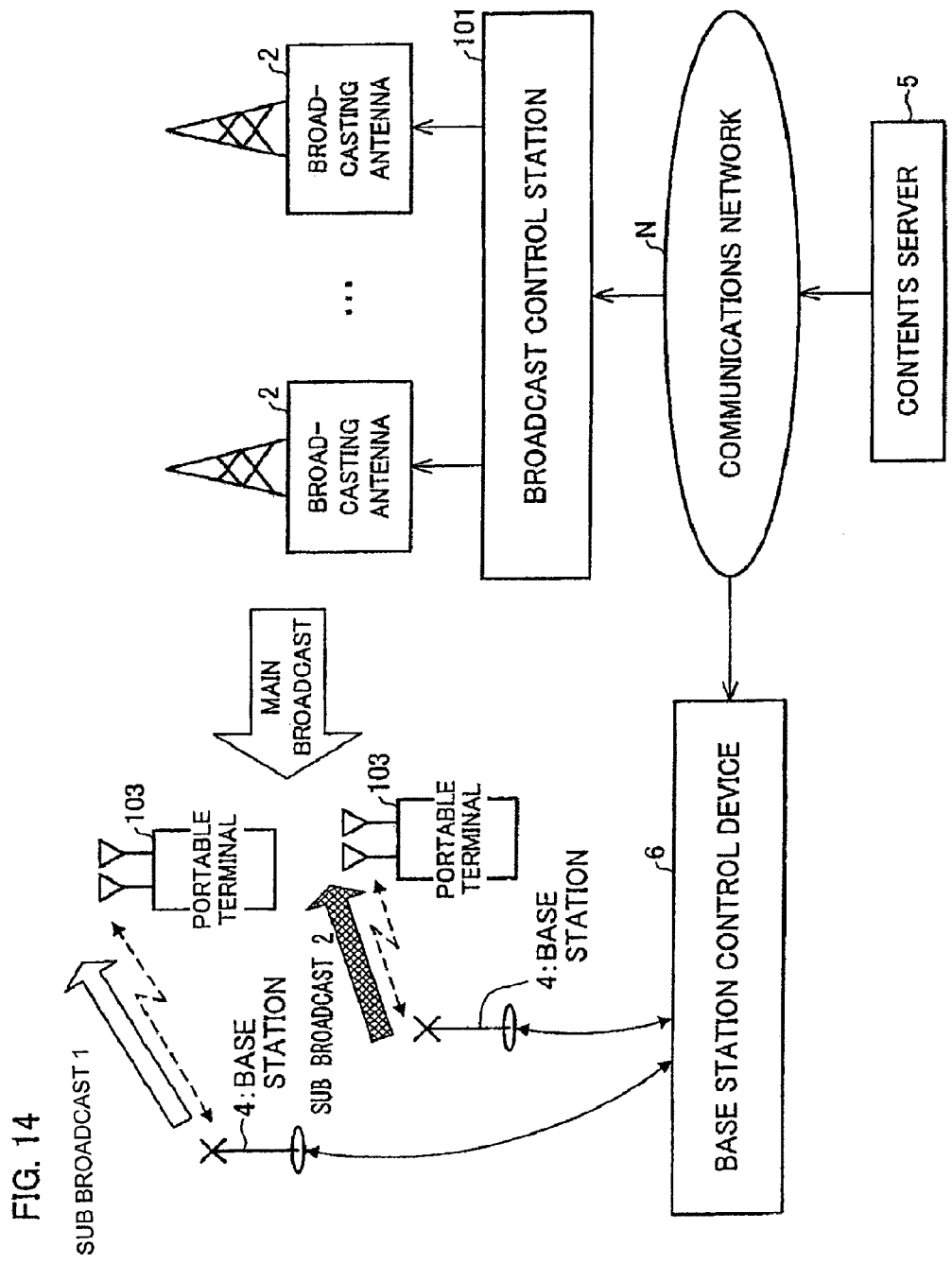
FIG. 14 is a block diagram schematizing a broadcast system according to a Second Embodiment of the present invention.

In the present embodiment, the base station 4 multicasts the sub broadcast data. FIG. 14 is a block diagram illustrating a structure of a broadcast system according to the present embodiment. As shown in FIG. 14, the broadcast system of the present embodiment differs from the First Embodiment in that it includes a broadcast control station 101 instead of the broadcast control station 1, and a portable terminal (receiver) 103 instead of the portable terminal 3. Further, the broadcast system of the present invention additionally includes a base station control device (control station) 6.

The base station control device 6 is provided to multicast the sub broadcast data from the base station 4, whereby the sub broadcast data is distributed to each portable terminal 103 via the base station 4. Further, the base station control device 6 is connected to the communications network N, so that the main broadcast data can be obtained from the contents server 5.

(Structure of the Broadcast Control Station)

Figure 15:
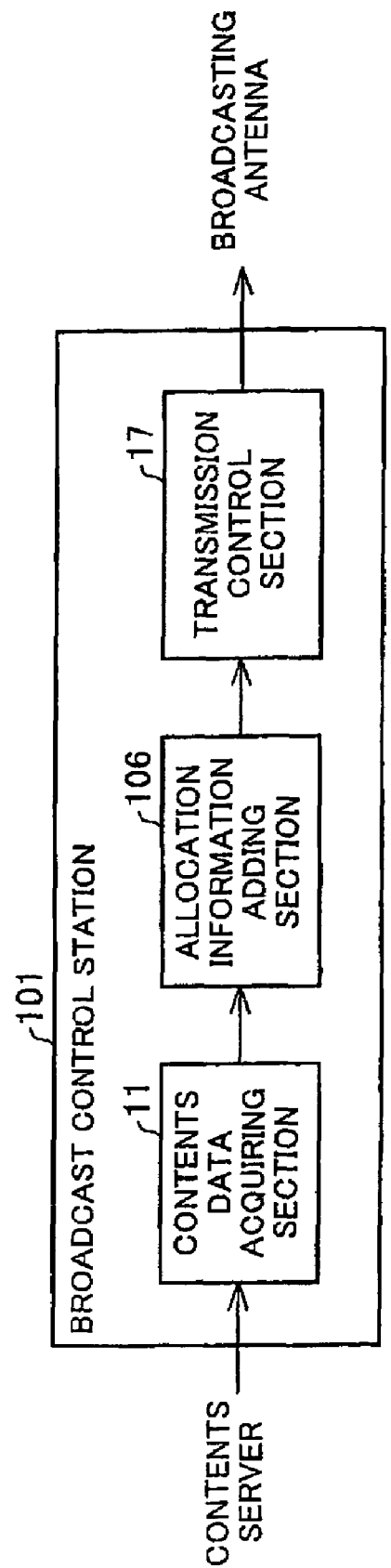
FIG. 15 is a block diagram illustrating a structure of a broadcast control station according to the Second Embodiment of the present invention.

As illustrated in FIG. 15, the broadcast control station 101 of the present embodiment includes a contents data acquiring section 11, an allocation information adding section 116, and a broadcast control section 17.

The allocation information adding section 116 is provided to add allocation information, indicative of a predetermined main broadcasting channel, to each main broadcast data.

In the broadcast control station 101, the contents data acquiring section 11 acquires the main broadcast data, and the transmission control section 17 broadcasts the main broadcast data on a predetermined main broadcasting channel.

(Structure of Base Station Control Device)

Figure 16:
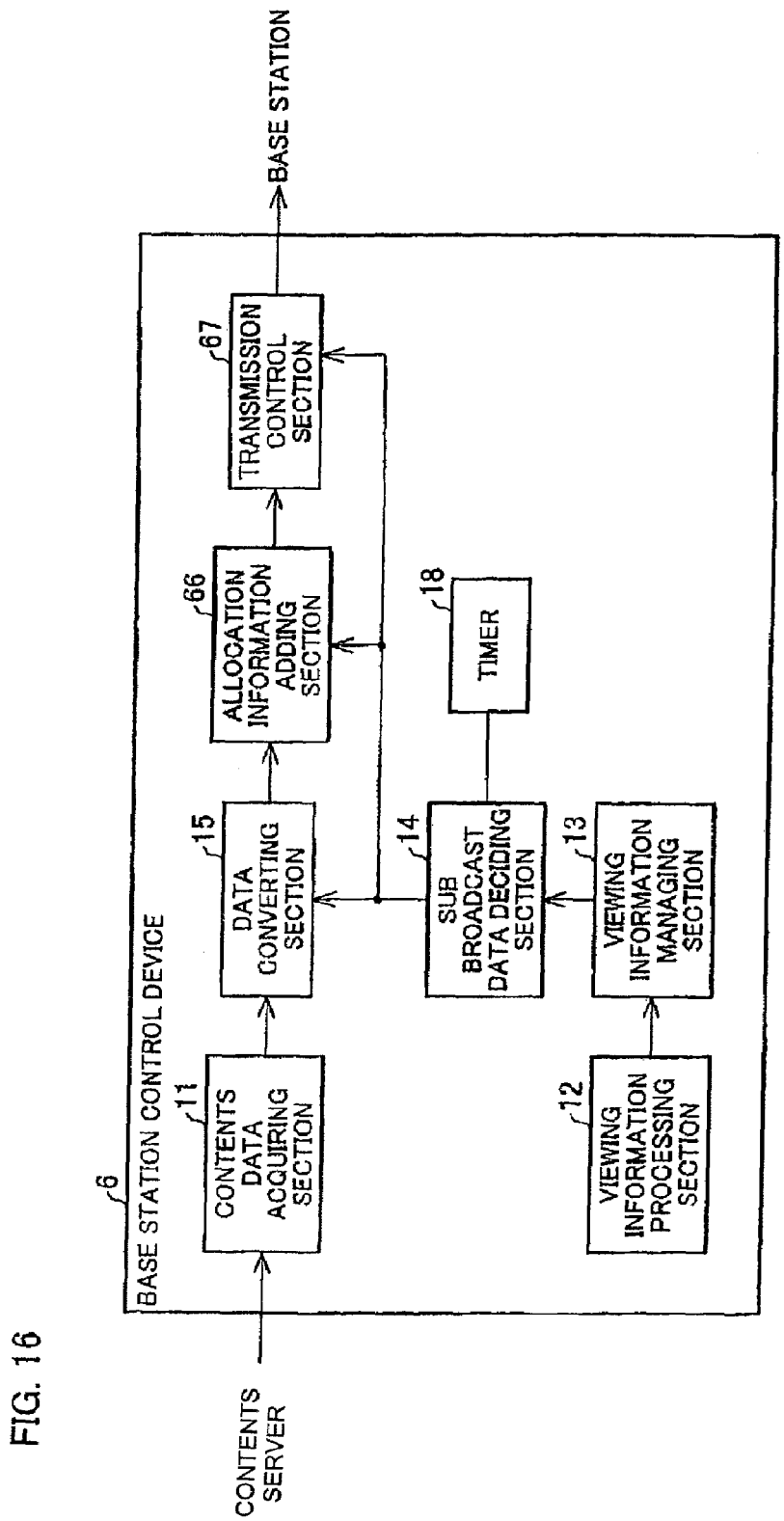
FIG. 16 is a block diagram illustrating a structure of a base station control device according to the Second Embodiment of the present invention.

FIG. 16 is a block diagram illustrating a structure of the base station control device 6. As shown in FIG. 16, the base station control device 6 has essentially the same structure as the broadcast control station 1 of the First Embodiment, but differs therefrom in that it includes an allocation information adding section 66 instead of the allocation information adding section 16, and a transmission control section (distributing means) 67 instead of the transmission control section 17.

The contents data acquiring section 11 of the base station control device 6 acquires from the contents server 5 main broadcast data corresponding to each main broadcasting channel, and outputs the acquired main broadcast data only to the data converting section 15. In the present embodiment, the data converting section 15 outputs the generated sub broadcast data to the allocation information adding section 66.

Based on the sub broadcast information sent from the sub broadcast data deciding section 14, the allocation information adding section 66 adds allocation information to the sub broadcast data generated by the data converting section 15. The allocation information indicates sub broadcasting channel to be used to distribute the sub broadcast data, and main broadcasting channel being used to broadcast the main broadcast data having the same contents as the sub broadcast data. The sub broadcast data appended with the allocation information is sent to the transmission control section 67 from the allocation information adding section 66.

The sub broadcast data sent from the allocation information adding section 66 is multicast by the transmission control section 67 from the base station 4, using the sub broadcasting channels decided by the sub broadcast data deciding section 14. The transmission control section 67 transmits the sub broadcast data after modulating the sub broadcast data at a lower modulation rate than the main broadcast data broadcast from the broadcasting antennas 2.

(Structure of Portable Terminal)

Figure 17:
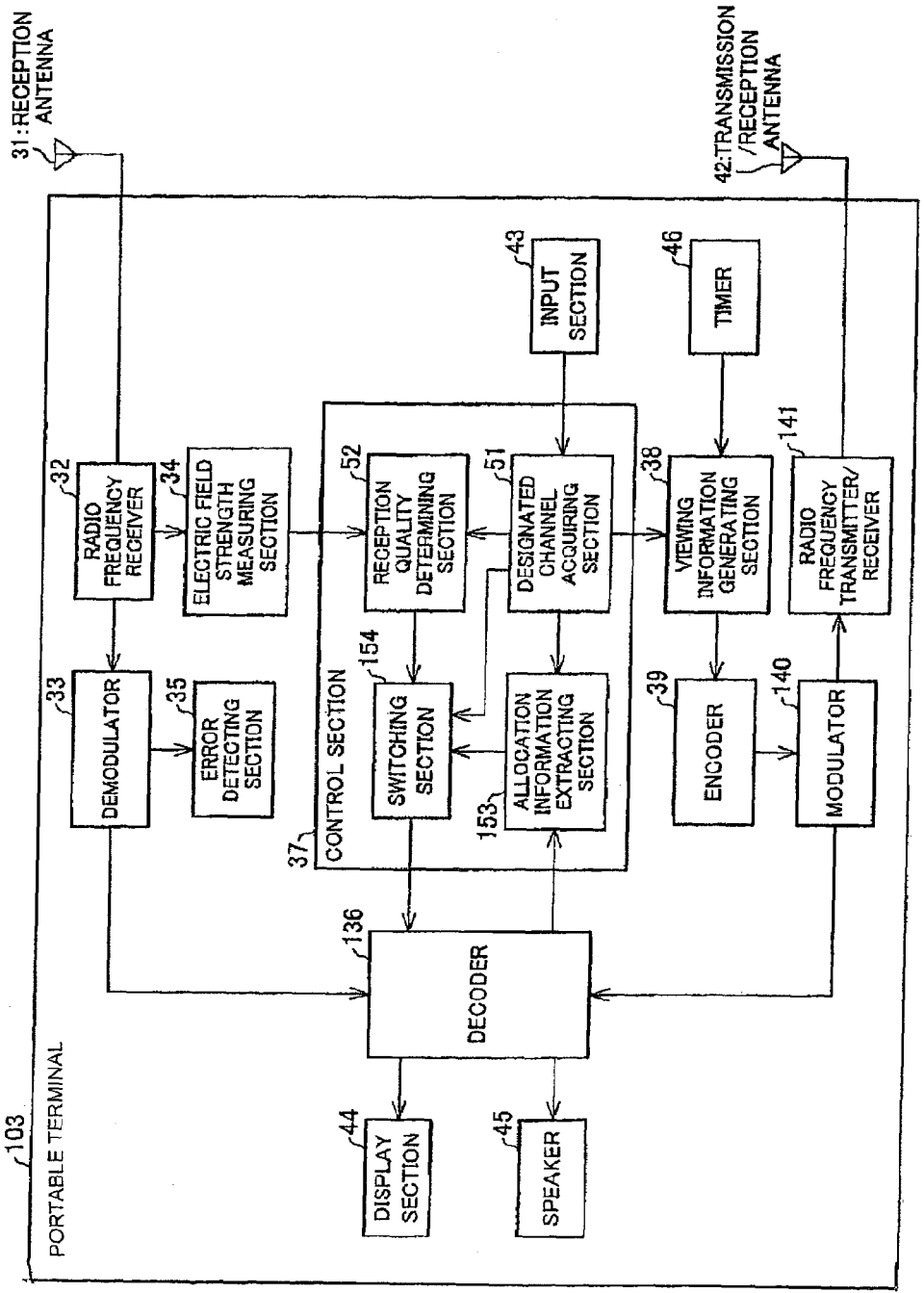
FIG. 17 is a block diagram illustrating a structure of a portable terminal according to the Second Embodiment of the present invention.

FIG. 17 is a block diagram illustrating a structure of the portable terminal 103 according to the present embodiment. As shown in FIG. 17, the portable terminal 103 differs from the portable terminal 3 in that it includes a decoder (reproducing means) 136 instead of the decoder 36, a modulator (second receiving means) 140 instead of the modulator 40, a radio frequency transmitter/receiver (second receiving means) 141 instead of the radio frequency transmitter/receiver 41, an allocation information extracting section 153 instead of the allocation information extracting section 53, and a switching section (reproduced contents switching means) 154 instead of the switching section 54.

In addition to the functions of the radio frequency transmitter/receiver 41, the radio frequency transmitter/receiver 141 receives, via the base station 4, the sub broadcast data being multicast from the base station control device 6.

In addition to the functions of the modulator 40, the modulator 140 demodulates the sub broadcast data received by the radio frequency transmitter/receiver 141, and outputs the demodulated data to the decoder 136.

By the decoder 136, the main broadcast data from the demodulator 33, or the sub broadcast data from the modulator 140 is decoded to video data or audio data, and is outputted to the display section 44 and the speaker 45. It should be noted here that the broadcast data decoded into the video data and audio data by the decoder 136 are those corresponding to the channels specified by the switching section 154. The decoder 136 extracts allocation information from each sub broadcast data, and outputs it to the allocation information extracting section 153.

By the allocation information extracting section 153, the allocation information extracted from each sub broadcast data is acquired from the decoder 136. The allocation information extracting section 153 then compares the acquired allocation information with the designated channel information sent from the designated channel acquiring section 51, so as to determine whether there is allocation information that indicates main broadcasting channels corresponding to the designated channels.

In the absence of allocation information that indicates main broadcasting channels corresponding to the designated channels, the allocation information extracting section 153 outputs sub broadcast data presence/absence information (="0"), indicative of no sub broadcast data, to the switching section 154.

On the other hand, in the presence of allocation information that indicates main broadcasting channels corresponding to the designated channels, the allocation information extracting section 153 outputs sub broadcast data presence/absence information (="1"), indicative of sub broadcast data, and sub broadcasting channel information, indicative of the sub broadcasting channel indicated by the allocation information, to the switching section 154.

The switching section 154 then decides which decoded data (video data, audio data) from the broadcast data of which channel is to be outputted to the display section 44 and the speaker 45, based on the result of determination in the reception quality determining section 52, and the sub broadcast presence/absence information and the sub broadcasting channel information from the allocation information extracting section 153. According to the result, the switching section 154 controls the decoder 136.

In this manner, in the present embodiment, the portable terminal 3 receives the sub broadcast data on a different channel from that used for the main broadcast data. Then, by the switching section 154, the sub broadcast data multicast from the base station 4 with the same contents as the main broadcast data broadcast on the designated channels are reproduced according to the result of determination by the reception quality determining section 52.

In the event where main broadcast data with an electric field strength below the threshold of required quality is reproduced, the quality of displayed image deteriorates abruptly due to the cliff effect. As such, if the electric field strength is below the threshold, the switching section 154 controls the decoder 136 in such a manner as to reproduce sub broadcast data being multicast from the base station 4. Deterioration of image quality is therefore relieved compared with the case where main broadcast data with an electric field strength below the threshold of required quality is reproduced.

In the present embodiment, the transmission control section 67 is not necessarily required to transmit the sub broadcast data in a transmission mode with a stronger error tolerance than the main broadcast data. This is because the main broadcast data with a poor reception quality does not necessarily mean that the reception quality of the sub broadcast data is poor, owning to the fact that the main broadcast data and the sub broadcast data are transmitted (distributed) on different channels.

However, for efficient use of a sub broadcasting channel band used for the multicast distribution of the sub broadcast data, it is preferable in the transmission control section 67 that a transmission mode with a stronger error tolerance than the main broadcast data be used for the sub broadcast data.

As described above, the broadcast system of the Second Embodiment includes the broadcast control station 101 for broadcasting a plurality of main broadcast data (first contents data) using a dedicated forward link channel, the portable terminal (receiver) 103 for receiving the main broadcast data, and the base station control device 6 for distributing data to the portable terminal 103.

The portable terminal 103 includes: the designated channel acquiring section (contents designating means) 51 for designating one of the plurality of main broadcast data; the viewing information generating section (transmitting means) 38 for sending viewing information, indicative of the main broadcast data designated by the designated channel acquiring section 51, to the base station control device 6; and the radio frequency transmitter/receiver (transmitting means) 141.

The base station control device 6 includes: the viewing information processing section (designated contents information acquiring means) 12 for acquiring viewing information from the portable terminal 103; the sub broadcast data deciding section (selecting means) 14 for collecting the acquired viewing information, and, based on the result of collection, selecting a predetermined number (m) of main broadcast data from the plurality of (N) main broadcast data; the data converting section (second contents data acquiring/generating means) 15 for generating sub broadcast data (second contents data) having the contents of the main broadcast data selected by the sub broadcast data deciding section 14; and the transmission control section (distributing means) 67 for multicasting the sub broadcast data generated by the data converting section 15 to the portable terminal 103, using a channel different from the dedicated forward link channel.

The portable terminal 103 includes: the radio frequency receiver (first receiving means) 32 and demodulator (first receiving means) 33 for receiving the main broadcast data; the radio frequency transmitter/receiver (second receiving means) 141 for receiving the sub broadcast data; the electric field strength measuring section (reception quality measuring means) 34 for measuring the electric field strength in the radio frequency receiver 32; the reception quality determining section (reception quality determining means) 52 for determining reception quality based on a comparison between the measured electric field strength and the threshold of required quality; the decoder (reproducing means) 36, display section (reproducing means) 44, and speaker (reproducing means) 45 for reproducing the main broadcast data or sub broadcast data; and the switching section 54 for causing the display section 44 or the speaker 45 to reproduce (i) the main broadcast data corresponding to the designated channel acquired by the designated channel acquiring section 51, if the reception quality determining section 52 determines the reception quality to be good, (ii) the main broadcast data corresponding to the designated channel acquired by the designated channel acquiring section 51, if the reception quality determining section 52 determines the reception quality to be not good and if sub broadcast data corresponding to the designated channel acquired by the designated channel acquiring section 51 has not been received, and (iii) sub broadcast data corresponding to the designated channel acquired by the designated channel acquiring section, if the reception quality determining section 52 determines the reception quality to be no good and if the sub broadcast data corresponding to the designated channel acquired by the designated channel acquiring section 51 has been received.

According to this arrangement, in the portable terminal 103, the first receiving means and the second receiving means receive the main broadcast data and sub broadcast data, respectively. Since the main broadcast data and the sub broadcast data are broadcast (distributed) on different channels, the probability of the both data not being reproduced properly is significantly reduced by the diversity effect.

Thus, when the first contents data cannot be demodulated properly and the video quality deteriorates abruptly, the portable terminal 3 can reproduce the second contents data, if it is available, being multicast on a different channel. In this way, the risk of causing troubles in viewing is significantly reduced by the diversity effect. Further, the portable terminal 103 will not be required to individually send a retransmission request as in conventional receivers. This allows for efficient use of the bidirectional channels.

Note that, the foregoing described the case where the number of main broadcasting channels (N) is greater than the number of sub broadcasting channels (m). However, the present invention can also be implemented with m=N, as described below.

In this case, the base station control device 6 does not require the viewing information processing section 12, the viewing information managing section 13, or the sub broadcast data deciding section 14. The data converting section 15 generates sub broadcast data that correspond to all main broadcast data. The transmission control section 67 broadcasts the generated sub broadcast data on predetermined sub broadcasting channels.

That is, the base station control device 1 need to include the data converting section (second contents data acquiring/generating means) 15 for generating sub broadcast data (second contents data) having the contents of the main broadcast data (first contents data), and the transmission control section (distributing means) 67 for multicasting data to the portable terminal 103 using a channel different from the dedicated forward link channel.

Further, the portable terminals 3 do not require the viewing information generating section 38.

That is, the portable terminals 103 need to include: the radio frequency receiver (first receiving means) 32 and demodulator (first receiving means) 33 for receiving the main broadcast data; the radio frequency transmitter/receiver (second receiving means) 141 for receiving the sub broadcast data; the electric field strength measuring section (reception quality measuring means) 34 for measuring the electric field strength in the radio frequency receiver 32; the reception quality determining section (reception quality determining means) 52 for determining reception quality based on a comparison between the measured electric field strength and the threshold of required quality; the decoder (reproducing means) 36, display section (reproducing means) 44, and speaker (reproducing means) 45 for reproducing the main broadcast data or sub broadcast data; and the switching section 54 for causing the display section 44 or the speaker 45 to reproduce (i) the main broadcast data corresponding to the designated channel acquired by the designated channel acquiring section 51, if the reception quality determining section 52 determines the reception quality to be good, and (ii) sub broadcast data corresponding to the designated channel acquired by the designated channel acquiring section, if the reception quality determining section 52 determines the reception quality to be no good.

Third Embodiment

As described in the First Embodiment, the portable terminal 3 generates viewing information and outputs it to the broadcast control station 1 irrespective of the current location. However, depending on the location where the broadcasting antenna 2 is installed, some areas are more likely to have the problem of poor reception quality (such areas will be referred to as monitored areas).

In the present embodiment, each portable terminal transmits viewing information to the broadcast control station 1 only when the portable terminal is in a monitored area. Thus, in the sub broadcast data deciding section 14 of the broadcast control station 1, each main broadcasting channel has been designated by a user, and the sub broadcast data deciding section 14 counts the number of portable terminals residing in the monitored areas. The sub broadcast deciding section 14 then decides, based on the result of counting, which sub broadcast data corresponding to which main broadcasting channels are to be sub broadcast.

As such, if the electric field strength falls below the threshold of required quality in many of the portable terminals 3 residing in the monitored areas, the switching section 45 can switch to the sub broadcasting channels being used to broadcast sub broadcast data corresponding to the designated channels.

The following will describe a specific structure according to the present embodiment. A broadcast system of the present embodiment is essentially the same as that described with reference to FIG. 2, but differs therefrom in that a portable terminal (receiver) 203 is provided instead of the portable terminal 3.

Figure 18:
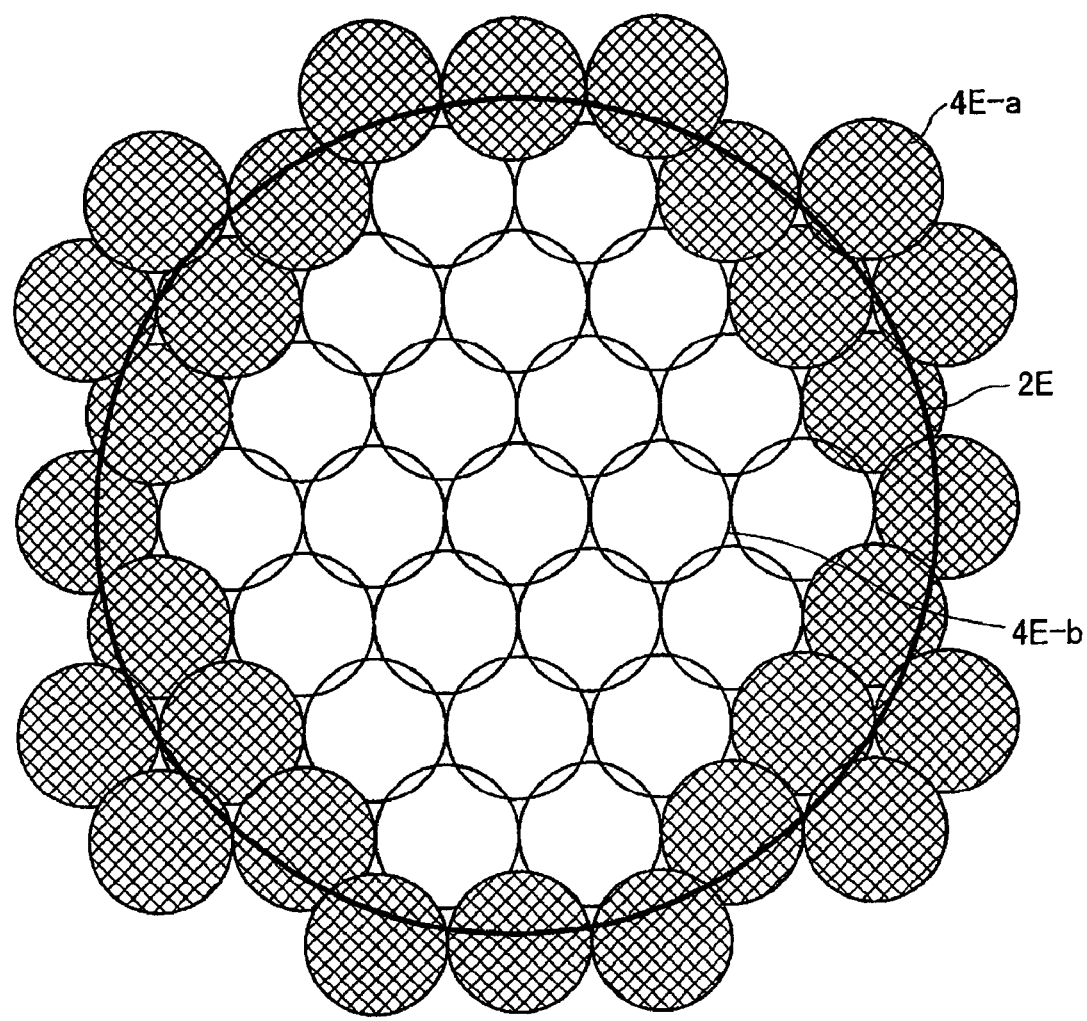
FIG. 18 is a view illustrating broadcast areas.

FIG. 18 illustrates broadcast areas. In FIG. 18, a broadcasting antenna 2 is installed at the center of a broadcast area indicated by 2E. The region around the broadcast area 2E is where deterioration of electric field strength is expected due to the long distance from the broadcasting antenna 2.

Areas of base stations 4 are indicated by 4E-a and 4E-b, wherein the base station 4 is installed at the center of each area 4E. The areas 4E-a occupy the periphery of the broadcast area 2E of the broadcasting antenna 2. The areas 4E-b occupy areas other than the periphery of the broadcast area 2E.

The base stations 4 in the areas 4E-a are set such that, when a request for monitoring information is received from a portable terminal residing therein, monitoring information W (="1") indicative of being in the periphery of the broadcast area 2E (i.e., in the monitored area) is sent back to the portable terminal. The base stations 4 in the area 4E-b are set such that, when a request for monitoring information is received from a portable terminal residing therein, monitoring information W (="0") indicative of not being in the periphery of the broadcast area 2E (i.e., outside the monitored area) is sent back to the portable terminal.

As to details of the broadcast control station 1 of the present embodiment, no further explanation will be made because it has essentially the same structure as the broadcast control station 1 described in the First Embodiment.

(Structure of Portable Terminal)

Figure 19:
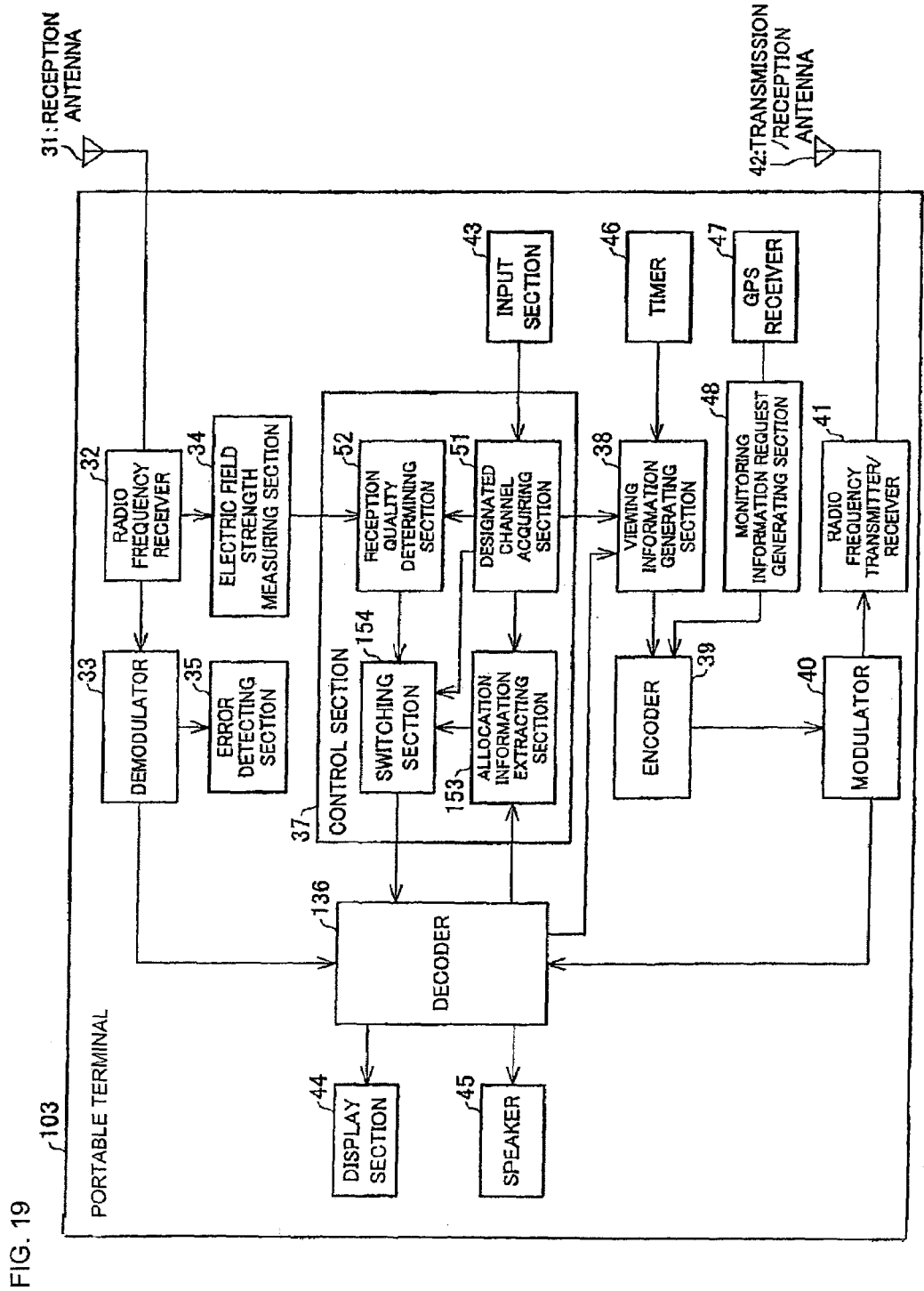
FIG. 19 is a block diagram illustrating a structure of a portable terminal according to a Third Embodiment of the present invention.

FIG. 19 is a block diagram illustrating a structure of the portable terminal 203 according to the present embodiment. As shown in FIG. 19, the portable terminal 203 differs from the First Embodiment in that it includes a viewing information generating section (transmitting means) 238 instead of the viewing information generating section 38, and that it additionally includes a GPS receiver (position information acquiring section) 47 and a monitoring information request generating section 48.

The GPS receiver 47 acquires position information of the current position using GPS (Global Positioning System). The GPS receiver 47 outputs the acquired position information to the monitoring information request generating section 48.

The monitoring information request generating section 48 generates a monitoring information request for the base station 4. The monitoring information request is generated to request for a reply of the monitoring information W. The monitoring information request generating section 48 then outputs the generated monitoring information request to the encoder 39. The monitoring information request is encoded in the encoder 39, modulated in the modulator 40, and transmitted to the base station 4 by the radio frequency transmitter/receiver 41.

The monitoring information request generating section 48 stores the position information received when the previous monitoring information request was generated (previous position information L), and compares the previous position information L with position information currently sent from the GPS receiver 47. The monitoring information request generating section 48 then generates a monitoring information request if the previous position information L is "0," or if the current position information indicates a displacement of at least a predetermined distance (for example, 500 m) relative to the previous position information L.

As described above, the base stations 4 installed in the areas 4E-a send monitoring information W (="1"), indicative of the monitored area, to the portable terminal 203. The base stations 4 installed in the areas 4E-b send monitoring information W (="0"), indicative of outside the monitored area, to the portable terminal 203.

The monitoring information is received by the decoder 36 via the transmission/reception antenna 42, the radio frequency transmitter/receiver 41, and the modulator 40. The decoder 36 decodes the monitoring information.

In addition to the functions of the viewing information generating section 38, the viewing information generating section 238 acquires monitoring information W from the decoder 36, and decides, based on the monitored information W, whether to generate viewing information.

(Process of Requesting and Receiving Monitoring Information)

Figure 20:
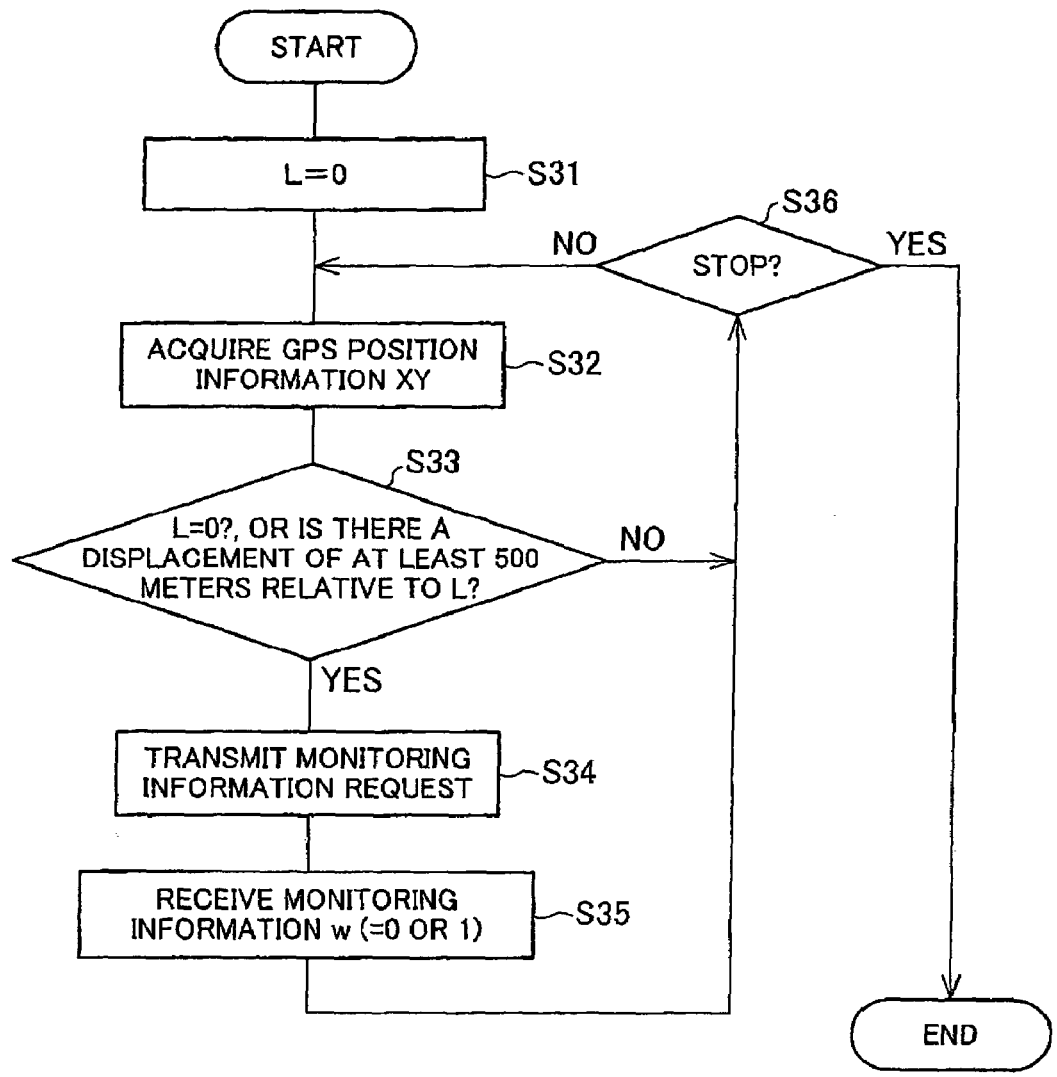
FIG. 20 is a flowchart showing a process of requesting and receiving monitoring information according to the Third Embodiment of the present invention.

Referring to the flowchart of FIG. 20, the following will describe a process flow of requesting and receiving the monitoring information W in the portable terminal 203 according to the present embodiment.

At booting, the monitoring information request generating section 48 sets the previous position information L to a default value (here, 0) (S31).

Then, the GPS receiver 47 acquires the current position information (here, XY) using GPS, and outputs it to the monitoring information request generating section 48 (S32).

In response, the monitoring information request generating section 48 determines, based on the current position information sent from the GPS receiver 47, and the previous position information L, whether the previous position information L is 0, and whether there has been a displacement of at least 500 m relative to the previous position information L (S33).

If the previous position information L is not 0 and there has been no displacement of at least 500 m relative to the previous position information L (No in S33), the monitoring information request generating section 48 determines whether the input section 43 has received an instruction for stopping reception of the TV broadcast (S36). If the instruction for stopping reception has been received (Yes in S36), the monitoring information request generating section 48 ends the process. If the instruction for stopping reception has not been received (No in S36), the sequence returns to S32.

If the previous position information L is 0 or there has been a displacement of at least 500 m relative to the previous position information L (Yes in S33), the monitoring information request generating section 48 generates the monitoring information request. After encoding and modulation, the radio frequency transmitter/receiver 41 sends the monitoring information request to the base station 4 of the area 4E-a or 4E-b where the portable terminal 203 belong (S34).

The radio frequency transmitter/receiver 41 then receives monitoring information W which has been sent in response to the monitoring information request (S35). Thereafter, the sequence goes to S36.

(Process of Transmitting Viewing Information)

Figure 21:
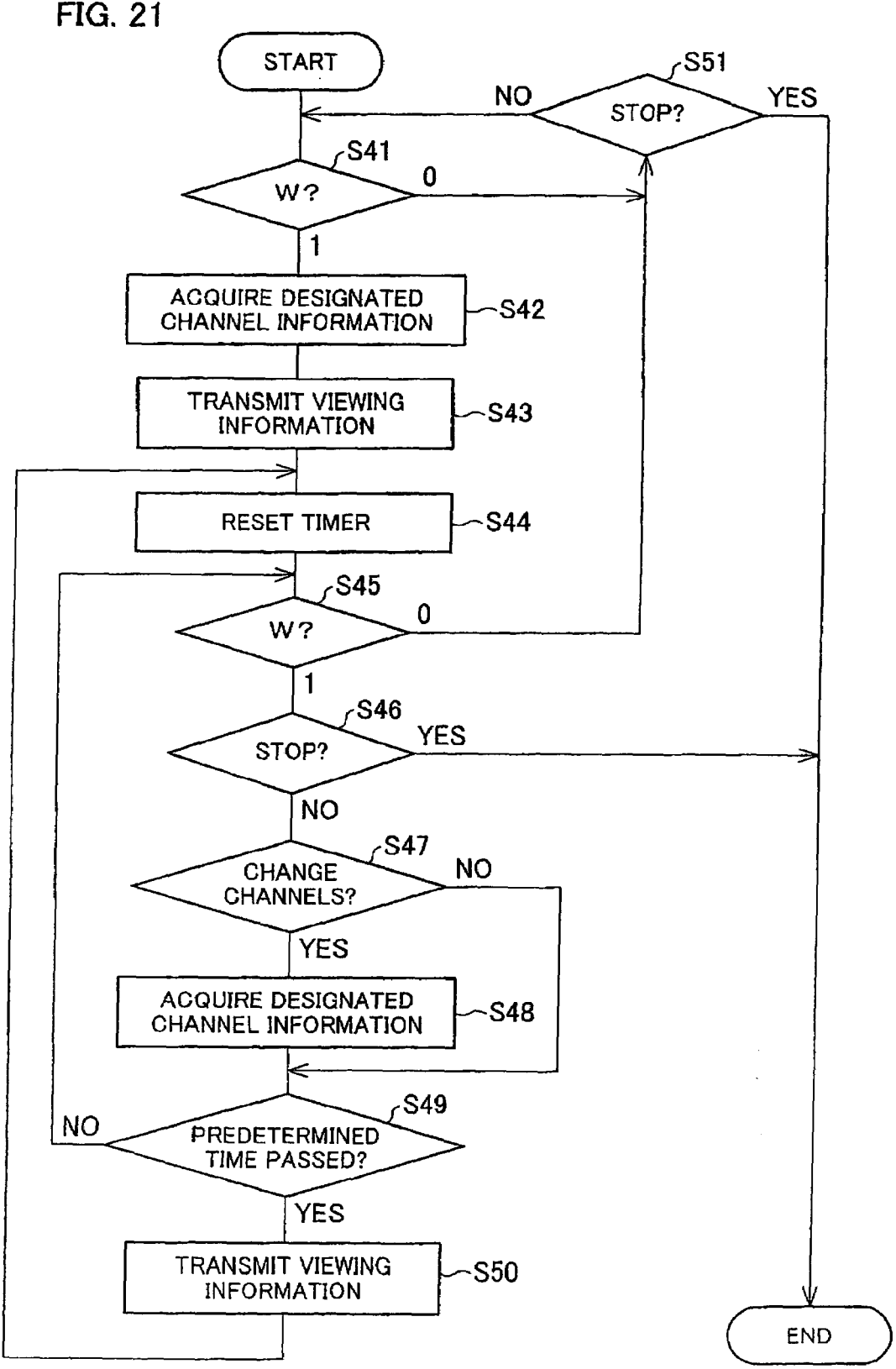
FIG. 21 is a flowchart showing a flow of a transmission process of viewing information according to the Third Embodiment of the present invention.

Referring to the flowchart of FIG. 21, the following will describe a flow of transmitting the viewing information in the portable terminal 203.

First, the input section 43 of the portable terminal 203 receives an instruction for starting reception of the broadcast, and designated channels. In response, the monitoring information W received in reply to the monitoring information request is acquired from the decoder 36 by the viewing information generating section 238. The viewing information generating section 238 determines whether the monitoring information W is 0 or 1 (S41).

If W=0, the control section 37 determines whether the input section 43 has received an instruction for stopping reception of the broadcast (S51). If the instruction for stopping reception has been received (Yes in S51), the control section 37 ends the process. If the instruction for stopping reception has not been received (No in S51), the process of S41 is repeated.

On the contrary, if W=1, information indicative of the currently designated channels is acquired from the designated channel acquiring section 51 by the viewing information generating section 238 (S42).

Thereafter, the viewing information generating section 238 generates viewing information indicative of the designated channels sent from the designated channel acquiring section 51. After modulation, the radio frequency transmitter/receiver 41 transmits the viewing information to the broadcast control station 1 via the transmission/reception antenna 42 and the communications network N (S43).

The viewing information generating section 238 then resets the timer 46 (S44), and acquires the latest monitoring information W from the decoder 36. In S45, the viewing information generating section 238 determines whether the latest monitoring information W is 0 or 1.

If the monitoring information W=0, the sequence goes to S51.

If the monitoring information W=1, the control section 37 determines again whether the input section 43 has received an instruction for stopping reception of the broadcast (S46).

If the instruction for stopping reception has been received (Yes in S46), the control section 37 ends the process.

If the instruction for stopping reception has not been received (No in S46), the designated channel acquiring section 51 determines whether the input section 43 has received an instruction for changing the designated channels (S47).

If the instruction for changing the designated channels has not been received (No in S47), the sequence goes to S49.

On the contrary, if the instruction for changing the designated channels has been received (Yes in S47), designated channel information indicative of new designated channels is acquired from the input section 43 by the designated channel acquiring section 51. The designated channels indicated by the acquired designated channel information are then sent to the viewing information generating section 38 from the designated channel acquiring section 51 (S48).

In S49, the viewing information generating section 238 determines whether a predetermined time (for example, 500 ms) has passed, referring to the timer 46. If a predetermined time has not passed (No in S49), the sequence returns to S45.

On the contrary, if a predetermined time has passed (Yes in S49), the viewing information generating section 238 generates viewing information indicative of the latest designated channels transmitted from the designated channel acquiring section 51. After modulation, the radio frequency transmitter/receiver 41 sends the viewing information to the broadcast control station 1 via the transmission/reception antenna 42 and the communications network N (S50). Thereafter, the sequence returns to S44.

According to the foregoing procedure, the viewing information indicative of the designated channels currently designated by a user can be sent to the broadcast control station 1 at predetermined time intervals. The viewing information generating section 238 performs this process only when the monitoring information W=1, i.e., when the portable terminal 3 resides in the monitored area.

In the sub broadcast data deciding section 14 of the broadcast control station 1, each main broadcasting channel is designated by a user, and the sub broadcast data deciding section 14 counts the number of portable terminals that reside in the monitored area, and, based on the result of counting, decides which sub broadcast data corresponding to which main broadcasting channels are to be sub broadcast.

As such, if the electric field strength falls below the threshold of required quality in many of the portable terminals 3 residing in the monitored areas, the switching section 54 can switch to the sub broadcasting channels being used to broadcast sub broadcast data corresponding to the designated channels.

MODIFICATION EXAMPLES (Modification Example of Switching Process)

As described above, the reception quality determining section 52 in the portable terminal 3, 103, or 203 determines the reception quality according to the level of electric field strength relative to the threshold of required quality. Alternatively, the reception quality determining section 52 may determine the reception quality by comparing the detected error rate of the error detecting section 35 with a predetermined threshold of required quality.

In this case, if the error rate is at or above the threshold and the sub broadcast presence/absence information indicates 1, the switching sections 54 and 154 control the decoder 36 in such a manner as to reproduce sub broadcast data being broadcast (distributed) on the sub broadcasting channels indicated by the sub broadcasting channel information sent from the allocation information extracting sections 53 and 153.

(Modification Example of Allocation Information Adding Section)

In the foregoing First and Third Embodiments, the allocation information adding section 16 adds allocation information to each main broadcast data, the allocation information indicating main broadcasting channels to be broadcast, the presence or absence of broadcasting of sub broadcast data, and sub broadcasting channels to be sub broadcast. However, the allocation information adding section 16 may be adapted so that the allocation information indicative of main broadcasting channels corresponding to the sub broadcasting channels generated by the data converting section 15 is added to each of these sub broadcasting channels. In this case, by confirming the sub broadcasting channels, the main broadcasting channels can be recognized. This is advantageous in advertising programs broadcast on the main broadcasting channels.

In the portable terminals 3 and 203, a search is made by the allocation information extracting section 53 through the allocation information extracted from each sub broadcast data, in order to find allocation information indicative of main broadcasting channels corresponding to the designated channels indicated by the designated channel information sent from the designated channel acquiring section 51.

If the allocation information is not found, it means that there is no sub broadcast data corresponding to the designated channels. In this case, the allocation information extracting section 53 outputs the sub broadcast presence/absence information "0" to the switching section 54.

If the allocation information is found, the allocation information extracting section 53 outputs the sub broadcast presence/absence information "1" to the switching section 54. Here, the allocation information extracting section 53 outputs the sub broadcast channel information, indicative of sub broadcasting channels of the sub broadcast data including the allocation information, to the switching section 54.

Further, in the Second Embodiment, each sub broadcast data is appended, by the allocation information adding section 66 of the base station control device 6, with the allocation information indicative of the main broadcasting channels used to broadcast main broadcast data having the contents of the sub broadcast data. However, the allocation information adding section 116 of the broadcast control station 1 may alternatively acquire sub broadcast information from the base station control device 6, and the process of the allocation information adding section 16 may be performed according to the acquired sub broadcast information.

In this case, the allocation information extracting section 153 of the portable terminal 103 performs the process of the allocation information extracting section 53 of the First Embodiment.

(Modification Example 1 of Generating Viewing Information and Deciding Sub Broadcast Data)

As described above, the viewing information generating section 38 of the portable terminals 3 and 103 generates viewing information indicative of designated channels.

Alternatively, the viewing information generating section 38 may add position information, indicative of the current position of the portable terminals 3 and 103, to the viewing information. For example, a GPS receiver (position information acquiring means) provided in the portable terminals 3 and 103 acquires position information indicative of the current position. In generating the viewing information, the viewing information generating section 38 acquires the position information from the GPS receiver, and adds the acquired position information to the viewing information.

Upon receiving the viewing information from the portable terminal 3, the viewing information processing section 12 of the broadcast control station 1 stores, based on the position information added to the viewing information, the viewing information in the viewing information managing section 13 for each broadcast area. Then, based on the viewing information managed by the viewing information managing section 13 for each broadcast area, the sub broadcast data deciding section 14 decides, for each broadcast area, which sub broadcast data corresponding to main broadcast data of which main broadcasting channels are to be broadcast on the sub broadcasting channels.

By performing the same process, the base station control device 6 can multicast different sub broadcast data in each broadcast area, as shown in FIG. 14.

(Modification Example 2 of Generating Viewing Information and Deciding Sub Broadcast Data)

As noted above, some areas (monitored areas) are more likely to have the problem of poor reception quality depending on the locations of the broadcasting antennas 2. In view of this, monitored area information indicative of the monitored area may be stored in advance in the broadcast control station 1 or the base station control device 6. As in Modification Example 1, the viewing information generating section 38 of the portable terminals 3 and 103 adds position information to the viewing information.

Upon receiving the viewing information from the portable terminals 3 and 103, the viewing information processing section 12 of the broadcast control station 1 or the base station control device 6 compares the position information, added to the viewing information, with the monitored area information, so as to decide whether the portable terminal 3 resides in the monitored area. The viewing information processing section 12 stores the viewing information in the viewing information managing section 13 only when the portable terminal 3 is in the monitored area.

The sub broadcast data deciding section 14 may be adapted so that each main broadcasting channel is designated by a user, and that the sub broadcast data deciding section 14 counts the number of portable terminals residing in the monitored areas, and decides, based on the result of counting, which sub broadcast data corresponding to which main broadcasting channels are to be sub broadcast.

As such, if the electric field strength falls below the threshold of required quality in many of the portable terminals 3 residing in the monitored areas, the switching section 54 can switch to the sub broadcasting channels being used to broadcast sub broadcast data corresponding to the designated channels. In this way, users do not need to endure the main broadcast data of a considerably bad picture quality, but are able to watch instead the sub broadcast data with no deterioration of picture quality, even though the video quality is poorer than the intended video quality of the main broadcast data.

(Modification Example 3 of Generating Viewing Information and Deciding Sub Broadcast Data)

The electric field strength measured by the electric field strength measuring section 34, or the reception quality information indicative of the S/N ratio detected by the error detecting section 35 may be added to the viewing information by the viewing information generating section 38. The viewing information appended with the reception quality information is then transmitted to the broadcast control station 1 by the radio frequency transmitter/receiver 41.

By the viewing information generating section 12 in the broadcast control station 1, the acquired viewing information and the reception quality information appended to the viewing information are stored in the viewing information managing section 13 by being associated with each other. Based on the viewing information and reception quality information managed by the viewing information managing section 13, the sub broadcast data deciding section 14 counts the number of viewers, for each main broadcasting channel, where the electric field strength is below a predetermined value (or at or above a predetermined error rate). The sub broadcast data deciding section 14 then decides to sub broadcast sub broadcast data corresponding to the main broadcast data being broadcast on the first m main broadcasting channels with the greatest number of viewers. That is, the sub broadcast data deciding section 14 decides to sub broadcast sub broadcast data corresponding to the first m main broadcasting channels with the greatest number of portable terminals in which the reception quality is below the predetermined value (poor reception quality).

In these portable terminals, the video quality of the reproduced main broadcast data is poor due to the poor reception quality. However, by switching to the sub broadcasting channels, deterioration of video quality can be prevented in a large number of portable terminals 3.

Note that, the viewing information generating section 38 of the portable terminal 3 may be adapted so that the viewing information is generated only when the electric field strength measured by the electric field strength measuring section 34 is below the predetermined value. In this case, the viewing information generating section 12 acquires the viewing information only from portable terminals 3 in which the reception quality is below the predetermined value (poor reception quality). Based on the viewing information managed by the viewing information managing section 13, the sub broadcast data deciding section 14 counts the number of viewers where the electric field strength is below the predetermined value (or at or above a predetermined error rate).

(Modification Example of Data Converting Process in Data Converting Section)

In the First and Third Embodiments, the data converting section 15 of the broadcast control station 1 may divide the main broadcast data into basic data and interpolated data. The main broadcast data are obtained by synthesizing the basic data and the interpolated data. The basic data has a lower resolution and a lower frame rate than the main broadcast data, and can be broadcast by itself.

The transmission control section 17 broadcasts the basic data as sub broadcast data. The transmission control section 17 also broadcasts interpolated data corresponding to the sub broadcast data, using the main broadcasting channels corresponding to the sub broadcast data.

Figure 22:
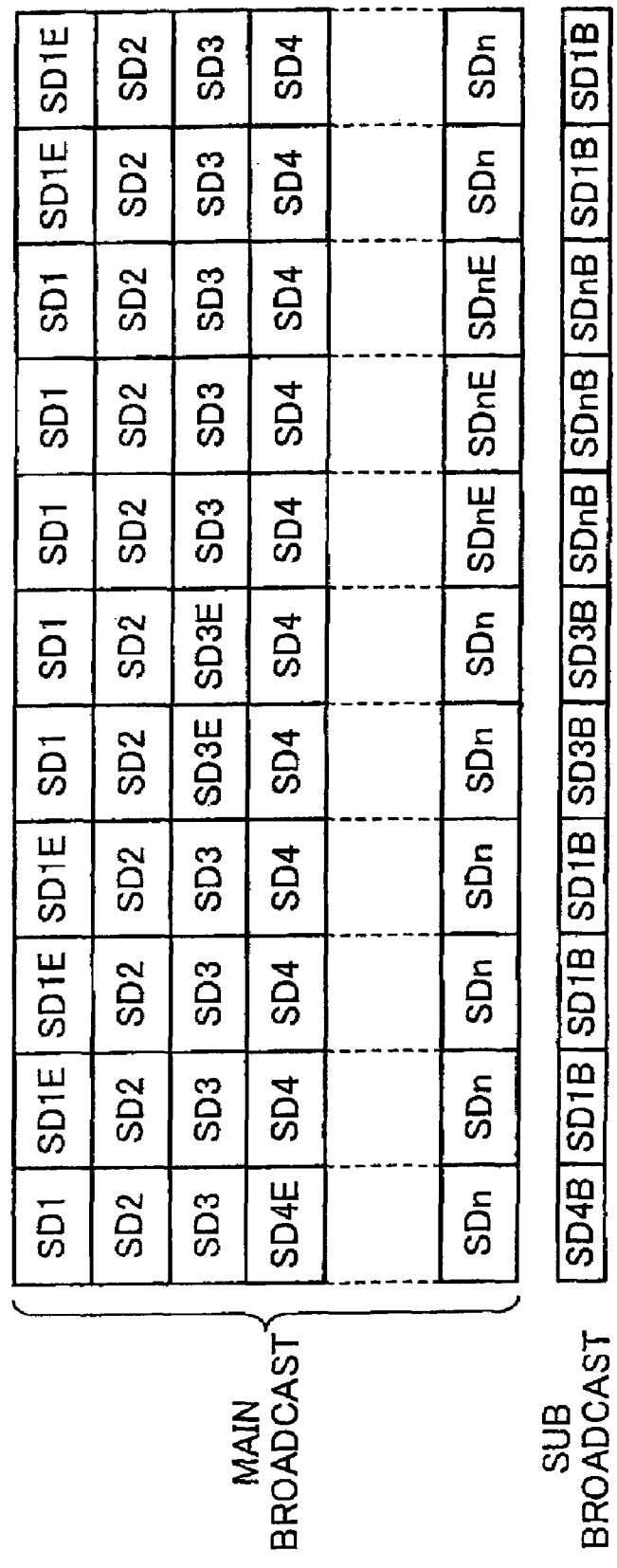
FIG. 22 is a view showing a modification example of a transmission process in a transmission control section.

FIG. 22 represents an exemplary transmitting process performed by the transmission control section 17. As shown in FIG. 22, the data converting section 15 prepares basic data SDxB and interpolated data SDxE by dividing the main broadcast data SDx that was decided to be sub broadcast by the sub broadcast data deciding section 14. The basic data SDxB and the interpolated data SDxE are broadcast by the transmission control section 17 on the sub broadcasting channel and the main broadcasting channel, respectively.

The portable terminals 3 and 203 include a synthesizing section for synthesizing the basic data SDxB and the interpolated data SDxE.

In this case, if the result of quality determination and the sub broadcast information presence/absence information are both "1," the switching section 54 of the portable terminals 3 and 203 controls the decoder 36 in such a manner that the video data and audio data obtained from the sub broadcast data (basic data) of the sub broadcasting channel indicated by the sub broadcasting channel information sent from the allocation information extracting section 53 are outputted to the display section 44 and the speaker 45.

If these conditions are not met, the switching section 54 causes the synthesizing section to synthesize the main broadcast data of the designated channel with the sub broadcast data of the sub broadcasting channel indicated by the sub broadcasting channel information sent from the allocation information extracting section 53. The switching section 54 then controls the decoder 36 and the synthesizing section in such a manner that the video data and audio data obtained from the synthesized data are outputted to the display section 44 and the speaker 45, respectively.

(Other Modifications)

Figure 23:
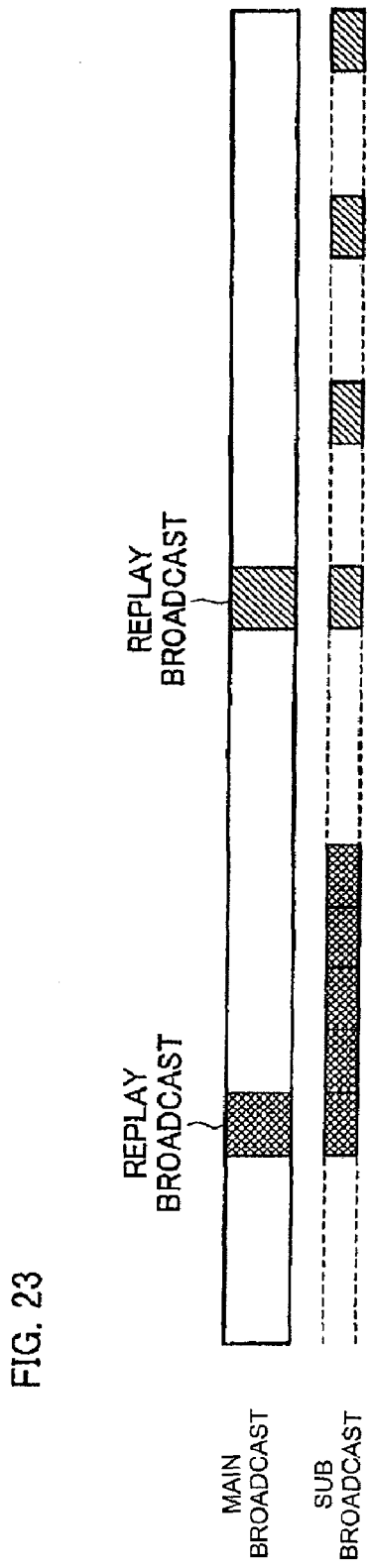
FIG. 23 is a view showing a modification example of sub broadcast data.

As shown in FIG. 23, the data converting section 15 may generate sub broadcast data in which replay data (data corresponding to important scenes in a program) which have been set beforehand in the main broadcast data are repeated, or sub broadcast data in which the replay data are inserted at predetermined intervals.

The contents server 5 may store beforehand main broadcast data, and sub broadcast data corresponding to the main broadcast data. In this case, the contents data acquiring section 11 acquires the main broadcast data and sub broadcast data from the contents server 5, and the data converting section 15 outputs only sub broadcast data selected by the sub broadcast data deciding section 14.

The sub broadcast data deciding section 14 may be adapted so that sub broadcast data corresponding to the main broadcast data of a predetermined main broadcasting channel is sub broadcast. Using other sub broadcasting channels, the sub broadcast data deciding section 14 decides to sub broadcast sub broadcast data corresponding to the main broadcast data of main broadcasting channels with a large number of viewers. For example, the sub broadcast data deciding section 14 may be adapted to sub broadcast sub broadcast data corresponding to main broadcast data of a program for which high viewing ratings are expected, using the broadcasting hours of the program.

Though not shown, the received main broadcast data (first contents data) or sub broadcast data (second contents data) may be stored in a storage section (not shown) before inputting these data to the decoders 36 and 136, or after outputting these data from the decoders 36 and 136.

The present invention may be realized by the respective blocks or hardware logic of the portable terminals 3, 103, 203, the broadcast control stations 1, 101, or the base station control device 6. Alternatively, the invention may be realized by software using CPU (central processing unit), as described below.

Specifically, the portable terminals 3, 103, 203, the broadcast control stations 1, 101, or the base station control device 6 include: a CPU for executing the instructions of the control programs realizing the foregoing functions, and storage devices (storage media) such as ROM (read only memory) storing the programs, a RAM (random access memory) for developing the programs, and various other memories for storing the programs and other data. The object of the present invention can be achieved by providing a computer-readable storage medium storing program code of the control programs (software for realizing the foregoing functions) for the portable terminals 3, 103, 203, the broadcast control stations 1, 101, and the base station control device 6, supplying the storage medium to the portable terminals 3, 103, 203, the broadcast control stations 1, 101, and the base station control device 6, and then causing a computer (or CPU, MPU) to read the program code stored in the storage medium.

Specific examples of the storage medium include: tapes such as magnetic tapes and cassette tapes; magnetic disks such as floppy disks® and hard disks; optical disks such as CD-ROM, MO, MD, DVD, and CD-R; cards such as IC cards (memory cards) and optical cards; and semiconductor memories such as mask ROM, EPROM, EEROM, or flash ROM.

The portable terminals 3, 103, 203, the broadcast control station 1, 101, or the base station control device 6 may be configured to be connectable to the communications network, and the program code may be supplied via the communications network. Examples of the communications network include, but are not limited to, the Internet, an intranet, an extranet, LAN, ISDN, VAN, CATV communications network, virtual private network, telephone line network, mobile communications network, and satellite communications network. The carrier medium for realizing the communications networks is not particularly limited. Specific examples include IEEE1394, USB, power line carrier, cable TV lines, telephone lines, ADSL lines, or other wired lines. Further, the carrier medium may be wireless lines, including IR rays such as IrDA or remote control, Bluetooth®, 802.11 wireless line, HDR, portable telephone lines, satellite lines, and terrestrial digital network. Note that, the present invention can also be realized in the form of a computer data signal conveyed by a carrier wave, whereby the program code is electrically transmitted.

As described above, the present invention provides a broadcast station for broadcasting a plurality of first contents data using a dedicated forward link channel, the broadcast station including: selecting means for selecting some of the first contents data; second contents data acquiring/generating means for acquiring or generating second contents data having contents of each of the first contents data selected by the selecting means; and transmission control means for broadcasting the second contents data acquired or generated by the second contents data acquiring/generating means, the second contents data being transmitted in a more error robust transmission mode than the first contents data and by sharing a predetermined specific band in the dedicated forward link channel.

According to the present invention, there is provided a control method of a broadcast station which broadcasts a plurality of first contents data using a dedicated forward link channel, the broadcast station including selecting means, second contents data acquiring/generating means, and transmission control means, the method including: a selecting step of selecting, by the selecting means, some of the first contents data; a second contents data acquiring/generating step of acquiring or generating, by second contents data acquiring/generating means, second contents data having contents of each of the first contents data selected by the selecting means; and a transmission control step of broadcasting, by the transmission control means, the second contents data acquired or generated by the second contents data acquiring/generating means, the second contents data being transmitted in a more error robust transmission mode than the first contents data and by sharing a predetermined specific band in the dedicated forward link channel.

The error tolerance of the transmission mode is determined by the modulation rate and the coding rate. For example, given the same coding rate, the error tolerance is increased by reducing the modulation rate. On the other hand, given the same modulation rate, the error tolerance is increased by reducing the coding rate. An even stronger error tolerance can be obtained by reducing both the modulation rate and the coding rate. Even with a high coding rate, the error tolerance can be increased by reducing the modulation rate so as to compensate for the high coding rate. Likewise, even when the modulation rate is high, the error tolerance can be increased by reducing the coding rate so as to compensate for the high modulation rate. With the modulation rate and coding rate controlled in this manner, a transmission mode with strong error tolerance can be obtained. Note that, as used herein, the "transmission mode with strong error tolerance" refers to the transmission mode in which a required level of reception quality is low.

The first contents data have a weaker error tolerance but a higher transmission rate than the second contents data. Thus, under good reception conditions, the first contents data can provide better video and audio quality than the second contents data. However, due to the weak error tolerance, the video and audio quality of the first contents data deteriorates abruptly if the characteristic value, indicative of the receiving condition, falls below the threshold.

The second contents data have a stronger error tolerance but a weaker transmission rate than the first contents data, and therefore can be demodulated reasonably well, though the picture quality is not as good as the first contents data, even when the characteristic value indicative of the reception quality is below the threshold.

According to the foregoing arrangement, the receiver can receive the plurality of first contents data parallel to second contents data corresponding to some of the first contents data. Thus, for some of the contents, the receiver can reproduce either the first contents data or second contents data depending on the receiving condition. More specifically, when the first contents data cannot be demodulated properly and the video or audio quality is disturbed abruptly, the receiver can reproduce the second contents data with the more error robust transmission mode. This reduces the risk of causing troubles in viewing. Further, the receiver will not be overloaded with the process of individually sending a retransmission request as in conventional receivers, and therefore allows for efficient use of the bidirectional channels.

The broadcast station is installed in each broadcast area. The broadcast station broadcasts second contents data corresponding to some of the plurality of first contents data broadcast in the broadcast area, using a broadcasting antenna connected to the broadcast station. Further, the broadcast station may be adapted so that the broadcast station is connected to broadcasting antennas of different broadcast areas, and that second contents data corresponding to some of the plurality of first contents data broadcast in these broadcast areas is generated or acquired to be broadcast in these broadcast areas.

In the case where there is more than one second contents data, the transmission control means broadcasts the second contents data in an arbitrarily selected band of the specific band. The specific band is a predetermined band for the entire second contents data, and is therefore shared by all second contents data.

In the foregoing arrangement, the broadcast station of the present invention may be adapted to include: designated contents information acquiring means for acquiring, from a receiver, designated contents information indicative of first contents data to be reproduced by the receiver, wherein the selecting means collects the designated contents information acquired by the designated contents information acquiring means, and, based on a result of collection, selects some of the first contents data.

According to this arrangement, the second contents data acquiring/generating section can acquire or generate second contents data corresponding to first contents data with high viewing ratings, for example. In this way, increased numbers of receivers can reproduce second contents data when the reception quality deteriorates, with the result that the risk of causing troubles in viewing is reduced.

Further, in the foregoing arrangement, the broadcast station of the present invention may be adapted so that the designated contents information acquiring means acquires, from the receiver, position information indicative of a position of the receiver, together with the designated contents information, and that the selecting means selects some of the first contents data for each broadcast area, based on the position information acquired by the designated contents information acquiring means.

According to this arrangement, for example, second contents data corresponding to first contents data with high viewing ratings can be acquired or generated by the second contents acquiring/generating means for each broadcast area. In this way, increased numbers of receivers can reproduce second contents data when the reception quality deteriorates, with the result that the risk of causing troubles in viewing is reduced.

In the foregoing arrangement, the broadcast station of the present invention may be adapted so that the designated contents information acquiring means acquires, from the receiver, position information indicative of a position of the receiver, together with the designated contents information, and that the selecting means specifies, based on the position information acquired by the designated contents information acquiring means, designated contents information acquired from a receiver which belongs to a predetermined area, and collects the specified designated contents information.

According to this arrangement, the selecting means collects only those designated channel information sent from receivers that belong to a predetermined area. For example, if the predetermined area is where the reception quality often deteriorates (far from the broadcast station), the selecting means can decide to broadcast second contents data corresponding to first contents data having high viewing ratings in such an area. In this way, increased numbers of receivers can reproduce second contents data when the reception quality deteriorates, with the result that the risk of causing troubles in viewing is reduced.

In the foregoing arrangement, the broadcast station may be adapted so that the designated contents information acquiring means acquires, from the receiver, a characteristic value indicative of a receiving condition of the receiver, together with the designated contents information, and that the selecting means collects designated contents information corresponding to a characteristic value equal to or below a predetermined value.

According to this arrangement, the selecting means collects designated contents information corresponding to the characteristic value equal to or below the predetermined value. In this way, the selecting means can decide to broadcast second contents data corresponding to the first contents data with a poor reception quality. In this way, increased numbers of receivers can reproduce second contents data when the reception quality deteriorates, with the result that the risk of causing troubles in viewing is reduced.

In the foregoing arrangement, the broadcast station may be adapted so that the second contents data acquiring/generating means generates the second contents data with a reduced resolution and/or a reduced frame rate.

According to this arrangement, the amount of data can be reduced for the second contents data than for the first contents data. As a result, the required band for broadcasting the second contents data can be reduced.

According to the present invention, there is provided a base station control device for distributing data to a receiver which receives, via a dedicated forward link channel, a plurality of first contents data broadcast from a broadcast station, the base station control device including: selecting means for selecting part of the first contents data; second contents data acquiring/generating means for acquiring or generating second contents data having contents of each of the first contents data selected by the selecting means; and distributing means for multicasting, to the receiver, the second contents data acquired or generated by the second contents data acquiring/generating means, the second contents data being multicast using a channel different from the dedicated forward link channel.

According to the present invention, there is provided a control method of a base station control device for distributing data to a receiver which receives, via a dedicated forward link channel, a plurality of first contents data broadcast from a broadcast station, the base station control device including selecting means, second contents acquiring/generating means, and distributing means, the method including: a selecting step of selecting, by the selecting means, part of the first contents data; a second contents data acquiring/generating step of acquiring or generating, by the second contents data acquiring/generating means, second contents data having contents of each of the first contents data selected by the selecting means; and a distributing step of multicasting to the receiver, by the distributing means, the second contents data acquired or generated by the second contents data acquiring/generating means, the second contents data being multicast using a channel different from the dedicated forward link channel.

According to this arrangement, the receiver receives the first contents data on a dedicated forward link channel, and the second contents data on a channel different from the dedicated forward link channel. Thus, the probability of both the first contents data and the second contents data not being reproduced properly is significantly reduced by the diversity effect.

In this manner, the receiver can select and reproduce either the first contents data or second contents data depending on the receiving condition. Thus, by the diversity effect, the risk of causing troubles in viewing can be reduced. Further, the receiver will not be required to frequently and individually send a retransmission request as in conventional receivers. This reduces the burden put on the receiver and allows for efficient use of the bidirectional channels.

In the foregoing arrangement, the base station control device may be adapted to include: designated contents information acquiring means for acquiring, from a receiver, designated contents information indicative of first contents data to be reproduced by the receiver, wherein the selecting means collects the designated contents information acquired by the designated contents information acquiring means, and, based on a result of collection, selects part of the first contents data.

According to this arrangement, for example, second contents data corresponding to first contents data with high viewing ratings can be acquired or generated by the second contents acquiring/generating means. In this way, increased numbers of receivers can reproduce second contents data when the reception quality deteriorates, with the result that the risk of causing troubles in viewing is reduced.

In the foregoing arrangement, the base station control device of the present invention may be adapted so that the designated contents information acquiring means acquires, from the receiver, position information indicative of a position of the receiver, together with the designated contents information, and that the selecting means selects part of the first contents data for each distribution area, based on the position information acquired by the designated contents information acquiring means.

According to this arrangement, for example, second contents data corresponding to first contents data with high viewing ratings can be acquired or generated by the second contents acquiring/generating means for each broadcast area. In this way, increased numbers of receivers can reproduce second contents data when the reception quality deteriorates, with the result that the risk of causing troubles in viewing is reduced.

In the foregoing arrangement, the base station control device of the present invention may be adapted so that the designated contents information acquiring means acquires, from the receiver, position information indicative of a position of the receiver, together with the designated contents information, and that the selecting means specifies, based on the position information acquired by the designated contents information acquiring means, designated contents information acquired from a receiver which belongs to a predetermined area, and collects the specified designated contents information.

According to this arrangement, the selecting means collects only those designated channel information sent from receivers that belong to a predetermined area. For example, if the predetermined area is where the reception quality often deteriorates (far from the broadcast station), the selecting means can decide to multicast second contents data corresponding to first contents data having high viewing ratings in such an area. In this way, increased numbers of receivers can reproduce second contents data when the reception quality deteriorates, with the result that the risk of causing troubles in viewing is reduced.

In the foregoing arrangement, the base station control device of the present invention may be adapted so that the designated contents information acquiring means acquires, from the receiver, a characteristic value indicative of a receiving condition of the receiver, together with the designated contents information, and that the selecting means collects designated contents information corresponding to a characteristic value equal to or below a predetermined value.

According to this arrangement, the selecting means collects designated contents information corresponding to the characteristic value equal to or below the predetermined value. In this way, the selecting means can decide to broadcast second contents data corresponding to the first contents data with a poor reception quality. In this way, increased numbers of receivers can reproduce second contents data when the reception quality deteriorates, with the result that the risk of causing troubles in viewing is reduced.

In the foregoing arrangement, the base station control device of the present invention may be adapted so that the second contents data acquiring/generating means generates the second contents data with a reduced resolution and/or a reduced frame rate.

According to this arrangement, the amount of data can be reduced for the second contents data than for the first contents data. As a result, the required band for broadcasting the second contents data can be reduced.

According to the present invention, there is provided a receiver including: receiving means for receiving first contents data and second contents data using a dedicated forward link channel, the second contents data having contents of the first data and transmitted in a more error robust transmission mode than the first contents data; reception quality measuring means for measuring a characteristic value corresponding to a receiving condition of the receiving means; reception quality determining means for determining reception quality based on a comparison between the characteristic value measured by the reception quality measuring means and a predetermined threshold; reproducing means for reproducing the first contents data or the second contents data; and reproduced contents switching means for causing the reproducing means to reproduce the first contents data if the reception quality determining means determines the reception quality to be good, and the second contents data if the reception quality determining means determines the reception quality to be no good.

According to the present invention, there is provided a receiving method of a receiver which includes receiving means, reception quality measuring means, reception quality determining means, reproducing means, and reproduced contents switching means, the method including: a receiving step of receiving, by the receiving means, first contents data and second contents data using a dedicated forward link channel, the second contents data having contents of the first contents data and broadcast in a more error robust transmission mode than the first contents data; a reception quality measuring step of measuring, by the reception quality measuring means, a characteristic value corresponding to a receiving condition of the receiving means; a reception quality determining step of determining, by the reception quality determining means, reception quality based on a comparison between the characteristic value measured by the reception quality measuring means and a predetermined threshold; and a reproduced contents switching step of causing, by the reproduced contents switching means, the reproducing means to reproduce (i) the first contents data if the reception quality determining means determines the reception quality to be good, and (ii) the second contents data if the reception quality determining means determines the reception quality to be no good.

According to the foregoing arrangement, the receiver receives the first contents data parallel to the second contents data. The reception quality determining means determines reception quality based on a comparison between the characteristic value measured by the reception quality measuring section and the threshold. The reproduced contents switching means causes the reproducing means to reproduce the first contents data if the reception quality is determined to be good, and the second contents data if the reception quality is determined to be not good.

Thus, when the first contents data cannot be demodulated properly and the video or audio quality deteriorates abruptly, the receiver can reproduce the second contents data, and therefore does not cause troubles in viewing. Further, the receiver will not be required to individually send a retransmission request as in conventional receivers, and therefore allows for efficient use of the bidirectional channels.

According to the present invention, there is provided a receiver including: receiving means for receiving a plurality of first contents data, and second contents data, using a dedicated forward link channel, the second contents data having contents of part of the first contents data and transmitted in a more error robust transmission mode than the first contents data; contents designating means for designating one of the plurality of first contents data; reception quality determining means for measuring a characteristic value corresponding to a receiving condition of the receiving means; reception quality determining means for determining reception quality based on a comparison between the characteristic value measured by the reception quality measuring means and a predetermined threshold; reproducing means for reproducing the plurality of first contents data or the second contents data; and reproduced contents switching means for causing the reproducing means to reproduce (i) the first contents data designated by the contents designating means, if the reception quality determining means determines the reception quality to be good, (ii) the first contents data designated by the contents designating means, if the reception quality determining means determines the reception quality to be no good and if the receiving means has not received second contents data corresponding to the first contents data designated by the contents designating means, and (iii) second contents data corresponding to the first contents data designated by the contents designating means, if the reception quality determining means determines the reception quality to be no good and if the receiving means has received the second contents data designated by the contents designating means.

According to the present invention, there is provided a receiving method of a receiver which includes receiving means, contents designating means, reception quality measuring means, reception quality determining means, reproducing means, and reproduced contents switching means, the method including: a receiving step of receiving, by the receiving means, a plurality of first contents data, and second contents data, using a dedicated forward link channel, the second contents data having contents of some of the first contents data and broadcast in a more error robust transmission mode than the first contents data; a contents designating step of designating, by the contents designating means, one of the plurality of first contents data; a reception quality measuring step of measuring, by the reception quality measuring means, a characteristic value corresponding to a receiving condition of the receiving means; a reception quality determining step of determining, by the reception quality determining means, reception quality based on a comparison between the characteristic value measured by the reception quality measuring means and a predetermined threshold; and a reproduced contents switching step of causing, by the reproduced contents switching means, the reproducing means to reproduce (i) the first contents data designated by the contents designating means, if the reception quality determining means determines the reception quality to be good, (ii) the first contents data designated by the contents designating means, if the reception quality determining means determines the reception quality to be no good and if the receiving means has not received second contents data corresponding to the first contents data designated by the contents designating means, and (iii) second contents data corresponding to the first contents data designated by the contents designating means, if the reception quality determining means determines the reception quality to be no good and if the receiving means has received the second contents data corresponding to the first contents data designated by the contents designating means.

According to the foregoing arrangement, the receiver receives the plurality of first contents data parallel to the second contents data corresponding to some of the plurality of the first contents data.

The reception quality determining means determines reception quality based on a comparison between the characteristic value measured by the reception quality measuring section and the threshold. The reproduced contents switching means causes the reproducing means to reproduce the first contents data if the reception quality is determined to be good, and the second contents data if the reception quality is determined to be not good and if there is second contents data corresponding to the first contents data designated by the contents designating means.

Thus, when the first contents data cannot be demodulated properly and the video or audio quality deteriorates abruptly, the receiver can reproduce the second contents data if it is available. This reduces the risk of causing troubles in viewing. As a result, the receiver will not be required to frequently and individually send a retransmission request as in conventional receivers, and therefore allows for efficient use of the bidirectional channels.

According to the present invention, there is provided a receiver including: first receiving means for receiving first contents data using a dedicated forward link channel; second receiving means for receiving multicast second contents data having contents of the first contents data, using a channel different from the dedicated forward link channel; reception quality measuring means for measuring a characteristic value corresponding to a receiving condition of the first receiving means; reception quality determining means for determining reception quality based on a comparison between the characteristic value measured by the reception quality measuring means and a predetermined threshold; reproducing means for reproducing the first contents data or the second contents data; and reproduced contents switching means for causing the reproducing means to reproduce the first contents data if the reception quality determining means determines the reception quality to be good, and the second contents data if the reception quality determining means determines the reception quality to be no good.

According to the present invention, there is provided a receiving method of a receiver which includes first receiving means, second receiving means, reception quality measuring means, reception quality determining means, reproducing means, and reproduced contents switching means, the method including: a first receiving step of receiving, by the first receiving means, first contents data using a dedicated forward link channel; a second receiving step of receiving, by the second receiving means, multicast second contents data having contents of the first contents data, using a channel different from the dedicated forward link channel; a reception quality measuring step of measuring, by the reception quality measuring means, a characteristic value corresponding to a receiving condition of the first receiving means, a reception quality determining step of determining, by the reception quality determining means, reception quality based on a comparison between the characteristic value measured by the reception quality measuring means and a predetermined threshold; and a reproduced contents switching step of causing, by the reproduced contents switching means, the reproducing means to reproduce (i) the first contents data if the reception quality determining means determines the reception quality to be good, (ii) the second contents data if the reception quality determining means determines the reception quality to be no good.

According to the foregoing arrangement, the first receiving means receives the first contents data, and the second receiving means receives the second contents data. Since the first contents data and the second contents data are broadcast (distributed) on different channels, the probability of both the first contents data and the second contents data not being reproduced properly is significantly reduced by the diversity effect.

The reception quality determining means determines reception quality based on a comparison between the characteristic value measured by the reception quality measuring section and the threshold. The reproduced contents switching means causes the reproducing means to reproduce the first contents data if the reception quality is determined to be good, and the second contents data if the reception quality is determined to be not good.

Thus, when the first contents data cannot be demodulated properly and the video or audio quality deteriorates, the receiver can reproduce the second contents data being multicast on a different channel. By the diversity effect, the risk of causing troubles in viewing is greatly reduced. Further, the receiver will be hardly required to individually send a retransmission request as in conventional receivers, and therefore allows for efficient use of the bidirectional channels.

According to the present invention, there is provided a receiver including: first receiving means for receiving a plurality of first contents data using a dedicated forward link channel; second receiving means for receiving multicast second contents data having contents of some of the first contents data, using a channel different from the dedicated forward link channel; contents designating means for designating one of the plurality of first contents data; reception quality measuring means for measuring a characteristic value corresponding to a receiving condition of the first receiving means; reception quality determining means for determining reception quality based on a comparison between the characteristic value measured by the reception quality measuring means and a predetermined threshold; reproducing means for reproducing the plurality of first contents data or the second contents data; and reproduced contents switching means for causing the reproducing means to reproduce (i) the first contents data designated by the contents designating means, if the reception quality determining means determines the reception quality to be good, (ii) the first contents data designated by the contents designating means, if the reception quality determining means determines the reception quality to be no good and if the second receiving means has not received second contents data corresponding to the first contents data designated by the contents designating means, and (iii) second contents data corresponding to the first contents data designated by the contents designating means, if the reception quality determining means determines the reception quality to be no good and if the second receiving means has received the second contents data corresponding to the first contents data designated by the contents designating means.

According to the present invention, there is provided a receiving method of a receiver which includes first receiving means, second receiving means, contents designating means, reception quality measuring means, reception quality determining means, reproducing means, and reproduced contents switching means, the method including: a first receiving step of receiving, by the first receiving means, a plurality of first contents data using a dedicated forward link channel; a second receiving step of receiving, by the second receiving means, multicast second contents data having contents of some of the first contents data, using a channel different from the dedicated forward link channel; a contents designating step of designating, by the contents designating means, one of the plurality of first contents data; a reception quality measuring step of measuring, by the reception quality measuring means, a characteristic value corresponding to a receiving condition of the first receiving means; a reception quality determining step of determining, by the reception quality determining means, reception quality based on a comparison between the characteristic value measured by the reception quality measuring means and a predetermined threshold; and a reproduced contents switching step of causing, by the reproduced contents switching means, the reproducing means to reproduce (i) the first contents data designated by the contents designating means, if the reception quality determining means determines the reception quality to be good, (ii) the first contents data designated by the contents designating means, if the reception quality determining means determines the reception quality to be no good and if the second receiving means has not received second contents data corresponding to the first contents data designated by the contents designating means, and (iii) second contents data corresponding to the first contents data designated by the contents designating means, if the reception quality determining means determines the reception quality to be no good and if the second receiving means has received the second contents data corresponding to the first contents data designated by the contents designating means.

According to this arrangement, when the first contents data cannot be demodulated properly and the video or audio quality deteriorates abruptly, the receiver can reproduce the second contents data being multicast on a different channel. By the diversity effect, the risk of causing troubles in viewing is reduced. As a result, the receiver will not be required to frequently and individually send a retransmission request as in conventional receivers. This reduces the burden put on the receiver, and allows for efficient use of the bidirectional channels.

In the foregoing arrangement, the receiver of the present invention may be adapted so that each of the plurality of first contents data is appended with (i) second contents presence/absence information indicative of the presence or absence of corresponding second contents data, and (ii) second contents identification information for identifying second contents data, if there is corresponding second contents data, and that the reproduced contents switching means determines, based on the second contents presence/absence information, the presence or absence of second contents data corresponding to the first contents data designated by the contents designating means, and causes the reproducing means to reproduce second contents data indicated by the second contents identification information appended to the first contents data designated by the contents designating means, if the reception quality determining means determines the reception quality to be no good and if the second contents presence/absence information indicates the presence of the second contents data.

According to this arrangement, the reproduced contents switching means is able to recognize the second contents data corresponding to the first contents data designated by the contents designating means.

In the foregoing arrangement, the receiver of the present invention may be adapted so that the second contents data is appended with first contents identification information for identifying corresponding first contents data, and that the reproduced contents switching means determines, based on the first contents identification information, the presence or absence of second contents data corresponding to the first contents data designated by the contents designating means, and causes the reproducing means to reproduce second contents data appended with the first contents identification information corresponding to the first contents data designated by the contents designating means, if the reception quality determining means determines the reception quality to be no good and if there is second contents data corresponding to the first contents data designated by the contents designating means.

According to this arrangement, the reproduced contents switching means is able to recognize the second contents data corresponding to the first contents data designated by the contents designating means.

In the foregoing arrangement, the receiver of the present invention may be adapted to include transmitting means for transmitting designated contents information, indicative of the first contents data designated by the contents designating means, to a control station which selects first contents data, corresponding to second contents data to be transmitted, from the plurality of first contents data.

According to this arrangement, by collecting the designated contents information, the control station can decide to broadcast (or multicast) the second contents data corresponding to the first contents data having high viewing ratings.

In the foregoing arrangement, the receiver of the present invention may be adapted to include position information acquiring means for acquiring position information indicative of a current position, wherein the transmitting means transmits the position information acquired by the position information acquiring means, together with the designated contents information.

According to this arrangement, the control station can collect designated contents information for each broadcast area, based on the position information. For each broadcast area, the control station can decide to broadcast (or multicast) the second contents data corresponding to the first contents data having high viewing ratings.

In the foregoing arrangement, the receiver of the present invention may be adapted so that the transmitting means transmits the characteristic value measured by the reception quality measuring means, together with the designated contents information.

According to this arrangement, the control station can collect, based on the characteristic value, only those designated contents information transmitted from receivers with poor reception quality. In this way, the control station can decide to broadcast (or multicast) the second contents data corresponding to the first contents data with poor reception quality.

In the foregoing arrangement, the receiver of the present invention may be adapted to include position information acquiring means for acquiring position information indicative of a current position; and area information acquiring means for acquiring, based on the position information acquired by the position information acquiring means, area information indicative of whether the receiver belongs to a predetermined area, wherein the transmitting means transmits the designated contents information if the area information acquired by the area information acquiring means indicates that the receiver belongs to the predetermined area.

According to this arrangement, the control station collects only those designated channel information sent from receivers that belong to a predetermined area. For example, the predetermined area may be where the receiving condition often deteriorates (far from the broadcast station). In such case, the control station can decide to broadcast (or multicast) second contents data corresponding to first contents data having high viewing ratings in such an area.

In the foregoing arrangement, the receiver of the present invention may be adapted so that the transmitting means transmits the designated contents information if the characteristic value measured by the reception quality measuring means is equal to or below a predetermined value.

According to this arrangement, the control station collects only those designated contents information sent from receivers with poor receiving condition. In this way, the control station can decide to broadcast (or multicast) second contents data corresponding to the first contents data with poor reception quality.

According to the present invention, there is provided a broadcast system which includes a broadcast station for broadcasting first contents data using a dedicated forward link channel, and a receiver for receiving the first contents data, wherein the broadcast station includes: second contents data acquiring/generating means for acquiring or generating second contents data having contents of the first contents data; and transmission control means for broadcasting the second contents data acquired or generated by the second contents data acquiring/generating means, the second contents data being broadcast in a more error robust transmission mode than the first contents data and using the dedicated forward link channel, and wherein the receiver includes: receiving means for receiving the first contents data and the second contents data; reception quality measuring means for measuring a characteristic value corresponding to a receiving condition of the receiving means; reception quality determining means for determining reception quality based on a comparison between the characteristic value measured by the reception quality measuring means and a predetermined threshold; reproducing means for reproducing the first contents data or the second contents data; and reproduced contents switching means for causing the reproducing means to reproduce the first contents data if the reception quality determining means determines the reception quality to be good, and the second contents data if the reception quality determining means determines the reception quality to be not good.

According to this arrangement, when the first contents data cannot be modulated properly and the video or audio quality deteriorates abruptly, the receiver can reproduce the second contents data. Thus, the risk of causing troubles in viewing is reduced. As a result, the receiver will not be required to individually send a retransmission request as in conventional receivers. This allows for efficient use of the bidirectional channels.

According to the present invention, there is provided a broadcast system which includes a broadcast station for broadcasting a plurality of first contents data using a dedicated forward link channel, and a receiver for receiving the first contents data, wherein the broadcast station includes: selecting means for selecting some of the first contents data; second contents data acquiring/generating means for acquiring or generating second contents data having contents of each of the first contents data selected by the selecting means; and transmission control means for broadcasting the second contents data acquired or generated by the second contents data acquiring/generating means, the second contents data being transmitted in a more error robust transmission mode than the first contents data and by sharing a predetermined specific band in the dedicated forward link channel, and wherein the receiver includes: receiving means for receiving the first contents data and the second contents data from the broadcast station; contents designating means for designating one of the plurality of first contents data; reception quality measuring means for measuring a characteristic value corresponding to a receiving condition of the receiving means; reception quality determining means for determining reception quality based on a comparison between the characteristic value measured by the reception quality measuring means and a predetermined threshold; reproducing means for reproducing the first contents data or the second contents data; and reproduced contents switching means for causing the reproducing means to reproduce (i) the first contents data designated by the contents designating means if the reception quality determining means determines the reception quality to be good, (ii) the first contents data designated by the contents designating means if the reception quality determining means determines the reception quality to be no good and if the receiving means has not received second contents data corresponding to the first contents data designated by the contents designating means, and (iii) second contents data corresponding to the first contents data designated by the contents designating means, if the reception quality determining means determines the reception quality to be no good and if the receiving means has received the second contents data corresponding to the first contents data designated by the contents designating means.

According to this arrangement, when the first contents data cannot be demodulated properly and the video or audio quality deteriorates abruptly, the receiver can reproduce the second contents data if it is available. Thus, the risk of causing troubles in viewing is reduced. As a result, the receiver will not be required to frequently and individually send a retransmission request as in conventional receivers. This allows for efficient use of the bidirectional channels.

According to the present invention, there is provided a broadcast system which includes a broadcast station for broadcasting first contents data using a dedicated forward link channel, a receiver for receiving the first contents data, and a base station control device for distributing data to the receiver, wherein the base station control device includes: second contents data acquiring/generating means for acquiring or generating second contents data having contents of the first contents data; and distributing means for multicasting, to the receiver, the second contents data acquired or generated by the second contents data acquiring/generating means, using a channel different from the dedicated forward link channel, and wherein the receiver includes: first receiving means for receiving the first contents data from the broadcast station; second receiving means for receiving the second contents data from the distribution control station, reception quality measuring means for measuring a characteristic value corresponding to a reception quality of the first receiving means; reception quality determining means for determining reception quality based on a comparison between the characteristic value measured by the reception quality measuring means and a predetermined threshold; reproducing means for reproducing the first contents data or the second contents data; and reproduced contents switching means for causing the reproducing means to reproduce the first contents data if the reception quality determining means determines the reception quality to be good, and the second contents data if the reception quality determining means determines the reception quality to be no good.

According to this arrangement, when the first contents data cannot be demodulated properly and the video or audio quality deteriorates abruptly, the receiver can reproduce the second contents data multicast on a different channel. By the diversity effect, the risk of causing troubles in viewing is reduced. As a result, the receiver will not be required to frequently and individually send a retransmission request as in conventional receivers. This allows for efficient use of the bidirectional channels.

According to the present invention, there is provided a broadcast system which includes a broadcast station for broadcasting a plurality of first contents data using a dedicated forward link channel, a receiver for receiving the first contents data, and a base station control device for distributing data to the receiver, wherein the base station control device includes: selecting means for selecting part of the first contents data; second contents data acquiring/generating means for acquiring or generating second contents data having contents of each of the first contents data selected by the selecting means; and distributing means for multicasting, to the receiver, the second contents data acquired or generated by the second contents data acquiring/generating means, using a channel different from the dedicated forward link channel, and wherein the receiver includes: first receiving means for receiving the first contents data from the broadcast station; second receiving means for receiving the second contents data from the base station control device; reception quality measuring means for measuring a characteristic value corresponding to a reception quality of the first receiving means; reception quality determining means for determining reception quality based on a comparison between the characteristic value measured by the reception quality measuring means and a predetermined threshold; reproducing means for reproducing the first contents data or the second contents data; and reproduced contents switching means for causing the reproducing means to reproduce (i) the first contents data designated by the contents designating means, if the reception quality determining means determines the reception quality to be good, (ii) the first contents data designated by the contents designating means, if the reception quality determining means determines the reception quality to be no good and if the second receiving means has not received second contents data corresponding to the first contents data designated by the contents designating means, and (iii) second contents data corresponding to the first contents data designated by the contents designating means, if the reception quality determining means determines the reception quality to be no good and if the second receiving means has received the second contents data corresponding to the first contents data designated by the contents designating means.

According to this arrangement, when the first contents data cannot be demodulated properly and the video or audio quality deteriorates abruptly, the receiver can reproduce the second contents data multicast on a different channel. By the diversity effect, the risk of causing troubles in viewing is reduced. As a result, the receiver will not be required to frequently and individually send a retransmission request as in conventional receivers. This allows for efficient use of the bidirectional channels.

The receiver, the broadcast station, or the base station control device may be realized by a computer. In this case, the receiver, the broadcast station, or the base station control device may be realized by a program for causing a computer to operate as the respective means described above, or by a computer-readable storage medium storing such a program. The scope of the present invention also includes such a program and storage medium.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A base station control device for distributing data to a receiver which receives, via a dedicated forward link channel, a plurality of first contents data broadcast from a broadcast station, said base station control device comprising:

selecting means for selecting part of the first contents data;

second contents data acquiring or generating means for acquiring or generating second contents data having contents of each of the first contents data selected by the selecting means; and distributing means for multicasting, to the receiver, the second contents data acquired or generated by the second contents data acquiring or generating means, the second contents data being multicast using a channel different from the dedicated forward link channel, and wherein the receiver includes:

contents designating means for designating one of the plurality of first contents data;

reproducing means for reproducing the plurality of first contents data or the second contents data; and reproduced contents switching means for causing the reproducing means to reproduce (i) the first contents data designated by the contents designating means if the reception quality determining means determines the reception quality to be good, (ii) the first contents data designated by the contents designating means if the reception quality determining means determines the reception quality to be no good and if a receiving means has not received second contents data corresponding to the first contents data designated by the contents designating means, and (iii) second contents data corresponding to the first contents data designated by the contents designating means, if the reception quality determining means determines the reception quality to be no good and if the receiving means has received the second contents data designated by the contents designating means.

2. The base station control device as set forth in claim 1, comprising:
designated contents information acquiring means for acquiring, from a receiver, designated contents information indicative of first contents data to be reproduced by the receiver,
wherein the selecting means collects the designated contents information acquired by the designated contents information acquiring means, and, based on a result of collection, selects part of the first contents data.

3. The base station control device as set forth in claim 2,
wherein the designated contents information acquiring means acquires, from the receiver, position information indicative of a position of the receiver, together with the designated contents information, and
the selecting means selects part of the first contents data for each distribution area, based on the position information acquired by the designated contents information acquiring means.

4. The base station control device as set forth in claim 2,
wherein the designated contents information acquiring means acquires, from the receiver, position information indicative of a position of the receiver, together with the designated contents information, and
wherein the selecting means specifies, based on the position information acquired by the designated contents information acquiring means, designated contents information acquired from a receiver which belongs to a predetermined area, and collects the specified designated contents information.

5. The base station control device as set forth in claim 2,
wherein the designated contents information acquiring means acquires, from the receiver, a characteristic value indicative of a receiving condition of the receiver, together with the designated contents information, and
wherein the selecting means collects designated contents information corresponding to a characteristic value equal to or below a predetermined value.

6. The base station control device as set forth in claim 1, wherein the second contents data acquiring or generating means generates the second contents data with a reduced resolution and/or a reduced frame rate.

7. A receiver comprising:
receiving means for receiving first contents data and second contents data using a dedicated forward link channel, the second contents data having contents of the first data and transmitted in a more error robust transmission mode than the first contents data;
contents designating means for designating one of the plurality of the first contents data;
reception quality measuring means for measuring a characteristic value corresponding to a receiving condition of the receiving means;
reception quality determining means for determining reception quality based on a comparison between the characteristic value measured by the reception quality measuring means a predetermined threshold;
reproducing means for reproducing the first contents data or the second contents data; and
reproduced contents switching means for causing the reproducing means to reproduce the first contents data if the reception quality determining means determines the reception quality to be good, and the second contents data if the reception quality determining means determines the reception quality to be no good; and
reproduced contents switching means for causing the reproducing means to reproduce (i) the first contents data designated by the contents designating means, if the reception quality determining means determines the reception quality to be good, (ii) the first contents data designated by the contents designating means, if the reception quality determining means determines the reception quality to be no good and if the receiving means has not received second contents data corresponding to the first contents data designated by the contents designating means, and (iii) second contents data corresponding to the first contents data designated by the contents designating means, if the reception quality determining means determines the reception quality to be no good and if the receiving means has received the second contents data designated by the contents designating means.

8. A receiver comprising:
receiving means for receiving a plurality of first contents data, and second contents data, using a dedicated forward link channel, the second contents data having contents of part of the first contents data and transmitted in a more error robust transmission mode than the first contents data;
contents designating means for designating one of the plurality of the first contents data;
reception quality determining means for measuring a characteristic value corresponding to a receiving condition of the receiving means;
reception quality determining means for determining reception quality based on a comparison between the characteristic value measured by the reception quality measuring means and a predetermined threshold;
reproducing means for reproducing the plurality of first contents data or the second contents data; and
reproduced contents switching means for causing the reproducing means to reproduce (i) the first contents data designated by the contents designating means, if the reception quality determining means determines the reception quality to be good, (ii) the first contents data designated by the contents designating means, if the reception quality determining means determines the reception quality to be no good and if the receiving means has not received the second contents data corresponding to the first contents data designated by the contents designating means, and (iii) the second contents data corresponding to the first contents data designated by the contents designating means, if the reception quality determining means determines the reception quality to be no good and if the receiving means has received the second contents data designated by the contents designating means.

9. The receiver as set forth in claim 8,
wherein each of the plurality of first contents data is appended with (i) second contents presence/absence information indicative of the presence or absence of corresponding second contents data, and, if there is corresponding second contents data, (ii) second contents identification information for identifying the second contents data, and wherein the reproduced contents switching means determines, based on the second contents presence/absence information, the presence or absence of second contents data corresponding to the first contents data designated by the contents designating means, and causes the reproducing means to reproduce second contents data indicated by the second contents identification information appended to the first contents data designated by the contents designating means, if the reception quality determining means determines the reception quality to be no good and if the second contents presence/absence information indicates the presence of the second contents data.

10. The receiver as set forth in claim 8, wherein the second contents data is appended with first contents identification information for identifying corresponding first contents data, and wherein the reproduced contents switching means determines, based on the first contents identification information, the presence or absence of second contents data corresponding to the first contents data designated by the contents designating means, and causes the reproducing means to reproduce second contents data appended with the first contents identification information corresponding to the first contents data designated by the contents designating means, if the reception quality determining means determines the reception quality to be no good and if there is second contents data corresponding to the first contents data designated by the contents designating means.

11. The receiver as set forth in claim 8, comprising transmitting means for transmitting designated contents information, indicative of the first contents data designated by the contents designating means, to a control station which selects first contents data, corresponding to second contents data to be transmitted, from the plurality of first contents data.

12. The receiver as set forth in claim 11, comprising position information acquiring means for acquiring position information indicative of a current position, wherein the transmitting means transmits the position information acquired by the position information acquiring means, together with the designated contents information.

13. The receiver as set forth in claim 11, wherein the transmitting means transmits the characteristic value measured by the reception quality measuring means, together with the designated contents information.

14. The receiver as set forth in claim 11, comprising:

position information acquiring means for acquiring position information indicative of a current position; and area information acquiring means for acquiring, based on the position information acquired by the position information acquiring means, area information indicative of whether the receiver belongs to a predetermined area, wherein the transmitting means transmits the designated contents information if the area information acquired by the area information acquiring means indicates that the receiver belongs to the predetermined area.

15. The receiver as set forth in claim 11, wherein the transmitting means transmits the designated contents information if the characteristic value measured by the reception quality measuring means is equal to or below a predetermined value.

16. A receiver comprising:

first receiving means for receiving first contents data using a dedicated forward link channel;

second receiving means for receiving multicast second contents data having contents of the first contents data, using a channel different from the dedicated forward link channel contents designating means for designating the first contents data;

reception quality measuring means for measuring a characteristic value corresponding to a receiving condition of the first receiving means;

reception quality determining means for determining reception quality based on a comparison between the characteristic value measured by the reception quality measuring means and a predetermined threshold;

reproducing means for reproducing the first contents data or the second contents data; and reproduced contents switching means for causing the reproducing means to reproduce (i) the first contents data designated by the contents designating means, if the reception quality determining means determines the reception quality to be good, (ii) the first contents data designated by the contents designating means, if the reception quality determining means determines the reception quality to be no good and if the receiving means has not received the second contents data corresponding to the first contents data designated by the contents designating means, and (iii) the second contents data corresponding to the first contents data designated by the contents designating means, if the reception quality determining means determines the reception quality to be no good and if the receiving means has received the second contents data designated by the contents designating means.

17. A receiver comprising:

first receiving means for receiving a plurality of first contents data using a dedicated forward link channel;

second receiving means for receiving multicast second contents data having contents of part of the first contents data, using a channel different from the dedicated forward link channel;

contents designating means for designating one of the plurality of first contents data;

reception quality measuring means for measuring a characteristic value corresponding to a receiving condition of the first receiving means;

reception quality determining means for determining reception quality based on a comparison between the characteristic value measured by the reception quality measuring means and a predetermined threshold;

reproducing means for reproducing the plurality of first contents data or the second contents data; and reproduced contents switching means for causing the reproducing means to reproduce (i) the first contents data designated by the contents designating means, if the reception quality determining means determines the reception quality to be good, (ii) the first contents data designated by the contents designating means, if the reception quality determining means determines the reception quality to be no good and if the second receiving means has not received the second contents data corresponding to the first contents data designated by the contents designating means, and (iii) the second contents data corresponding to the first contents data designated by the contents designating means, if the reception quality determining means determines the reception quality to be no good and if the second receiving means has received the second contents data corresponding to the first contents data designated by the contents designating means.

18. The receiver as set forth in claim 17,
wherein each of the plurality of first contents data is appended with (i) second contents presence/absence information indicative of the presence or absence of corresponding second contents data, and, if there is corresponding second contents data, (ii) second contents identification information for identifying the second contents data, and
wherein the reproduced contents switching means determines, based on the second contents presence/absence information, the presence or absence of second contents data corresponding to the first contents data designated by the contents designating means, and causes the reproducing means to reproduce second contents data indicated by the second contents identification information appended to the first contents data designated by the contents designating means, if the reception quality determining means determines the reception quality to be no good and if the second contents presence/absence information indicates the presence of the second contents data.

19. The receiver as set forth in claim 17,
wherein the second contents data is appended with first contents identification information for identifying corresponding first contents data, and
wherein the reproduced contents switching means determines, based on the first contents identification information, the presence or absence of second contents data corresponding to the first contents data designated by the contents designating means, and causes the reproducing means to reproduce second contents data appended with the first contents identification information corresponding to the first contents data designated by the contents designating means, if the reception quality determining means determines the reception quality to be no good and if there is second contents data corresponding to the first contents data designated by the contents designating means.

20. The receiver as set forth in claim 17, comprising transmitting means for transmitting designated contents information, indicative of the first contents data designated by the contents designating means, to a control station which selects first contents data, corresponding to second contents data to be transmitted, from the plurality of first contents data.

21. The receiver as set forth in claim 20, comprising position information acquiring means for acquiring position information indicative of a current position,
wherein the transmitting means transmits the position information acquired by the position information acquiring means, together with the designated contents information.

22. The receiver as set forth in claim 20, wherein the transmitting means transmits the characteristic value measured by the reception quality measuring means, together with the designated contents information.

23. The receiver as set forth in claim 20, comprising:
position information acquiring means for acquiring position information indicative of a current position; and
area information acquiring means for acquiring, based on the position information acquired by the position information acquiring means, area information indicative of whether the receiver belongs to a predetermined area,
wherein the transmitting means transmits the designated contents information if the area information acquired by the area information acquiring means indicates that the receiver belongs to the predetermined area.

24. The receiver as set forth in claim 20, wherein the transmitting means transmits the designated contents information if the characteristic value measured by the reception quality measuring means is equal to or below a predetermined value.

25. A broadcast system which comprises a broadcast station for broadcasting first contents data using a dedicated forward link channel, and a receiver for receiving the first contents data,
wherein the broadcast station includes:
second contents data acquiring or generating means for acquiring or generating second contents data having contents of the first contents data; and
transmission control means for broadcasting the second contents data acquired or generated by the second contents data acquiring or generating means, the second contents data being broadcast in a more error robust transmission mode than the first contents data and using the dedicated forward link channel, and
wherein the receiver includes:
receiving means for receiving the first contents data and the second contents data;
contents designating means for designating the first contents data;
reception quality measuring means for measuring a characteristic value corresponding to a receiving condition of the receiving means;
reception quality determining means for determining reception quality based on a comparison between the characteristic value measured by the reception quality measuring means and a predetermined threshold;
reproducing means for reproducing the first contents data or the second contents data; and
reproduced contents switching means for causing the reproducing means to reproduce (i) the first contents data designated by the contents designating means, if the reception quality determining means determines the reception quality to be good, (ii) the first contents data designated by the contents designating means, if the reception quality determining means determines the reception quality to be no good and if a receiving means has not received the second contents data corresponding to the first contents data designated by the contents designating means, and (iii) the second contents data corresponding to the first contents data designated by the contents designating means, if the reception quality determining means determines the reception quality to be no good and if the receiving means has received the second contents data designated by the contents designating means.

26. A broadcast system which comprises a broadcast station for broadcasting a plurality of first contents data using a dedicated forward link channel, and a receiver for receiving the first contents data,
wherein the broadcast station includes:
selecting means for selecting some of the first contents data;
second contents data acquiring or generating means for acquiring or generating second contents data having contents of each of the first contents data selected by the selecting means; and
transmission control means for broadcasting the second contents data acquired or generated by the second contents data acquiring or generating means, the second contents data being transmitted in a more error robust transmission mode than the first contents data and by sharing a predetermined specific band in the dedicated forward link channel, and wherein the receiver includes:

receiving means for receiving the first contents data and the second contents data from the broadcast station;

contents designating means for designating one of the plurality of first contents data;

reception quality measuring means for measuring a characteristic value corresponding to a receiving condition of the receiving means;

reception quality determining means for determining reception quality based on a comparison between the characteristic value measured by the reception quality measuring means and a predetermined threshold;

reproducing means for reproducing the first contents data or the second contents data; and reproduced contents switching means for causing the reproducing means to reproduce (i) the first contents data designated by the contents designating means if the reception quality determining means determines the reception quality to be good, (ii) the first contents data designated by the contents designating means if the reception quality determining means determines the reception quality to be no good and if the receiving means has not received the second contents data corresponding to the first contents data designated by the contents designating means, and (iii) the second contents data corresponding to the first contents data designated by the contents designating means, if the reception quality determining means determines the reception quality to be no good and if the receiving means has received the second contents data corresponding to the first contents data designated by the contents designating means.

27. The broadcast station as set forth in claim 26, comprising:

designated contents information acquiring means for acquiring, from a receiver, designated contents information indicative of first contents data to be reproduced by the receiver, wherein the selecting means collects the designated contents information acquired by the designated contents information acquiring means, and, based on a result of collection, selects some of the first contents data.

28. The broadcast station as set forth in claim 27, wherein the designated contents information acquiring means acquires, from the receiver position information indicative of a position of the receiver, together with the designated contents information, and wherein the selecting means selects some of the first contents data for each broadcast area, based on the position information acquired by the designated contents information acquiring means.

29. The broadcast station as set forth in claim 27, wherein the designated contents information acquiring means acquires, from the receiver, position information indicative of a position of the receiver, together with the designated contents information, and wherein the selecting means specifies, based on the position information acquired by the designated contents information acquiring means, designated contents information acquired from a receiver which belongs to a predetermined area, and collects the specified designated contents information.

30. The broadcast station as set forth in claim 27, wherein the designated contents information acquiring means acquires, from the receiver, a characteristic value indicative of a receiving condition of the receiver, together with the designated contents information, and wherein the selecting means collects designated contents information corresponding to a characteristic value equal to or below a predetermined value.

31. The broadcast station as set forth in claim 26, wherein the second contents data acquiring or generating means generates the second contents data with a reduced resolution and/or a reduced frame rate.

32. A broadcast system which comprises a broadcast station for broadcasting first contents data using a dedicated forward link channel, a receiver for receiving the first contents data, and a base station control device for distributing data to the receiver, wherein the base station control device includes:

second contents data acquiring or generating means for acquiring or generating second contents data having contents of the first contents data; and distributing means for multicasting, to the receiver, the second contents data acquired or generated by the second contents data acquiring or generating means, using a channel different from the dedicated forward link channel, and wherein the receiver includes:

first receiving means for receiving the first contents data from the broadcast station;

second receiving means for receiving the second contents data from the distribution control station, contents designating means for designating the first contents data;

reception quality measuring means for measuring a characteristic value corresponding to a reception quality of the first receiving means;

reception quality determining means for determining reception quality based on a comparison between the characteristic value measured by the reception quality measuring means and a predetermined threshold;

reproducing means for reproducing the first contents data or the second contents data; and reproduced contents switching means for causing the reproducing means to reproduce (i) the first contents data designated by the contents designating means, if the reception quality determining means determines the reception quality to be good, (ii) the first contents data designated by the contents designating means, if the reception quality determining means determines the reception quality to be no good and if the receiving means has not received the second contents data corresponding to the first contents data designated by the contents designating means, and (iii) the second contents data corresponding to the first contents data designated by the contents designating means, if the reception quality determining means determines the reception quality to be no good and if the receiving means has received the second contents data designated by the contents designating means.

33. A broadcast system which comprises a broadcast station for broadcasting a plurality of first contents data using a dedicated forward link channel, a receiver for receiving the first contents data, and a base station control device for distributing data to the receiver, wherein the base station control device includes:

selecting means for selecting part of the first contents data;

second contents data acquiring or generating means for acquiring or generating second contents data having contents of each of the first contents data selected by the selecting means; and distributing means for multicasting, to the receiver, the second contents data acquired or generated by the second contents data acquiring or generating means, using a channel different from the dedicated forward link channel, and wherein the receiver includes:

first receiving means for receiving the first contents data from the broadcast station;

second receiving means for receiving the second contents data from the base station control device;

reception quality measuring means for measuring a characteristic value corresponding to a reception quality of the first receiving means;

reception quality determining means for determining reception quality based on a comparison between the characteristic value measured by the reception quality measuring means and a predetermined threshold;

reproducing means for reproducing the first contents data or the second contents data; and reproduced contents switching means for causing the reproducing means to reproduce (i) the first contents data designated by the contents designating means, if the reception quality determining means determines the reception quality to be good, (ii) the first contents data designated by the contents designating means, if the reception quality determining means determines the reception quality to be no good and if the second receiving means has not received second contents data corresponding to the first contents data designated by the contents designating means, and (iii) second contents data corresponding to the first contents data designated by the contents designating means, if the reception quality determining means determines the reception quality to be no good and if the second receiving means has received the second contents data corresponding to the first contents data designated by the contents designating means.

34. A control method of a base station control device for distributing data to a receiver which receives, via a dedicated forward link channel, a plurality of first contents data broadcast from a broadcast station, the base station control device including selecting means, second contents acquiring or generating means, and distributing means, and the receiver including contents designating means, and the receiver including contents designating means, reproducing means, reproduced contents switching means, reception quality determining means, and receiving means, said method comprising:

a selecting step of selecting, by the selecting means, part of the first contents data;

a second contents data acquiring or generating step of acquiring or generating, by the second contents data acquiring or generating means, second contents data having contents of each of the first contents data selected by the selecting means;

a distributing step of multicasting to the receiver, by the distributing means, the second contents data acquired or generated by the second contents data acquiring or generating means, the second contents data being multicast using a channel different from the dedicated forward link channel a contents designating step of designating, by the contents designating means, one of the plurality of the first contents data; a reproduced contents switching step of causing, by the reproduced contents switching means, the reproducing means to reproduce (i) the first contents data designated by the contents designating means, if a reception quality determining means determines the reception quality to be good, (ii) the first contents data designated by the contents designating means, if the reception quality determining means determines the reception quality to be no good and if the receiving means has not received the second contents data corresponding to the first contents data designated by the contents designating means, and (iii) the second contents data corresponding to the first contents data designated by the contents designating means, if the reception quality determining means determines the reception quality to be no good and if the receiving means has received the second contents data designated by the contents designating means.

35. A receiving method of a receiver which includes receiving means, reception quality measuring means, contents designating means, reception quality determining means, reproducing means, and reproduced contents switching means, said method comprising:

a receiving step of receiving, by the receiving means, first contents data and second contents data using a dedicated forward link channel, the second contents data having contents of the first contents data and broadcast in a more error robust transmission mode than the first contents data;

a contents designating step of designating, by the contents designating means, the first contents data;

a reception quality measuring step of measuring, by the reception quality measuring means, a characteristic value corresponding to a receiving condition of the receiving means;

a reception quality determining step of determining, by the reception quality determining means, reception quality based on a comparison between the characteristic value measured by the reception quality measuring means and a predetermined threshold; and a reproduced contents switching step of causing, by the reproduced contents switching means, the reproducing means to reproduce (i) the first contents data designated by the contents designating means, if a reception quality determining means determines the reception quality to be good, (ii) the first contents data designated by the contents designating means, if the reception quality determining means determines the reception quality to be no good and if the receiving means has not received the second contents data corresponding to the first contents data designated by the contents designating means, and (iii) the second contents data corresponding to the first contents data designated by the contents designating means, if the reception quality determining means determines the reception quality to be no good and if the receiving means has received the second contents data designated by the contents designating means.

36. A receiving method of a receiver which includes receiving means, contents designating means, reception quality measuring means, reception quality determining means, reproducing means, and reproduced contents switching means, said method comprising:

a receiving step of receiving, by the receiving means, a plurality of first contents data, and second contents data, using a dedicated forward link channel, the second contents data having contents of some of the first contents data and broadcast in a more error robust transmission mode than the first contents data;

a contents designating step of designating, by the contents designating means, one of the plurality of first contents data;

a reception quality measuring step of measuring, by the reception quality measuring means, a characteristic value corresponding to a receiving condition of the receiving means;

a reception quality determining step of determining, by the reception quality determining means, reception quality based on a comparison between the characteristic value measured by the reception quality measuring means and a predetermined threshold; and a reproduced contents switching step of causing, by the reproduced contents switching means, the reproducing means to reproduce (i) the first contents data designated by the contents designating means, if the reception quality determining means determines the reception quality to be good, (ii) the first contents data designated by the contents designating means, if the reception quality determining means determines the reception quality to be no good and when the receiving means has not received second contents data corresponding to the first contents data designated by the contents designating means, and (iii) second contents data corresponding to the first contents data designated by the contents designating means, if the reception quality determining means determines the reception quality to be no good and if the receiving means has received the second contents data corresponding to the first contents data designated by the contents designating means.

37. A receiving method of a receiver which includes first receiving means, second receiving means, contents designating means reception quality measuring means, reception quality determining means, reproducing means, and reproduced contents switching means, said method comprising:

a first receiving step of receiving, by the first receiving means, first contents data using a dedicated forward link channel;

a second receiving step of receiving, by the second receiving means, multicast second contents data having contents of the first contents data, using a channel different from the dedicated forward link channel;

a contents designating step of designating, by the contents designating means, the first contents data;

a reception quality measuring step of measuring, by the reception quality measuring means, a characteristic value corresponding to a receiving condition of the first receiving means, a reception quality determining step of determining, by the reception quality determining means, reception quality based on a comparison between the characteristic value measured by the reception quality measuring means and a predetermined threshold; and a reproduced contents switching step of causing, by the reproduced contents switching means, the reproducing means to reproduce (i) the first contents data designated by the contents designating means, if a reception quality determining means determines the reception quality to be good, (ii) the first contents data designated by the contents designating means, if the reception quality determining means determines the reception quality to be no good and if the receiving means has not received the second contents data corresponding to the first contents data designated by the contents designating means, and (iii) the second contents data corresponding to the first contents data designated by the contents designating means, if the reception quality determining means determines the reception quality to be no good and if the receiving means has received the second contents data designated by the contents designating means.

38. A receiving method of a receiver which includes first receiving means, second receiving means, contents designating means, reception quality measuring means, reception quality determining means, reproducing means, and reproduced contents switching means, said method comprising:

a first receiving step of receiving, by the first receiving means, a plurality of first contents data using a dedicated forward link channel;

a second receiving step of receiving, by the second receiving means, multicast second contents data having contents of some of the first contents data, using a channel different from the dedicated forward link channel;

a contents designating step of designating, by the contents designating means, one of the plurality of first contents data;

a reception quality measuring step of measuring, by the reception quality measuring means, a characteristic value corresponding to a receiving condition of the first receiving means;

a reception quality determining step of determining, by the reception quality determining means, reception quality based on a comparison between the characteristic value measured by the reception quality measuring means and a predetermined threshold; and a reproduced contents switching step of causing, by the reproduced contents switching means, the reproducing means to reproduce (i) the first contents data designated by the contents designating means, if the reception quality determining means determines the reception quality to be good, (ii) the first contents data designated by the contents designating means, if the reception quality determining means determines the reception quality to be no good and if the second receiving means has not received second contents data corresponding to the first contents data designated by the contents designating means, and (iii) second contents data corresponding to the first contents data designated by the contents designating means, if the reception quality determining means determines the reception quality to be no good and if the second receiving means has received the second contents data corresponding to the first contents data designated by the contents designating means.

39. A computer readable medium encoded with a distribution program capable of being executed by a computer for operating as respective means of a base station control device for distributing data to a receiver which receives, via a dedicated forward link channel, a plurality of first contents data broadcast from a broadcast station, said base station control device comprising:

selecting means for selecting part of the first contents data;

second contents data acquiring or generating means for acquiring or generating second contents data having contents of each of the first contents data selected by the selecting means; and distributing means for multicasting, to the receiver, the second contents data acquired or generated by the second contents data acquiring or generating means, the second contents data being multicast using a channel different from the dedicated forward link channel and wherein the receiver includes: contents designating means for designating one of the plurality of first contents data; reproducing means for reproducing the plurality of first contents data of the second contents data; and reproduced contents switching means for causing the reproducing means to reproduce (i) the first contents data designated by the contents designating means if the reception quality determining means determines the reception quality to be good, (ii) the first contents data designated by the contents designating means if the reception quality determining means determines the reception quality to be no good and if a receiving means has not received second contents data corresponding to the first contents data designated by the contents designating means, and (iii) second contents data corresponding to the first contents data designated by the contents designating means, if the reception quality determining means determines the reception quality to be no good and if the receiving means has received the second contents data corresponding to the first contents data designated by the contents designating means.

40. A computer readable medium encoded with a reception program capable of being executed by a computer for operating as respective means of a receiver which comprises:
receiving means for receiving first contents data and second contents data using a dedicated forward link channel, the second contents data having contents of the first contents data and broadcast in a more error robust transmission mode than the first contents data;
contents designating means for designating the first contents data;
reception quality measuring means for measuring a characteristic value corresponding to a receiving condition of the receiving means;
reception quality determining means for determining reception quality based on a comparison between the characteristic value measured by the reception quality measuring means and a predetermined threshold;
reproducing means for reproducing the first contents data or the second contents data; and
reproduced contents switching means for causing the reproducing means to reproduce (i) the first contents data designated by the contents designating means if the reception quality determining means determines the reception quality to be good, (ii) the first contents data designated by the contents designating means if the reception quality determining means determines the reception quality to be no good and if the receiving means has not received second contents data corresponding to the first contents data designated by the contents designating means, and (iii) second contents data corresponding to the first contents data designated by the contents designating means, if the reception quality determining means determines the reception quality to be no good and if the receiving means has received the second contents data corresponding to the first contents data designated by the contents designating means.

41. A computer readable medium encoded with a reception program capable of being executed by a computer for operating as respective means of a receiver which comprises:
receiving means for receiving a plurality of first contents data, and second contents data, using a dedicated forward link channel, the second contents data having contents of some of the first contents data and broadcast in a more error robust transmission mode than the first contents data;
contents designating means for designating one of the plurality of first contents data;
reception quality measuring means for measuring a characteristic value corresponding to a receiving condition of the receiving means;
reception quality determining means for determining reception quality based on a comparison between the characteristic value measured by the reception quality measuring means and a predetermined threshold;
reproducing means for reproducing the first contents data or the second contents data; and
reproduced contents switching means for causing the reproducing means to reproduce (i) the first contents data designated by the contents designating means, if the reception quality determining means determines the reception quality to be good, (ii) the first contents data designated by the contents designating means, if the reception quality determining means determines the reception quality to be no good and if the receiving means has not received the second contents data corresponding to the first contents data designated by the contents designating means, and (iii) the second contents data corresponding to the first contents data designated by the contents designating means, if the reception quality determining means determines the reception quality to be no good and if the receiving means has received the second contents data designated by the contents designating by the contents designating means.

42. A computer readable medium encoded with a reception program capable of being executed by a computer for operating as respective means of a receiver which comprises:
first receiving means for receiving first contents data using a dedicated forward link channel;
second receiving means for receiving multicast second contents data having contents of the first contents data, using a channel different from the dedicated forward link channel;
contents designating means for designating the first contents data;
reception quality measuring means for measuring a characteristic value corresponding to a receiving condition of the first receiving means;
reception quality determining means for determining reception quality based on a comparison between the characteristic value measured by the reception quality measuring means and a predetermined threshold;
reproducing means for reproducing the first contents data or the second contents data; and
reproduced contents switching means for causing the reproducing means to reproduce (i) the first contents data designated by the contents designating means if the reception quality determining means determines the reception quality to be good, (ii) the first contents data designated by the contents designating means if the reception quality determining means determines the reception quality to be no good and if the receiving means has not received second contents data corresponding to the first contents data designated by the contents designating means, and (iii) second contents data corresponding to the first contents data designated by the contents designating means, if the reception quality determining means determines the reception quality to be no good and if the receiving means has received the second contents data corresponding to the first contents data designated by the contents designating means.

43. A computer readable medium encoded with a reception program capable of being executed by a computer for operating as respective means of a receiver which comprises:

first receiving means for receiving a plurality of first contents data using a dedicated forward link channel;

second receiving means for receiving multicast second contents data having contents of some of the first contents data, using a channel different from the dedicated forward link channel;

contents designating means for designating one of the plurality of the first contents data;

reception quality measuring means for measuring a characteristic value corresponding to a receiving condition of the first receiving means;

reception quality determining means for determining reception quality based on a comparison between the characteristic value measured by the reception quality measuring means and a predetermined threshold;

reproducing means for reproducing the first contents data or the second contents data; and reproduced contents switching means for causing the reproducing means to reproduce (i) the first contents data designated by the contents designating means, if the reception quality determining means determines the reception quality to be good, (ii) the first contents data designated by the contents designating means, if the reception quality determining means determines the reception quality to be no good and if the second receiving means has not received the second contents data corresponding to the first contents data designated by the contents designating means, and (iii) the second contents data corresponding to the first contents data designated by the contents designating means, if the reception quality determining means determines the reception quality to be no good and if the second receiving means has received the second contents data corresponding to the first contents data designated by the contents designating means.

* * * * *